(12) United States Patent
Brogardh et al.

(10) Patent No.: US 12,491,628 B2
(45) Date of Patent: Dec. 9, 2025

(54) METHOD FOR DETERMINING PLACEMENT OF PARALLEL-KINEMATIC MACHINE JOINTS, AND A PARALLEL-KINEMATIC MACHINE WITH HIGH STIFFNESS

(71) Applicant: COGNIBOTICS AB, Lund (SE)

(72) Inventors: Torgny Brogardh, Molndal (SE); Klas Nilsson, Lund (SE); Peter Helgosson, Bristol (GB)

(73) Assignee: Cognibotics AB, Lund (SE)

( * ) Notice: Subject to any disclaimer, the term of this patent is extended or adjusted under 35 U.S.C. 154(b) by 925 days.

(21) Appl. No.: 17/765,120

(22) PCT Filed: Oct. 1, 2020

(86) PCT No.: PCT/EP2020/077474
§ 371 (c)(1),
(2) Date: Mar. 30, 2022

(87) PCT Pub. No.: WO2021/064082
PCT Pub. Date: Apr. 8, 2021

(65) Prior Publication Data
US 2022/0339782 A1    Oct. 27, 2022

(30) Foreign Application Priority Data

Oct. 4, 2019   (EP) .................................... 19201371

(51) Int. Cl.
*B25J 9/16*   (2006.01)
*B25J 9/00*   (2006.01)

(52) U.S. Cl.
CPC .......... *B25J 9/1605* (2013.01); *B25J 9/0042* (2013.01); *B25J 9/1623* (2013.01); *B25J 9/1653* (2013.01)

(58) Field of Classification Search
None
See application file for complete search history.

(56) References Cited

PUBLICATIONS

International Search Report on corresponding PCT application (PCT/EP2020/077474) from International Searching Authority (EPO) dated Nov. 24, 2020.

(Continued)

*Primary Examiner* — Matthew G Marini
(74) *Attorney, Agent, or Firm* — Howard J. Klein; Shore IP Group, PLLC

(57) ABSTRACT

A method for determining placement of support-platform joints (8a, 9a, 10a, 11a, 12a, 13a) on a support-platform (17) of a parallel kinematic manipulator, PKM. The PKM comprises: the support-platform (17), a first support linkage (SL1), a second support linkage (SL2) and a third support linkage (SL3). The first support linkage (SL1), the second support linkage (SL2) and the third support linkage (SL3) together comprises at least five support-links (8, 9, 10, 11, 12, 13). The method comprises estimating (S1) parameters indicative of stiffness for the PKM, based on a kinematic model and an elastic model of the PKM and chosen defined forces and/or torques applied to a tool (22) during a processing sequence, and checking (S2) whether the estimated parameters indicative of stiffness of the PKM fulfill one or more stiffness criteria. Upon the estimated parameters indicative of stiffness fulfilling one or more stiffness criteria, the method comprises choosing (S3) the current placement configuration as an optimal placement configuration of the support-platform joints. The disclosure also relates to a system comprising a computer configured to perform the method and to output an optimal placement configuration, and a PKM with support-platform joints that are placed to the support-platform according to the optimal placement configuration outputted by the computer. The disclosure also (Continued)

relates to PKMs with support-platform joints that are placed to the support-platform to achieve high stiffness.

19 Claims, 27 Drawing Sheets

(56) References Cited

PUBLICATIONS

Written Opinion on corresponding PCT application (PCT/EP2020/077474) from International Searching Authority (EPO) dated Nov. 24, 2020.

Ahmad et al.; "A model-based and simulation-driven methodology for design of haptic devices"; Mechatronics, Pergamon Press, Oxford, GB; vol. 24, No. 7; pp. 805-818; XP029074959; Feb. 14, 2014.

Portman et al.; "Workspace of parallel kinematics machines with minimum stiffness limits: Collinear stiffness value based approach"; Mechanism and Machine Theory, Pergamon, Amsterdam, NL; vol. 49; pp. 67-86; XP028344784; Nov. 2, 2011.

Pashkevich et al.; "Kinematic and stiffness analysis of the Orthoglide, a PKM with simple, regular workspace and homogeneous performances"; 2007 IEEE International Conference on Robotics and Automation; Roma, Italy, IEEE, Piscataway, NJ, USA; pp. 549-554; EP031388855; Apr. 10, 2007.

Mirshekari et al.; "Structure Comparison and Optimal Design of 6-RUS Parallel Manipulator Based on Kinematic and Dynamic Performances"; Latin American Journal of Solids and Structures; vol. 13, No. 13; pp. 2414-2438; XP055678833; Dec. 1, 2016.

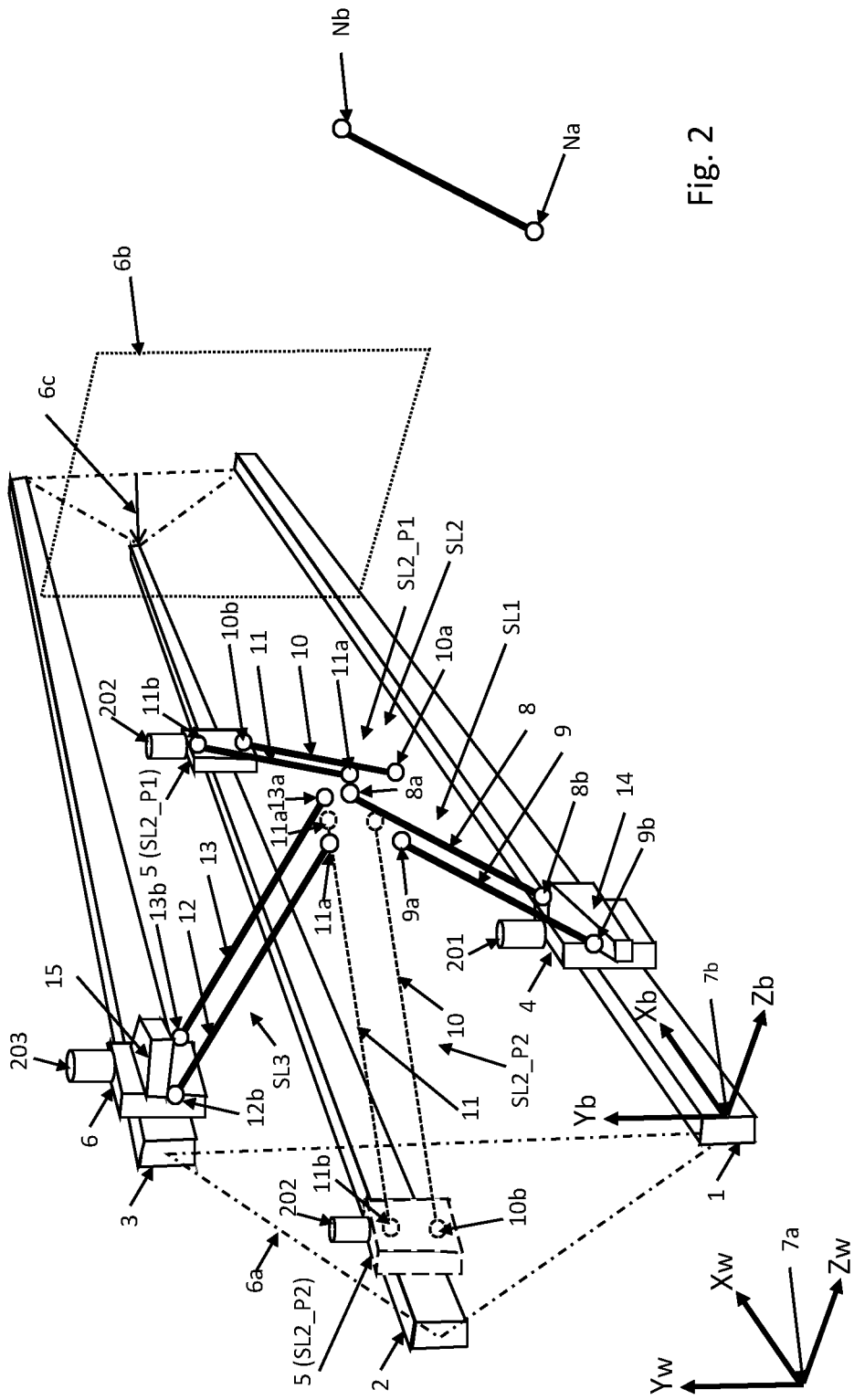

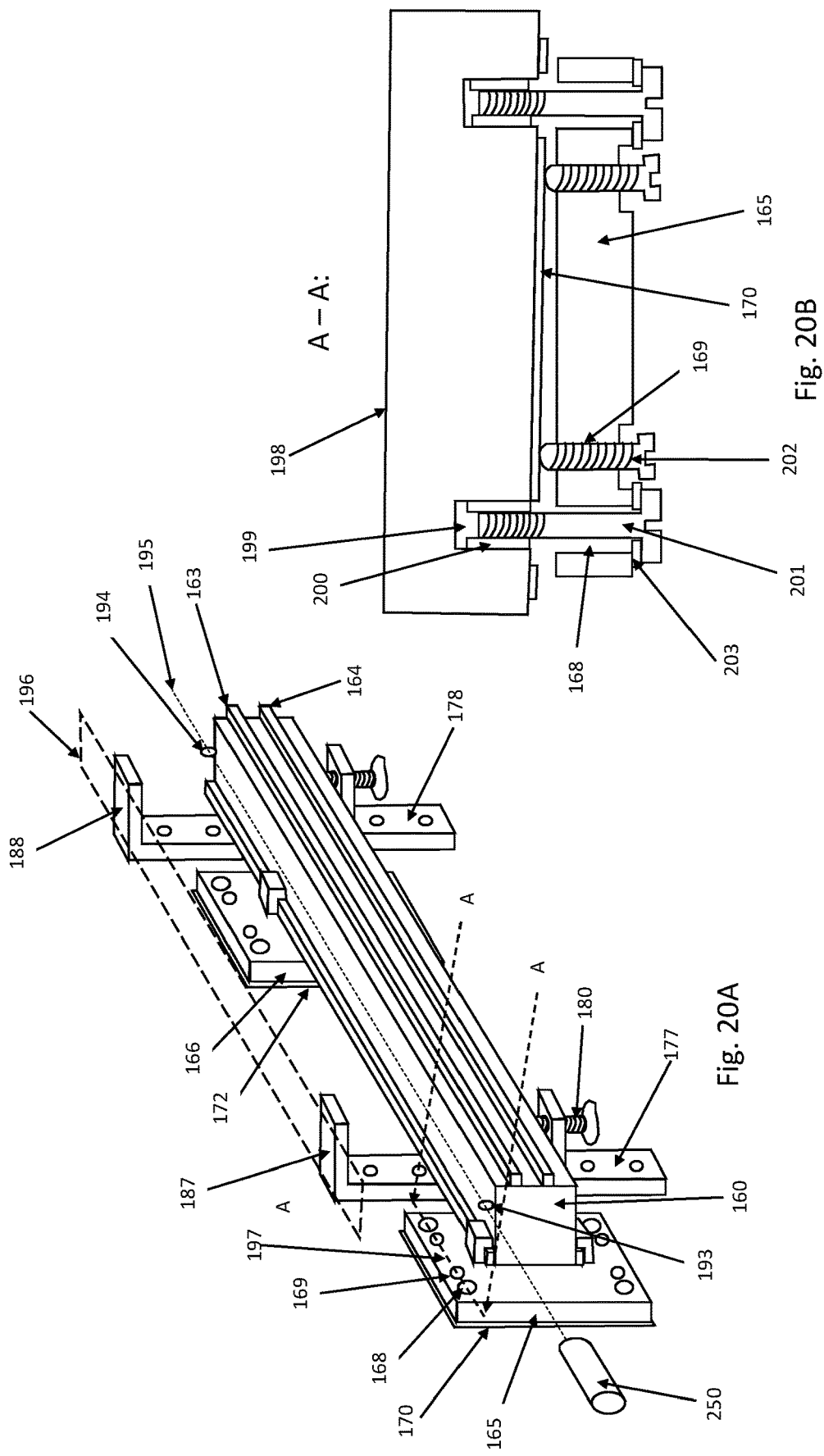

METHOD FOR DETERMINING PLACEMENT OF PARALLEL-KINEMATIC MACHINE JOINTS, AND A PARALLEL-KINEMATIC MACHINE WITH HIGH STIFFNESS

CROSS-REFERENCE TO RELATED APPLICATION

This application is the National Phase, under 35 U.S.C. § 371(c), of International Application No. PCT/EP2020/077474, filed Oct. 1, 2020, which claims priority from European Application No. EP 19201371.2, filed Oct. 4, 2019.

FEDERALLY SPONSORED RESEARCH OR DEVELOPMENT

Not Applicable.

TECHNICAL FIELD

The present disclosure relates to the technical field of parallel kinematic machines, and in particular to parallel kinematic machines with high stiffness.

BACKGROUND

There is a growing need for flexible manipulators, that can be scaled up to work with high precision on very large objects like aerospace components and long vehicles. The manipulator concepts used today are based on serial kinematics, that are very heavy manipulators that are monolithic and not adapted for modularization and flexibility. Increased rigidity or stiffness needed for processes such as friction stir welding, milling and drilling also increases the weight of the manipulators. The solutions used today with very heavy serial kinematics manipulators for these processes entail not only high machine- and installation cost but also severe limitations in speed, acceleration and controllability. For many years parallel kinematics have been studied as a solution to these problems and some promising concepts are summarized in the paper "The Linear Delta: Developments and Applications" by Mohamed Buouri, EPFL, Lausanne, presented at ISR2010. However, no linear delta machine has so far succeeded in meeting the application requirements. One reason is the design of the platform moved by the parallel links connected between the platform and the linear actuators. In the Delta structure a flat platform is used and the connections of the links with joints to the platform are determined by the flat surfaces of the actuators. Although, this is far from an optimal platform design with respect to the stiffness of the manipulator.

SUMMARY

It is thus an object of the disclosure to alleviate at least some of the drawbacks with the prior art. It is a further object of the disclosure to provide a parallel kinematic machine, PKM, that has high stiffness as required by an application. It is a further object to provide a method that determines characteristics of a PKM such that it has high stiffness required by the application.

These objects and others are at least partly achieved with the parallel kinematic machine and the method according to the independent claims, and by the embodiments of the dependent claims. In the parallel-kinematic literature the notion of a platform is established as the moved mounting face for tools or equipment to be moved, which in the robot manipulator literature is referred to as an end-flange for mounting a tool or end-effector. Here, the parallel-kinematic notion is the basis, but different sorts of platforms will be introduced, while manipulating a mounted end-effector still is the goal.

According to a first aspect, the disclosure relates to a method for determining placement of support-platform joints on a support-platform of a parallel kinematic manipulator, PKM. The PKM comprises the support-platform. The PKM further comprises a first support linkage comprising two or more support-links each configured to be connected at one end to the support-platform via a support-platform joint, and at the other end configured to be connected to a first carriage via a carriage joint. The first carriage is movable along a first path, and the first support linkage is arranged to transfer a first movement to the support-platform. The PKM comprises a second support linkage comprising one or more support-links each configured to be connected at one end to the support-platform via a support-platform joint, and at the other end configured to be connected to a second carriage via a carriage joint, wherein the second carriage is movable along a second path, and the second support linkage is arranged to transfer a second movement to the support-platform. The PKM further comprises a third support linkage comprising two or more support-links each configured to be connected at one end to the support-platform via a support-platform joint, and at the other end configured to be connected to a third carriage via a carriage joint wherein the third carriage is movable along a third path. The third support linkage is arranged to transfer a third movement to the support-platform. The first support linkage, the second support linkage and the third support linkage together comprise at least five support-links. The method comprises obtaining a kinematic model and an elasticity model of the PKM, and defining forces and/or torques applied to a tool that is attached to the support-platform during a processing sequence with the tool. The method also comprises obtaining a current placement configuration including initial placements of the support-platform joints in relation to the support-platform. The method also comprises estimating parameters indicative of stiffness for the PKM, based on the kinematic and elasticity models of the PKM and chosen defined forces and/or torques applied to the tool during the processing sequence, when the support-platform joints are located in places defined by the current placement configuration onto the support-platform. The method further comprises checking whether the estimated parameters indicative of stiffness of the PKM fulfill one or more application stiffness criteria. Upon the estimated parameters indicative of stiffness fulfilling one or more stiffness criteria, the method comprises choosing the current placement configuration of the support-platform joints as an optimal placement configuration of the support-platform joints; and else changing a placement of one or more support-platform joints in the current placement configuration and repeating the estimating and checking with the changed current placement configuration.

The above outlined method provides a novel way of improving the stiffness of the PKM with respect to the forces and torques on the tool. By changing the placement of one or more support-platform joints, the distribution of forces in the support-links will be changed and an evaluation of the stiffness of the PKM can be performed to find an optimal PKM regarding stiffness. Using the method results in design parameters for a PKM with an increased stiffness compared to other PKMs. Increased stiffness entails that for the forces and torques on the tool, the tool will make less deviation from the programmed position, both with respect to tool position and tool orientation, or tool path. In some applications the stiffness will be more important in one direction in the tool coordinate system and then the optimization procedure will maximize stiffness in that special direction. The method introduces stiffness estimations in the evaluation of placement of joints of the PKM. Thereby the stiffness can be evaluated for various placements of the joints, and the placement giving the best stiffness can be chosen as the optimal placement.

According to some embodiments, the one or more stiffness criteria of the PKM comprises that a current minimum of the estimated parameters indicative of stiffness is equal to or above a predetermined stiffness value. In this way the user can set the requirements on the PKM as a predetermined stiffness value, which can be in the worst-case direction or a specific direction in the tool coordinate system.

According to some embodiments, the method comprises replacing a previous minimum stiffness value with a current minimum of the estimated parameters indicative of stiffness, upon a current minimum of the estimated parameters indicative of stiffness being greater than the previous minimum stiffness value. Gives the possibility to keep track of the optimization procedure and for example find out if even lower parameters indicative of stiffness can be obtained by proceed the iterations. It can also be used to compare the efficiency of different optimization algorithms.

According to some embodiments, the one or more stiffness criteria comprises that no collision is detected between a geometric model of the support-links, and a geometric model of the support-platform. In this way the system will automatically make sure that the selected positions of the support-platform joints can be used without any collisions between the links and support-platform.

According to some embodiments, the one or more stiffness criteria comprises that no joint limit is reached based on obtained limitations for joint mounting placements. This will further make sure that the selected type of joints will work in the whole workspace of the PKM.

According to some embodiments, the obtaining a current placement configuration including initial placements of the support-platform joints comprises defining the initial placements of the support-platform joints. This is important in order avoid local optima in the optimization process, which will not correspond to the best possible solution for the placement of the support-platform joints.

According to some embodiments, the initial placements of the support-platform joints are limited by a primitive volumetric body such as a cylinder, a box or a sphere. This simplifies the initial placement of the support-platform joints.

According to some embodiments, the kinematic model comprises limitations of the working range of the support-platform joints. This may be necessary to make sure that the selected type of joints will work in the whole workspace of the PKM.

According to some embodiments, the estimating and checking are performed automatically. This will save time and make the result less dependent on the user of the system.

According to some embodiments, the estimating comprises estimating link forces with the requirement that the sum of all forces acting on the support-platform is zero, and the sum of all torques acting on the support-platform is zero.

According to some embodiments, the defining comprises simulation or real program execution during which forces and/or torques on the tool are estimated. This makes it possible to obtain the real forces and torques on the tool for different obtained combinations of forces and torques in a program in order to find the placements of the support-platform joints that give the accepted stiffness in the whole program.

According to some embodiments, the PKM comprises a tool-base comprising a shaft joint, a shaft and a tool platform, wherein the shaft is connected to the support-platform via the shaft joint and the shaft is also connected to the tool platform. One or more tool linkages each comprises a tool link connected at one end via a tool-base joint to the tool-base, and at the other end connected via a carriage joint to a carriage arranged for movement along a path; and wherein each tool linkage is configured to rotate the shaft around at least one axis relative the support-platform, by transferring a movement of the respective tool linkage to the shaft. The method further comprises determining placement of one or more tool-base joints to the tool-base. This makes it possible to introduce tool rotation with maximum stiffness for the forces and torques obtained in the actual program.

According to a second aspect, the disclosure relates to a computer comprising a processor and a memory, wherein the memory comprises computer instructions configured to perform the method according to any one of the proceeding claims, when then computer instructions are executed by the processor.

According to some embodiments, the computer is configured to receive sensor data from one or more force or torque sensors arranged to measure forces or torques, respectively, applied to a tool attached to the support-platform during the processing sequence with the tool. This makes it possible to obtain measured forces and torques on the tool and use these in the optimization process. The optimization can be made either offline in a desktop type computer or online in the controller that controls the PKM in real time. In the latter case the optimization can easily be made after the installation of the PKM, whereby it is possible to adapt the support-platform to get the optimized joint placements. The support-platform is for example adapted to the optimized joint placements by means of having adjustable and/or multiple mechanical interfaces for at least one support-platform joint. In some embodiments, if a real PKM with the appropriate design is available, the PKM with attached tool performs the actual program with a default mounting of the joints, while the forces and torques on the tool are measured. Thereafter the optimization can be performed either in the controller of the same PKM, or with another computer not connected to the PKM, thus offline, using the measured forces and torques.

According to a third aspect, the disclosure relates to a system comprising a computer according to the second aspect or any embodiments thereof, wherein the computer is configured to output an optimal placement configuration. The system further comprises a parallel kinematic machine, PKM. The PKM comprises a support-platform. The PKM further comprises a first support linkage comprising two or more support-links each connected at one end to the support-platform via a support-platform joint and at the other end connected to a first carriage via a carriage joint. The first carriage is movable along a first path, and the first support linkage is arranged to transfer a first movement to the support-platform. The PKM further comprises a second support linkage comprising one or more support-links each connected at one end to the support-platform via a support-platform joint, and at the other end connected to a second carriage via a carriage joint. The second carriage is movable along a second path, and the second support linkage is arranged to transfer a second movement to the support-platform. The PKM further comprises a third support linkage comprising two or more support-links, each connected at one end to the support-platform via a support-platform joint, and at the other end connected to a third carriage via a carriage joint, wherein the third carriage is movable along a third path, and the third support linkage is arranged to transfer a third movement to the support-platform. The first support linkage, the second support linkage and the third support linkage together comprise at least five support-links. The support-platform joints are further placed to the support-platform according to the optimal placement configuration outputted by the computer.

According to a fourth aspect, the disclosure relates to a parallel kinematic machine, PKM. The PKM includes a support-platform. The PKM also includes a first support linkage comprising of two or more support-links each connected at one end to the support-platform via a support-platform joint, and at the other end connected to a first carriage via a carriage joint. The first carriage is movable along a first path, and the first support linkage is arranged to transfer a first movement to the support-platform. The PKM further comprises a second support linkage comprising one or more support-links each connected at one end to the support-platform via a support-platform joint, and at the other end connected to a second carriage via a carriage joint. The second carriage is movable along a second path, and the second support linkage is arranged to transfer a second movement to the support-platform. The PKM further comprises a third support linkage comprising two or more support-links each connected at one end to the support-platform via a support-platform joint, and at the other end connected to a third carriage via a carriage joint. The third carriage is movable along a third path, and the third support linkage is arranged to transfer a third movement to the support-platform. The first support linkage, the second support linkage and the third support linkage together comprise at least five support-links. The first movement, the second movement and the third movement together position the support-platform in a base coordinate system, of which the X-axis is parallel with the direction of at least one of the first path, the second path and the third path. The Z-axis is in a direction of a normal of a plane defined by at least two of the first path, the second path and the third path. The Y-axis is orthogonal to the X-axis and the Z-axis. A first one of the support-platform joints of the first support linkage and a first one of the support-platform joints of the third support linkage are placed to the support-platform with a first distance between each other. A second one of the support-platform joints of the first support linkage and a second one of the support-platform joints of the third support linkage are placed to the support-platform with a second distance between each other, wherein the second distance is different from the first distance. A support-platform coordinate system is further defined with perpendicular axes Xsp, Ysp, Zsp with an origin at a connection point at a front face of the support-platform, wherein the Zsp-axis is in a direction of a normal of the front face. The first one of the support-platform joints of the first support linkage is placed to the support-platform at a fourth distance in the direction of the Zsp-axis from the connection point that is smaller than a fifth distance in the direction of the Zsp-axis from the connection point to the second one of the support-platform joints of the first support linkage. A first one of the support-platform joints of the third support linkage is placed to the support-platform at a sixth distance in the direction of the Zsp-axis from the connection point, that is smaller than a seventh distance in the direction of the Zsp-axis from the connection point to the second one of the support-platform joints of the third support linkage. The second one of the support-platform joints of the first support linkage is placed to the support-platform at an eight distance in the direction of the Xsp-axis from the first one of the support-platform joints of the first support linkage. The second one of the support-platform joints of the third support linkage is placed to the support-platform at a ninth distance in the direction of the Xsp-axis from the first one of the support-platform joints of the third support linkage.

Optimization simulations have shown that this configuration provides high stiffness, which is applicable for different applications. The obtained resulting placements of the support-platform joints, using the described method, makes it possible to use the PKM main structures in FIGS. 1, 15 and 17 with large work space for applications as friction stir welding and material removement processes in hard material, which was earlier possible only with extremely heavy and slow special designed machines. With the very high stiffness obtained with the support-platforms designed according to the placement of support-platform joints obtained by the described method, special designed monolithic machines can be replaced with modular PKM-structures that can be transported in parts and mounted and installed at the manufacturing site. All the moving parts will be lightweight and easy to handle and reconfigure and the lightweight modular structure will make it possible to obtain higher speed and acceleration and therefore shorter manufacturing cycle times, meaning higher productivity.

According to some embodiments, the second distance is greater than the first distance in the direction of the Ysp-axis.

According to some embodiments, the PKM comprises a shaft connected to the support-platform via a shaft joint at a connection point, wherein the connection point defines an origin of the support-platform coordinate system. This is a way to further increase the stiffness and simultaneously introduce tool rotation control.

According to some embodiments, the support-platform joints are placed in relation to a primitive volumetric body, e.g. a cylinder, a box or a sphere, of the support-platform. Simulations of the optimization have shown that high stiffness can be obtained by using such primitives.

According to some embodiments, the PKM comprises mechanical interfaces, and wherein the support-platform joints are connected to the primitive volumetric body via the mechanical interfaces. If the primitive volumetric bodies will not give sufficient stiffness for direct support-platform joint placement, mechanical interfaces are used to further increase the stiffness. These interfaces can then be made very stiff.

According to some embodiments, the PKM comprises one or more mechanical interfaces each connected between one of the carriages and a respective carriage joint(s), and wherein the one or more mechanical interfaces are designed such that the support-platform joints and the carriage joints are in the middle of their respective orientation working ranges, when the primitive volumetric body is centered in a plane defined by the Yb and Zb axes in the working range of the PKM. The design of the mechanical interfaces on the carriages will make it possible to obtain the best use of the working range of both the support and the carriage joints. This means that maximum workspace of the PKM will be obtained without problems with the working range of the joints. Thus, the mechanical interfaces are designed and arranged to enable maximum use of the working range of the joints to achieve maximum working range of the support-platform.

According to some embodiments, the second support linkage comprises two support-links, and the support-platform joints of the second support linkage are placed to the support-platform with a third distance between each other, wherein the third distance is greater than the first distance. This makes it possible to increase the stiffness of the PKM by optimizing the stiffness with respect to the ratio between the third distance and the first distance.

According to some embodiments, the third distance is greater than the first distance in the direction of the Ysp-axis.

According to some embodiments, the second support linkage comprises two support links and wherein the support-platform joints of the second support linkage are placed closer to a plane defined by the Xsp and Ysp axes than the second one of the support-platform joints of the first support linkage and the second one of the support-platform joints of the third support linkage. This will make it possible to further increase the stiffness.

According to some embodiments, wherein the first one of the support-platform joints of the first support linkage and the first one of the support-platform joint of the third support linkage are placed closer to a plane defined by the Xsp and Ysp axes than the support-platform joints of the second support linkage. This will make it possible to further increase the stiffness.

According to some embodiments, the second support linkage comprises two support-links, and the support-platform joints of the second support linkage are placed to the support-platform at a distance from the connection point that is smaller than the fifth distance and the seventh distance, in the direction of the Zsp-axis. This will make it possible to further increase the stiffness According to some embodiments, wherein the second support linkage comprises two support-links and wherein a first one of the carriage joints of the second support linkage or a second one of the carriage joints of the second support linkage is mounted on the first carriage or the third carriage.

According to some embodiments, the first distance is defined by a minimum implementable distance needed to mount the first one of the support-platform joints of the first support linkage and the first one of the support-platform joints of the third support linkage as close as possible to each other.

According to some embodiments, the PKM comprises one or more mechanical interfaces, each arranged between one of the carriages and a respective carriage joint, wherein the one or more mechanical interfaces are designed to maintain the kinematic features of the PKM. Further, the support-links of the first support linkage are parallel and have the same length. The support-links of the third support linkage are parallel and have the same length. The support-links of the second support linkage are parallel and have the same length.

According to some embodiments, the PKM comprises a shaft connected to the support-platform via a shaft joint at the connection point. Since the shaft joint will introduce the forces and torques from the tool to the support platform, it is important for obtaining maximum stiffness, according to the results of the described method, that the support-platform joints denoted 9a/12a are as close as possible to the shaft joint center, which therefore, in this case, should be defined as the connection point.

According to some embodiments, the first one of the support-platform joints of the first support linkage and the first one of the support-platform joints of the third support linkage are placed with minimum implementation distances to the shaft joint. In some embodiments, the support-platform further comprises a carbon-reinforced epoxy structure arranged between the support-platform joints. In this way it is possible to reduce the weight of the support platform and still have as high stiffness as implementing the support platform using for example steel components.

According to some embodiments, the PKM comprises a tool-base including the shaft joint, the shaft and a tool platform. The shaft is also connected to the tool platform. The PKM further comprises one or more tool linkages each comprising a tool link connected at one end via a tool-base joint to the tool-base, and at the other end connected via a carriage joint to a carriage arranged for movement along a path. One tool link of a tool linkage is parallel with and has the same length as one of the links of the support platform linkages. A tool link of another tool linkage is parallel with and has the same length as another one of the links of the support platform linkages. The tool base joints are mounted as close to each other as possible.

According to some embodiments, where either the first distance is smaller than the second distance, or the second distance smaller than the first distance.

According to some embodiments, the PKM comprises a tool-base including the shaft joint, the shaft and a tool platform. The shaft is also connected to the tool platform. The PKM further comprises one or more tool linkages each comprising a tool link connected at one end via a tool-base joint to the tool-base, and at the other end connected via a carriage joint to a carriage arranged for movement along a path. Each tool linkage is configured to rotate the shaft around at least one axis relative the support-platform, by transferring a movement of the respective tool linkage to the shaft. The tool base joints are mounted as close to each other as possible.

According to some embodiments, the support-platform is designed according to the optimal placements of the support-platform joints.

According to some embodiments, the support-platform comprises an actuator in-between the support-platform joints. In this way no offset is needed in the Zsp-direction for the actuator, which is achieved when the actuator is mounted on the front of the support platform. A smaller offset in the Zsp-direction will reduce the torques on the support platform and thus increase the stiffness. The actuator can be part of a wrist or be used for rotating a tool.

According to some embodiments, the actuator is connected to a tool. In this way no offset is needed in the Zsp-direction for an actuator, which is used to actuate a tool, and the stiffness with respect to tool forces and torques will increase.

BRIEF DESCRIPTION OF THE DRAWINGS

FIG. 1 illustrates a PKM according to one embodiment.

FIG. 2 defines a link with joints at the ends of the link, according to one embodiment.

FIG. 20A illustrates a guideway arranged on guideway holding brackets, according to some embodiments.

FIG. 20B illustrates a cross-section along A-A of the guideway mounting bracket in FIG. 20A.

DETAILED DESCRIPTION

Figure 3:
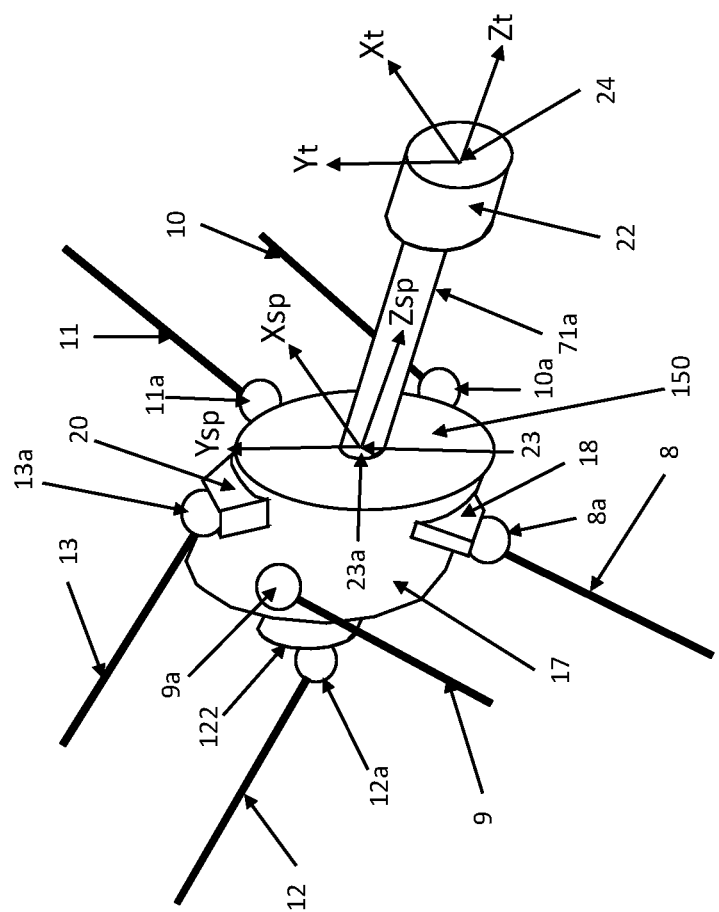
FIG. 3 illustrates an example of a three-dimensional (3D) support-platform may be implemented as a cylinder with mechanical interfaces. In this figure a support-platform and a tool coordinate system are defined.

The following describes a method for determining placement of joints of a PKM, a system comprising a computer configured to perform the method and to output an optimal placement configuration, and a PKM with joints that are placed to the platform according to the optimal placement configuration outputted by the computer, and a PKM with joints that have been placed in relation to its platform such that high stiffness can be achieved. The method estimates stiffness of the PKM for various possible placements of the joints, specifically the support-platform joints, to meet requirements on providing certain forces and torques with related high stiffness for minimum tool deviations in process applications such as friction stir welding. That is, the method determines joint placements that give high stiffness, thereby enabling the application. A support-platform may thereafter be designed that matches the determined placements of the support-platform joints. The linkages are attached by means of support-platform joints on the support-platform, independently of the geometry of the carriages. This means that the geometries of the carriages should be adapted to the structure of the optimal placement of the support-platform joints on the support-platform and not vice versa. The reason why this is the best strategy, is that it is easy to obtain high actuator stiffness for a carriage geometry adapted to the joint placements on the support platform. A typical carriage runs on a guideway using very high stiffness linear bearings and the torques obtained from carriage joints mounted with an offset from the carriage plane will only make a minor reduction of the overall PKM stiffness. If the support platform joints are placed to avoid offsets between carriage joints and carriage planes, a much higher loss in overall PKM stiffness would result. Hence, with the proposed technique a PKM can be designed that has a high stiffness adapted for a defined process application, whereby the process can be carried out more accurately. The described techniques make it possible to replace previously used special designed machines with PKM-structures that are more easily installed and operated, for performing work that requires high stiffness and large workspace.

A PKM is generally a mechanical system that comprises a plurality of linkages to support and move a platform. The linkages comprise one or more links each and the links are typically rigid. This provides for a high stiffness, which is a big advantage in most applications. Still, the links can be made in a lightweight material, such that the PKM can change the position and orientation of the tool very fast.

A kinematic model is a mathematical description of the relations between positions and speeds of the different moving parts of the PKM. Especially, the forward kinematics is the relation between the movements of the actuators and the movement of the end-effector, whereas the inverse kinematics is the movement of the end effector and the movements of the actuators. The end effector is typically a tool attached to the PKM. The position of the tool is defined by a TCP, Tool Center Point.

An elasticity model is a mathematical description of the relations between forces and moments applied to the components of the PKM and the resulting movements of the PKM because of compliance of the PKM structure and its components. Especially important is the relation between the forces and moments on the TCP and the resulting compliant movements of the TCP.

A geometric model is a mathematical description of the geometries of objects included in the PKM. Especially important are the coordinates of the surfaces of the objects in order to be able to calculate when collisions take place between the objects.

Stiffness of a PKM is the relation between the forces and moments applied on the TCP and the resulting compliant movements of the TCP. The forces and moments (Fx, Fy, Fz, Mx, My, Mz) are usually defined in a cartesian tool coordinate system and the resulting compliant movements of the TCP (dx, dy, dz, dRx, dRy, dRz) are usually described as the positional deviations and rotational deviations of the Tool Coordinate System. In many applications the stiffness can be approximated by the quota between total force and total positional deviation.

A joint placement means that each joint (number i) is positioned in a position (Xij, Yij, Zij) in a Cartesian coordinate system, for example in the platform coordinate system. A placement here is assumed to be a static location relative to some part of the machine, but in case of mechanisms that by actuation moves that location, the method can be applied to all the possible locations, and hence the static locations are sufficient for the method.

A force is defined by its three components in a Cartesian Coordinate system (Fx, Fy, Fz). Sometimes the total force is used (square root of the sum of the squares of the three Cartesian force components). In the simulations the force components on the tool can be obtained from a model of the applied process, or registered from physical measurements, and then applied at sampling points along a trajectory or at points in a matrix of the workspace. The registered force values are then used in the optimization process.

A torque or moment is defined by its three components in a Cartesian Coordinate system (Mx, My, Mz). In simulations the moment components on the tool because of the applied process are registered at sampling points along a trajectory or at points in a matrix of the workspace. The registered moment values are then used in the optimization process. In some applications the moments are negligible and only forces are registered for the optimization.

In this disclosure, the same references are used for the same features in all figures and the references will sometimes not be repeated if already mentioned.

FIG. 1 illustrates a PKM without a support-platform. A support-platform 17 for use in the PKM of FIG. 1 is instead illustrated in FIG. 3. The PKM in FIG. 1 and the support-platform in FIG. 3 together illustrate one embodiment of the disclosure. It is intended that the support-platform 17 is designed using the method for determining placement of the support-platform joints, whereby an optimal shape of the support-platform 17 with respect to stiffness and accessibility that matches the placements of the support-platform joints can be decided such that a reliable connection of the support-platform joints to the support-platform 17 can be made. In the following, the structure of the PKM will be described.

The PKM is actuated by means of actuators. Each actuator comprises a path 1, 2, 3, on which a carriage 4, 5, 6 is moved by means of an actuation equipment as for examples a rack-and pinion system or a ball screw system (not shown). Thus, a first carriage 4 is moved on a first path 1, a second carriage 5 is moved on a second path 2, and a third carriage 6 is moved on a third path 3. A path is for example a guideway. The path is typically linear but may instead have a bent shape. For applications needing high stiffness manipulation, actuators such as motor driven ball screws, rack-and pinion or direct drive solutions may be used to move the carriages along the paths. In other words, in some embodiments, the PKM comprises a first actuator 201 for moving the first carriage 4 along the first path 1, a second actuator 202 for moving the second carriage 5 along the second path 2, and a third actuator 203 for moving the third carriage 6 along the third path 3. In case of more carriages, the PKM comprises actuators for moving also these carriages along the paths. In FIG. 1, the paths are mounted on a framework, not shown in the figure, in such a way that the three paths are linear, parallel paths. Hence, in some embodiments, the first path 1, the second path 2 and the third path 3 are parallel. One path (here the second path 2) is positioned between the two other paths (here the first path 1 and the third path 3). The paths 1, 2, 3 are defined in a base coordinate system 7b. This coordinate system has its Xb-axis parallel with the paths 1-3, and the Zb-axis is perpendicular to the plane defined by the first path 1 and the third path 3. In FIG. 1 the axes of the base coordinate system 7b are parallel with corresponding axes of the world coordinate system 7a. However, dependent on the installation- and application requirements, the paths can be mounted in different ways, for example with the base coordinate system rotated around the Zw- or Xw-axes of the world coordinate system 7a. The second path 2 is in the figure mounted at a negative Zb-value 6c, making it possible to obtain a workspace 6b reaching all the way to the plane defined by the first path 1 and the third path 3 (at low Zb-values). The second carriage 5 is illustrates in two different positions SL2_P1 and SL2_P2, illustrating two different assembly modes of the machine. Generally, it is possible to obtain higher stiffness when the second carriage 5 is in the assembly mode illustrated with position SL2_P1 than in SL2_P2, but then the paths need to be longer for the same workspace in the Xb-direction. For very long work objects as airplane fuselages and wings, trains, wind powerblades, building-components etc., the difference in path length will however not be that important and in these applications the carriage assembly mode should be as illustrated with the second carriage 5 as in the position SL2_P1, where the second carriage 5 is on the opposite side of the support-platform 17 in the Xb-direction than the first and third carriages 4 and 6. When using the assembly mode according to position SL2_P2 the distance 6c, thus the offset of the second path 2 in the minus Zb-direction, must be large enough to obtain high stiffness. In the assembly mode according to position SL2_P1 it is possible to mount the middle (second) path 2 with lower values of the distance 6c and it is also possible to have the distance 6c in the minus Zb direction to be zero. In this case the workspace 6b of the PKM, which is parallel with the YbZb-plane, will not be useful at low Zb-values because of high link forces and therefore low stiffness. However, it will be easier to implement the framework for the paths when all paths are in the same plane. Also, the framework for mounting the linear actuators will be simpler and it will even be possible to mount the paths directly on the floor, on a wall, or on the ceiling.

The PKM in FIG. 1 also comprises a first support linkage SL1, a second support linkage SL2, and a third support linkage SL3. Each of the support linkages SL1, SL2, SL3 is configured to be connected between one of the mentioned carriages 4, 5, 6 and a support-platform 17, for example the support-platform 17 illustrated in FIG. 3. The first support linkage SL1 here comprises two support-links 8, 9. Each of the two support-links 8, 9 is configured to be connected at one end to the support-platform 17 via a support-platform joint 8a, 9a, and at the other end connected to (thus also configured to be connected to) the first carriage 4 via a carriage joint 8b, 9b. As mentioned, the first carriage 4 is movable along the first path 1, and the first support linkage SL1 is arranged to transfer a first movement to the support-platform 17, when connected thereto. The second support linkage SL2 comprises one or more support-links 10, 11, here two support-links 10, 11. Each one of the one or more support-links 10, 11 is configured to be connected at one end to the support-platform 17 via a support-platform joint 10a, 11a, and at the other end connected to (thus configured to be connected to) the second carriage 5 via a carriage joint 10b, 11b. As mentioned, the second carriage 5 is movable along a second path 2, and the second support linkage SL2 is arranged to transfer a second movement to the support-platform 17, when connected thereto. The third support linkage SL3 comprises one or more support-links 12, 13, here two support-links 12, 13. Each support-link 12, 13 is configured to be connected at one end to the support-platform 17 via a support-platform joint 12a, 13a, and at the other end connected to (thus configured to be connected to) the third carriage 6 via a carriage joint 12*b*, 13*b*. As mentioned, the third carriage 6 is movable along a third path 3, and the third support linkage SL3 is arranged to transfer a third movement to the support-platform 17 when connected thereto. The first support linkage SL1, the second support linkage SL2, and the third support linkage SL3, together comprise six support-links 8, 9, 10, 11, 12, 13. However, in other alternatives, the first support linkage SL1, the second support linkage SL2 and the third support linkage SL3 together comprise five support-links 8, 9, 10, 12, 13. The first movement, the second movement and the third movement positions the support-platform 17 in a base coordinate system Xb, Yb, Zb (7*b*), of which the X-axis Xb is parallel with the direction of at least one of the first path 1, the second path 2 and the third path 3, and the Z-axis Zb is in a direction of a normal of a plane defined by at least two of the first path 1, the second path 2 and the third path 3. The Y-axis Yb is orthogonal to the X-axis Xb and the Z-axis Zb (see for example FIG. 1, 7*b*).

In FIG. 1, the first carriage 4 is provided with a first mechanical interface 14. The third carriage 6 is provided with a second mechanical interface 15. In alternative embodiments, the carriages are not provided with such mechanical interfaces. A purpose of these mechanical interfaces is to adapt the carriage-mounting of the carriage joints 8*b*, 9*b*, 12*b*, 13*b* for the support-links 8, 9, 12, 13 of the first support linkage SL1 and the third support linkage SL3 to an optimal mounting of the support-platform joints 8*a*, 9*a*, 12*a*, 13*a*, on the support-platform 17. This is made under the requirements that for each carriage the thereto connected two links of a support linkage SL1, SL3 must be parallel and have the same length. Thus, one or more of the first support linkage SL1, the second support linkage SL2 and the third support linkage SL3 comprises two parallel support-links. The two parallel support-links have the same length. In FIG. 1, each support linkage has two links that are parallel and have the same length. Although not illustrated, also the second carriage 5 may be provided with a mechanical interface, and the same requirement is then applicable also for the thereto connected second support linkage SL2. As pointed out earlier, the bearings between the carriages 4, 5, 6 and the paths 1, 2, 3 can be made very stiff, why it is no problem from stiffness point of view to introduce offsets between the carriage joints and a standard mechanical carriage mounting interface. It is more important is to adopt optimal mounting positions of the support-platform joints on the support-platform 17.

FIG. 2 illustrates one of the six links in FIG. 1. Each link is attached (optionally via mechanical interface) to one of the carriages with a carriage joint Na having three Degrees of Freedom (DOF) and to the support-platform 17 with a support-platform joint Nb having two or three DOF. In some embodiments, for example when ball joints are used, also the support-platform joint has three DOF. "N" here represents any of the numbers of the joint references.

When designing the support-platform 17, it is an advantage to start with a model of a PKM, e.g. the PKM in FIG. 1, thus a PKM without the support-platform 17, and find the optimal placement of the six (or five) support-platform joints 8*a*, 9*a*, 10*a*, 11*a*, 12*a*, 13*a* and thereafter match the mechanical platform geometry, also in some embodiments including mechanical joint interfaces, to the optimal joint placement. In the following a method for determining placement of support-platform joints 8*a*, 9*a*, 10*a*, 11*a*, 12*a*, 13*a* will be described, with reference to the schematic modules in FIG. 4A, and the flowcharts in FIGS. 5-7C. Also, placement of other joints of the PKM may be determined using the method, but the focus here is mainly on the support-platform joints.

FIG. 3 illustrates a three-dimensional (3D) support-platform 17 with mounted support-platform joints 8*a*, 9*a*, 10*a*, 11*a*, 12*a*, 13*a*. In this case the support-platform 17 is simply a cylinder with external mechanical interfaces 18, 19, 20 in order to adapt the simple cylinder geometry to the placements of the support-platform joints 8*a*, 9*a*, 10*a*, 11*a*, 12*a*, 13*a*. The support-platform 17 here has a front face 150 and an opposite back face (not shown). The support-platform 17 comprises a process actuator (not shown), to which a tool 22 is connected via a tool shaft 71*a*. FIG. 3 also defines a support-platform coordinate system 23 with the axes Xsp, Ysp and Zsp, and the tool coordinate system 24 with the axes Xt, Yt and Zt. The support-platform coordinate system 23 has its origin at or in a connection point 23*a*. The connection point 23*a* may be defined (as a center of) at a front face 150 of the support-platform 17. The Zsp-axis is in a direction of a normal of the front face 150. The axes of the support coordinate system 23 may be defined to be parallel with the axes of the base coordinate system 7*a*. Inside the cylindrical support-platform 17, the process actuator as for example a spindle motor may be mounted to drive a tool shaft 21, on which the tool 22 is mounted. The optimization of the attachment positions of the support-platform joints 8*a*, 9*a*, 10*a*, 11*a*, 12*a*, 13*a* is made with the actual or simulated forces and/or torques that act on the tool for the specific process when the tool is moved to different positions in the work space of the PKM according to the program specified.

FIGS. 4-7C illustrates embodiments of a method for determining placement of support-platform joints 8*a*, 9*a*, 10*a*, 11*a*, 12*a*, 13*a* on a support-platform of a PKM. The PKM is for example the PKM as illustrated in FIG. 1, and the support-platform is for example the support-platform 17 illustrated in FIG. 3. It should be understood that when the method is performed, different models of the PKM are used to find optimal placements of the joints. Especially important are the kinematic model and the elasticity model.

FIG. 4A illustrates computer implementable modules configured to implement the embodiments of the method. The modules comprises an Optimization Module OptMod, a Computer Aided Design (CAD) Geometry Engine Module CAD_GEM and a Stiffness Calculator Module SCM. The OptMod comprises a computer program configured to perform the method together with the CAD_GEM and the SCM. The CAD_GEM is for example a traditional CAD system, configured to perform geometric and kinematic calculations. The SCM is configured to estimate parameters indicative of stiffness of the PKM in a current configuration. The SCM is configured to communicate with the CAD_GEM via the OptMod. The modules may be implemented by a computer 400 (see FIG. 4B) in software and/or hardware. The computer 400 comprises a processor and a memory. The memory comprises computer instructions configured to perform the method according to any one of the embodiments described herein, when then computer instructions are executed by the processor. In some embodiments, the computer 400 is configured to receive sensor data from one or more force or torque sensors 410 arranged to measure forces or torques, respectively, applied to a tool 22 attached to the support-platform 17 during the processing sequence with the tool 22. The computer 400 may be configured to display the result of the method on a display 420 connected to the computer. The result is for example model output from the CAD_GEM, such as CAD models, model details at collisions, or a complete machine model of the PKM. Other results is for example output parameters from the OptMod, such as one or more of mean stiffness, average stiffness, mean TCP position deviation, maximum TCP position deviation, mean tool attitude deviation, max tool attitude deviation, stiffness map over the workspace, mean link forces, maximum link forces, links with highest forces, mean actuator forces, maximum actuator forces, actuators highest forces, mean forces from carriages on the framework and max forces from carriages on the framework.

Most of, or all, the steps of the method can be performed automatically. In some embodiments, the operator makes an initial design, for instance following the rules in FIGS. 8, 9 and 10 in combination with all the mechanical constraints that the operator is aware of. Then the OptMod takes over to improve the initial design and an iteration may follow between the OptMod and the operator to further improve the result. The operator may give one or more of the following as operator inputs to the CAD_GEM: parameter adjustments, modifications of models, initial support-platform joints placement, and mechanical interface models. In some embodiments, at least the estimating S1 and the checking S2 processes that will be explained in the following are performed automatically.

A plurality of data is needed before the optimization method can start. For example, the method comprises obtaining S0a a kinematic model of the PKM. Typically, the operator defines the kinematic model of the PKM using CAD models of the components included in the PKM, that is, the support-platform, the joints, carriages, paths, links, tool etc., in the CAD_GEM. The stiffness of the critical components may also be calculated and stored. In some embodiments, the kinematic model comprises limitations of the working range of the support-platform joints 8a, 9a, 10a, 11a, 12a, 13a, and in some other embodiments also of other joints. The operator connects the components and defines the placements or poses of the coordinate systems, the placements of the paths (e.g. the Yb and Zb values of the paths) and the placements of the joints to obtain an initial design of the machine in the middle of the workspace. When a complete initial CAD model including an elasticity model is ready in the CAD_GEM, a reduced parameter set for the kinematic and elasticity models is sent to the Optimization Module, OptMod.

The method also comprises defining S0b forces and/or torques applied to a tool 22 attached to the support-platform 17 during a processing sequence with the tool 22. The forces and/or torques may be defined in a Tool Center Point (TCP). The TCP is typically set by the operator. In some embodiments, the defining S0b comprises simulation or real program execution during which forces and/or torques on the tool 22 are estimated. Simulation means that the processing sequence is simulated using a model of the PKM and the tool, and the forces and/or torques applied to the tool during the simulation are estimated. These forces and/or torques may thereafter be used in the optimization. Real program execution here means that a real, physical PKM is used to execute the application program, during which execution the forces and/or torques on the tool are measured. Thus, real sensors may be arranged to sense the forces and/or torques applied to the tool during the processing sequence using a real PKM executing a program.

Figure 9:
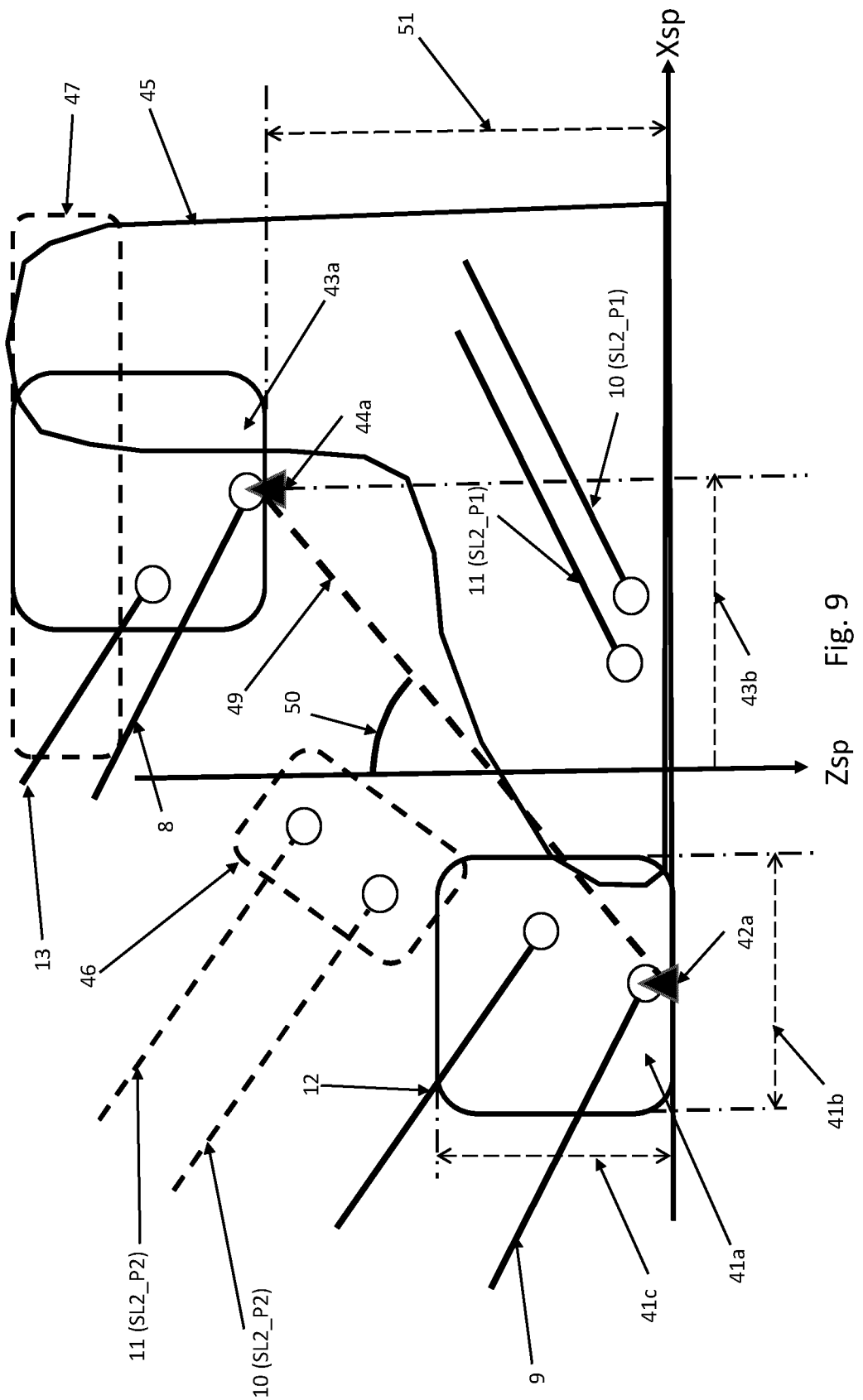
FIG. 9 defines parameters in the XspZsp-plane of the platform coordinate system to describe a structured optimization method for the placement of the support-platform joints.
Figure 10:
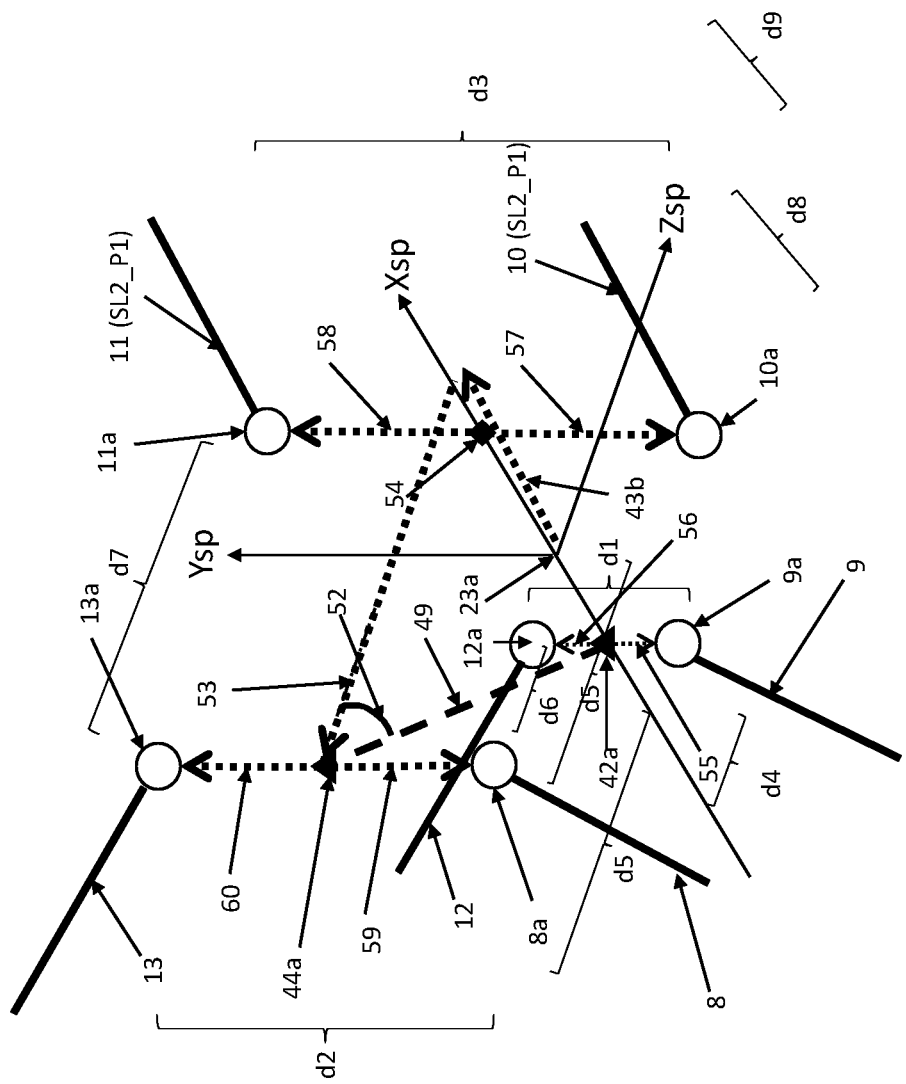
FIG. 10 defines a sub space of the parameters in FIG. 9 to simplify the optimization process.

In order to start the optimization, it is beneficial if starting values of the placements of the joints can be provided. Thus, the method comprises obtaining S0c a current placement configuration including initial placements of the support-platform joints 8a, 9a, 10a, 11a, 12a, 13a in relation to the support-platform 17. The initial placements are for example any of the placements that are illustrated in FIGS. 9-10. In some embodiments, the initial placements of the support-platform joints 8a, 9a, 10a, 11a, 12a, 13a are limited by a primitive volumetric body 110 having a primitive volumetric shape such as a cylinder, a box or a sphere. This shape is also visualized in the FIG. 12, 13B-13C, 14B or 16B. Thus, the support-platform joints 8a, 9a, 10a, 11a, 12a, 13a are placed in relation to a primitive volumetric body such as a cylinder, a box or a sphere, of the support-platform 17. The support-platform joints 8a, 9a, 10a, 11a, 12a, 13a may then be placed at predetermined places along the primitive volumetric body. In other words, the support-platform joints 8a, 9a, 10a, 11a, 12a, 13a may be placed at predetermined places in a three-dimensional geometry. The current placement configuration including initial placements is for example defined by an operator.

The operator may initially set the joints to the initial placements in the CAD model of the PKM. Alternatively, the placement of the joints in the initial placement is done automatically by the optimization program. With joints is here meant the support-platform joints and optionally the carriage joints and any other joints for example when a tool-base is used. Thus, in some embodiments, the obtaining S0c a current placement configuration including initial placements of the support-platform joints 8a, 9a, 10a, 11a, 12a, 13a comprises defining the initial placements of the support-platform joints 8a, 9a, 10a, 11a, 12a, 13a. In some embodiments, the obtaining SOC also comprises obtaining an initial placement of the TCP. The TCP is typically placed in the middle of the workspace 6b. The OptMod (see FIG. 4A) sends initial kinematic parameters to the SCM before the iteration starts, e.g. the initial placements of the joints and the TCP. In some embodiments, the obtaining S0c also comprises obtaining other kinematic initial parameters such as initial carriage joint placements. Also, these parameters are then sent from the OptMod to the SCM. All the initial kinematic parameters may be defined in the platform coordinate system. If a wrist, also referred to as tool-base, is mounted on the support-platform 17, also the wrist kinematics is included. The initial parameters may also include the parameters indicative of stiffness, e.g. stiffness values, of the components, such as the joints, links, platform parts, carriages and in the case of a wrist also the wrist stiffness. In some embodiments, the method comprises obtaining S0d limitations for joint mounting placements.

The OptMOd may also obtain input parameters D1 including one or more of workspace limits, position matrix density (thus density of poses in a position matrix), maximum allowable joint angles, allowed area or volume for joint movements, not to interfere with the support-platform 17, maximum number of optimization steps (or minimum improvements per step), and stiffness specification parameters such as minimum stiffness specifications and mean stiffness specifications. The minimum stiffness specification for example includes a predetermined stiffness value defining the target stiffness for the PKM. These parameters will be introduced to the system by the operator either directly, or alternatively via the CAD_GEM. In the latter case, these input parameters are included in the data D1 in FIG. 4A. The maximum allowable joint movements during optimization are for example maximum allowed deviations in the Xsp, Ysp, Zsp-directions from the initial support-platform joints placements. Thus, the following parameters should be known with respect to the application that the PKM will be used for:

The workspace and orientation preferences (for some application processes, e.g. welding, where the tool should have a certain orientation) for the tool in the base coordinate system 7.

The relation between the tool coordinate system 24 and the support-platform coordinate system 23.

Forces and/or torques in the tool coordinate system 24.

Max allowed position deviations because of PKM compliance in the x-, y- and z-directions of a defined coordinate system, as for example the base coordinate system 7.

Max allowed tool orientation errors around the x-, y- and z-axes of for example the tool coordinate system 24.

It is also beneficial to know the constraints for the PKM, such as:

Stiffness of links and joints.
Stiffness of platform structure.
Stiffness of linear actuators and path system.
Stiffness of framework on which the paths (guideways) are mounted.
Geometry of the support-platform (to avoid link collisions).

When necessary initial steps have been carried out, the method starts with performing the optimization method. During the optimization, and as will be exemplified when explaining the method steps, the different modules OptMod, CAD_GEM and SCM exchange data and other information. For example, the CAD_GEM sends one or more of the data D1 to the OptMod. The OptMod may send data D2 such as new support-platform joint placements, optimization flags (ready, error etc.) or optimization output parameters for indication on CAD model, to the CAD_GEM. The SCM may send data D3 such as stiffness value, TCP position deviation, tool attitude deviation, link forces, actuator forces, framework forces or error flag to the CAD_GEM. The OptMod may send data D4 such as one or more of forces and torques at TCP, kinematic model parameters, stiffness values of components, support-platform joints placements, carriage joints placements, TCP and optional wrist kinematics.

The method comprises estimating S1 parameters indicative of stiffness for the PKM, based on the kinematic model and elastic model of the PKM and chosen defined forces and/or torques applied to the tool during the processing sequence, when the support-platform joints 8a, 9a, 10a, 11a, 12a, 13a are located in places defined by the current placement configuration onto the support-platform 17. The first time the estimation is made, the current placement configuration includes the initial placements of the support-platform joints. The current placement configuration is thus the present placement configuration of the joints in the CAD-model. The chosen defined forces and/or torques is a subset of all the forces and/or torques applied to the tool during the processing sequence. As explained, the forces and/or torques may be estimated values from simulation, or actual measured values. The parameters indicative of stiffness are for example parameters such as stiffness values that are estimated or calculated values in a matrix of positions in the Yb-Zb workspace.

Generally, the SCM generates parameters indicative of stiffness, e.g. stiffness values, for the selected support-platform joint placements. A stiffness value could be just the total force divided by the total compliance (positional and rotational errors added) of the PKM or separate values for different force- and compliance directions. Also, the stiffness with respect to torque can be calculated as torque divided by rotational and positional compliance of the PKM. The operator may thereafter adjust the placements of the support-platform joints to learn which support-platform joint placements that are most critical and in what directions that the support-platform joints should be moved to increase the stiffness. This procedure can preferably be made automatically, without operator interaction, as will be explained in the following. A useful procedure is to move the TCP in the center of the workspace and define a matrix of TCP positions. The CAD_GEM may then automatically generate the kinematic parameter values for the matrix positions and the SCM may generate the mean and minimum stiffness values on the matrix positions for the whole workspace.

In some embodiments, the SCM obtains link forces of the PKM from solving an equation system achieved by the requirement that the sum of all forces acting on the support-platform 17 must be zero and that the sum of all torques acting on the support-platform 17 must be zero. This is possible since the TCP and all the support-platform joint coordinates are known as well as the tool forces and torques, and the directions of the support-links (carriage joint position minus support-platform joint position). Due to the quasi-static character of stiffness analysis, dynamic inertial forces are omitted. Thus, in some embodiment, the estimating S1 comprises estimating link forces with the requirement that the sum of all forces acting on the support-platform 17 is zero, and the sum of all torques acting on the support-platform 17 is zero. When the link forces have been calculated, the stiffness values of the links, joints and other components through which the link forces are transmitted, are used to calculate the length deviations of the links because of the link forces. Knowing the length deviations of the links, a new equation system can be solved, defining the position- and orientation errors of the support-platform needed to fit the length deviations of the links. This equation system is possible to solve since the support-platform and carriage joint positions are known without link lengths deviations. From the calculated position and orientation error of the support-platform, the TCP position error is calculated as well as the orientation error of the tool coordinate system. With the known tool forces and torques, stiffness parameter values can then be estimated, e.g. calculated, and sent to the OptMod.

After step S1, the method comprises checking S2 whether the estimated parameters indicative of stiffness of the PKM fulfill one or more stiffness criteria. In one embodiment, the one or more stiffness criteria S2a comprises that no collision is detected between a geometric model of the support-links, and a geometric model of the support-platform 17. Thus, in each placement collision is tested. In another embodiment, the one or more stiffness criteria S2b comprises that no joint limit is reached based on obtained limitations for joint mounting placements. A limitation for joint mounting placement defines, for example, a mechanical constraint of the joint.

In a further embodiment, the one or more stiffness criteria S2d comprises that a current minimum of the estimated parameters indicative of stiffness is equal to or above a predetermined stiffness value. The predetermined stiffness value defines a target stiffness of the PKM. The target stiffness of the PKM is defined by the operator to suit the application at hand. Thus, none of the estimated parameters indicative of stiffness is allowed to be lower than the predetermined stiffness value (or equivalent predetermined parameter indicative of stiffness value). This is checked by selecting the minimum of the estimated parameters indicative of stiffness in the S1-step and comparing this value with the predetermined stiffness value. The current minimum of the estimated parameters indicative of stiffness refers to the current minimum of the estimated parameters indicative of stiffness of the current placement configuration.

Upon the estimated parameters indicative of stiffness fulfilling one or more stiffness criteria of the PKM, the method comprises choosing S3 the current placement configuration as an optimal placement configuration of the support-platform joints. Typically, the estimated parameters that are indicative of stiffness should fulfill two or more, in some embodiments all, of the one or more stiffness criteria, in order to choose S3 the current placement configuration as a potentially optimal placement configuration. When the optimization is ready, the SCM may provide latest values on pose deviation, link forces, actuator forces, framework forces etc. to the operator. If a wrist is used, also internal forces and moments in the wrist are provided to the operator. In particular, if no collision has occurred, no joint limit is reached, and a current minimum of the estimated parameters indicative of stiffness is equal to or above a predetermined stiffness value, then the placements are determined to be optimal placements, then results are reported, the CAD model updated and the operator may proceed with the design work, see FIGS. 7A-7C. In some embodiments, if the obtained current minimum of the estimated stiffness value is higher than the previous best minimum stiffness value, the obtained current minimum stiffness value is stored as the new best minimum stiffness value. If the value is higher than or equal to the specified stiffness for the application, thus the predetermined stiffness value, the optimization procedure is stopped. Otherwise a new iteration is made.

Upon the estimated parameters indicative of stiffness not fulfilling one or more stiffness criteria of the PKM, the method comprises changing S4 a placement of one or more support-platform joints 8a, 9a, 10a, 11a, 12a, 13a in the current placement configuration and repeating the estimating S1 and checking S2 processes with the changed current placement configuration. Thus, the method is iterated until the one or more stiffness criteria are fulfilled. An unfulfilled stiffness criterion means for example that a collision has occurred, or a joint limit has been reached, or that a stiffness target has not been reached. Thus, in each placement collision is tested and if collision occurs, at least one support-platform joint will get a new placement and a new iteration is made. It should be understood that the changing of placements is made on the model on the computer, and not on a physical model. Thus, the initial support-platform joint placements are tested for collisions and joint limits violations, and if one or both has taken place, the OptMod or the operator finds new support-platform joint placements. The operator must do this when a low automatization level has been implemented. When new joint placements have been made after collision or joint limits violation, new tests are made of collision and joint limits in step S2. If there are no collisions, and the joint angles are inside their working ranges, the stiffness is calculated and tested relative the specified value. If the stiffness is below specification, the OptMod makes use of its optimization algorithm to calculate new support-platform joint placements. In more detail, if no collision has occurred, and no joint limits are violated, the minimum stiffness value found in the workspace is compared with previous best minimum stiffness value. If minimum stiffness value is lower than previous best stiffness value a new iteration is made. In some embodiments, the method comprises checking S4a if a maximum number of iteration steps has been made. The number of iterations is e.g. incremented by a counter. If the number of iterations is equal to a maximum predetermined number, it is decided that enough iterations have been made and the method continues to step S3. Thus, if the maximum number of iterations has been made, the optimization is stopped, and the results are reported. The operator may thereafter take over to solve the problem, for example test with a design having larger platform dimensions. Otherwise, if the maximum number of iterations has not been made, the method continues to step S1 in FIG. 5. Thus, if repetitions have not reached the maximum number of iterations, the method proceeds with estimation of stiffness, collision tests and joint limits tests.

At each iteration, the OptMod sends new kinematic data to the SCM and the SCM responds with estimated parameters indicative of stiffness. When new support-platform joint placements are defined, also the placement of the carriage joints are updated to preserve the kinematics of the PKM with for example link pairs forming parallelograms. In each iteration new joint placements may be found by using for example the Complex Method, a genetic algorithm or a gradient-descent algorithm. If a collision is found or if any joint limit is reached, the SCM stops in the corresponding tool position in the defined workspace and the operator can intervene and make necessary adjustments of support-platform joint placements. If a low minimum stiffness value is found in a certain tool position, the CAD_GEM can move to this tool position and the operator can adjust support-platform joint placements in order to find a way to increase the stiffness in this tool position. For each support-platform joint placement change, the SCM will generate a new stiffness value.

In some embodiment, the method comprises replacing S2c a previous minimum stiffness value with a current minimum of the estimated parameters indicative of stiffness, upon a current minimum of the estimated parameters indicative of stiffness being greater than the previous minimum stiffness value. This step typically also requires that the stiffness criteria S2a and S2b are fulfilled.

The OptMod may use other parameters than the stiffness in the optimization process, as for example TCP-deviation or max link force. Independent of which parameter that is the subject during the optimization, the same optimization technique can be used.

Figure 4:
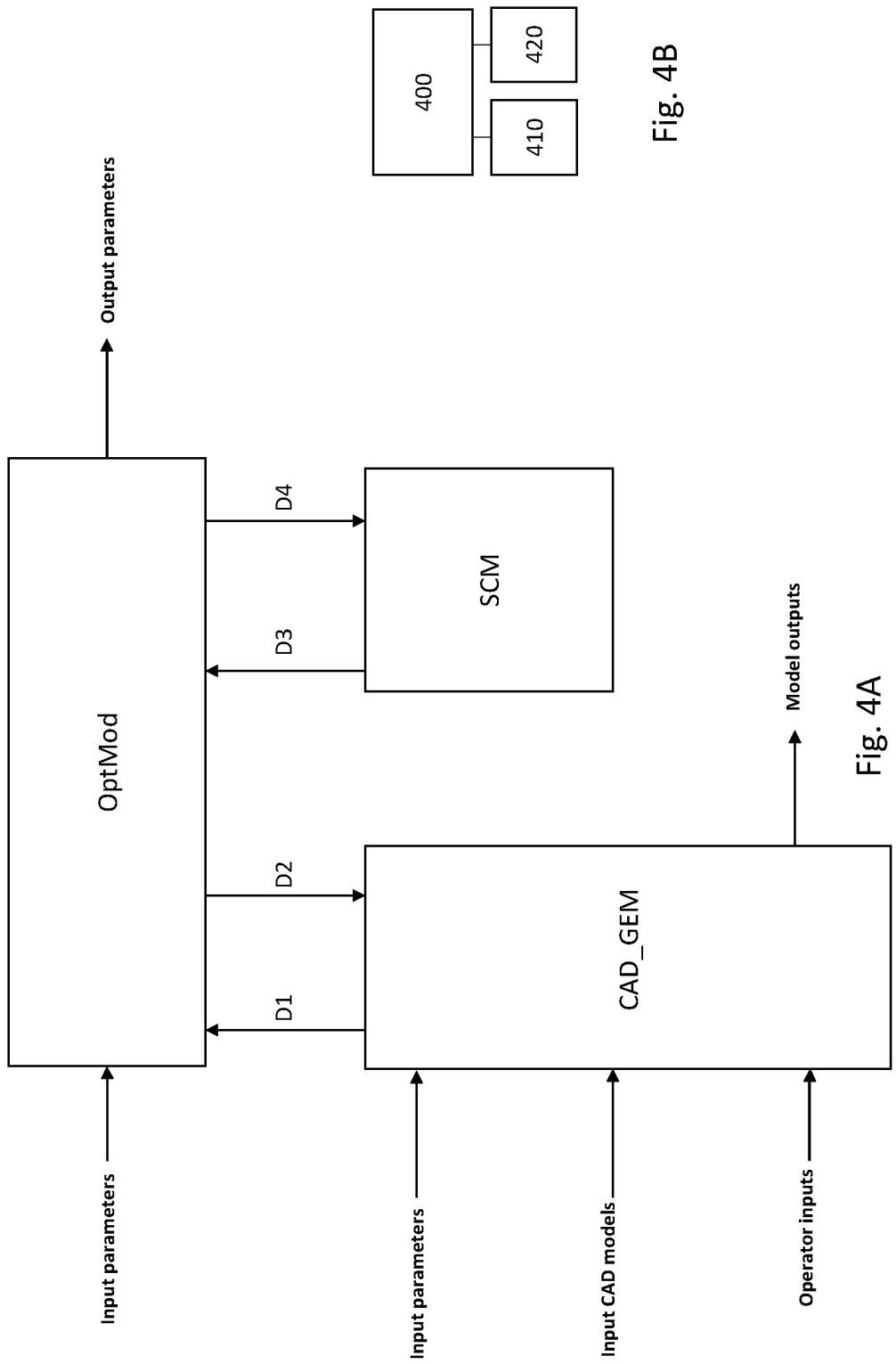
FIG. 4A illustrates a schematic of computer implementable modules configured to accomplish the method.
FIG. 4B illustrates a system comprising a computer configured to implement the modules of FIG. 4A.

Returning to FIG. 4A, in some embodiments, the CAD_GEM handles the position matrix and the OptMod asks (see D2) for new positions from the CAD_GEM. This is an example of the problem where different calculations should be made and as a tradeoff, the more that is made in the optimization cycle by the CAD_GEM, the slower the optimization will be. Therefore, it is an advantage if a position matrix is generated by the OptMod and it is also possible to give the OptMod the responsibility for the joint working range limits and even collision detection. However, this means a higher complexity when implementing the OptMod and the OptMod interface in the CAD_GEM will expand. In the system of FIG. 4A, the OptMod takes care of the position matrix but both joint working range and collisions are supervised by the CAD_GEM and therefore the OptMod only needs to communicate the latest support-platform placements that have been calculated to the CAD_GEM and the CAD_GEM will stop the optimization if joint limits have been reached or collisions have taken place. When the OptMod has reached its goal or consumed number of accepted iterations, it will send achieved values on stiffness, link forces, actuator forces, framework forces etc. to the CAD_GEM for display to the operator. Thus, in some embodiments, the method comprises displaying S5 the kinematic model to the operator. Other kinds of result from the method may also be displayed to the operator, e.g. via the display 420 (FIG. 4).

If an optimal placement configuration has been chosen in step S3, but the maximum number of iterations has been made (step S4$a$), a re-design should be made in a step S6. The method then returns to step S0$c$, where new initial placements of the support-platform joints 8$a$, 9$a$, 10$a$, 11$a$, 12$a$, 13$a$ are chosen and the method is repeated. Alternatively, if an optimal placement has been chosen and no re-design is needed (maximum number of iterations not reached), the method continues to step S7 in FIG. 7A. However, to avoid local optima, the method may be repeated for different initial placements of the six support-platform joints.

Figure 7A:
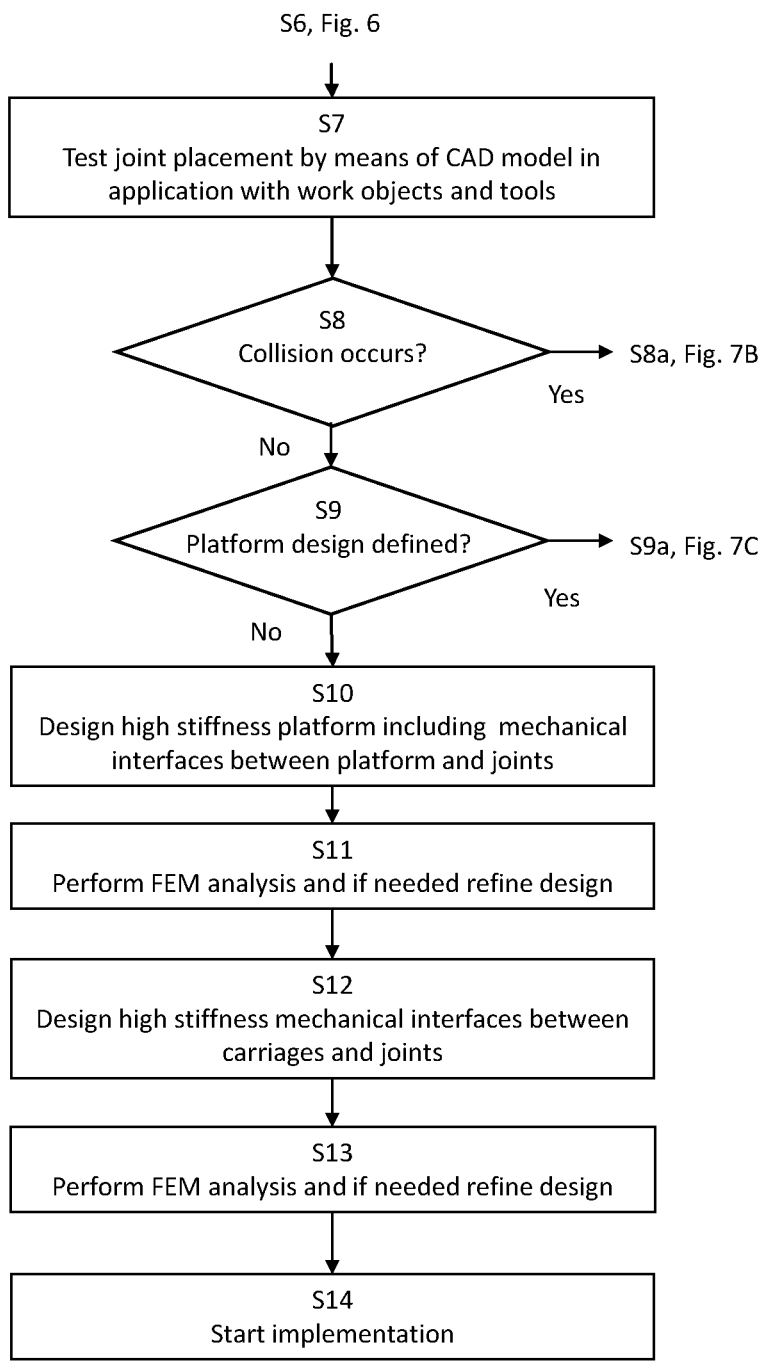
Figure 7B:
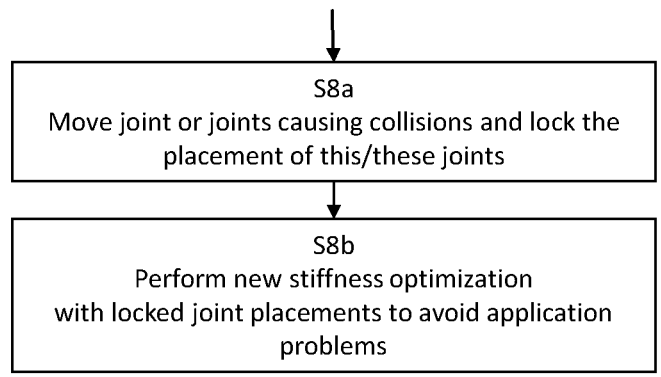
Figure 7C:
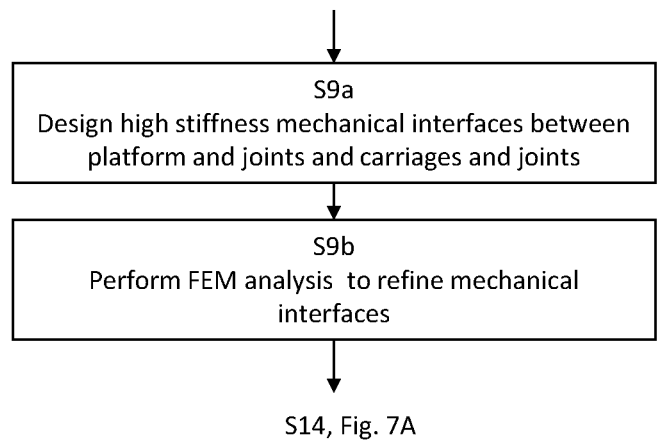

FIGS. 7A-7C illustrate how the optimal placement configuration may be tested. Thus, in some embodiments, the method comprises testing S7 joint placement by means of CAD model in application with appropriate work object(s) and tool(s). Thus, a simulation with the optimal placement configuration is performed. In the simulation, the CAD model with the optimal support-platform joint placement is tested in the whole workspace with respect to the accessibility on the work object using the end-effector to be used. One way of doing this is to run the application program(s) and if collisions occur between for example support-links and the work object at hand, the support-platform joints are to be moved to another placement to avoid the problem. The CAD model then makes a corresponding displacement of the carriage joints. Thus, in some embodiments, the method comprises testing S8 if collision occurs, e.g. between the CAD model and the work object. If collision occurs, the method continues to step S8$a$ in FIG. 7B, comprising displacing support-platform joints that cause collisions and locking the placement of these support-platform joints. Thereafter the method continues to step S8$b$, comprising a new stiffness optimization with locked support-platform joint placements to avoid application problems. This is accomplished by returning to step S1 and continue with the new locked support-platform joint placements as initial placements. When collision free mounting placements have been found for the support-platform joints connected to the support-links causing collision problems, the placements of these support-platform joints are locked (and cannot be moved by the optimization algorithm) in the initial support-platform joints placement when a new stiffness optimization is performed. In the case that no collisions occur in step S8, and the support-platform design is locked in step S9 e.g. because of the application requirements, the operator starts designing S9$a$ (FIG. 7C) the mechanical interfaces between the support-platform 17 and the support-platform joints. The mechanical interfaces should be high-stiffness mechanical interfaces. In most embodiments, the designing S9$a$ also comprises designing the mechanical interfaces between the carriages and the carriage joints to fulfill the requirements of new carriage joints placements as determined/calculated to preserve the kinematics properties of the PKM. Also, these mechanical interfaces should be high stiffness mechanical interfaces. This is made with the requirement to obtain the optimized support-platform joint placements and simultaneously the mounting directions of the support-platform joints that give the maximum use of the working ranges of the joint type selected. In this work it is also important to test that the mechanical interfaces will not give any collision problem when running the application programs. In order to obtain high stiffness of the mechanical interfaces, a Finite Element Model (FEM) is generated for the support-platform 17 together with the mechanical interfaces, and the geometry of the mechanical interfaces is improved if needed. Thus, in some embodiments, the method comprises performing S9$b$ FEM analysis to refine mechanical interfaces. In order to make the FEM-analysis, maximum link forces as obtained during the stiffness analysis, can be applied to the links. When the design of the mechanical interfaces for the support-platform joints is ready, the interfaces for the carriage joints are designed. In order to guarantee high stiffness interfaces, FEM is needed also for the design of the mechanical interfaces for the carriage joints.

In the case when the support-platform is not already designed and the operator has the possibility to also design the support-platform 17, the high stiffness design of the mechanical interfaces for the support-platform joints is made together with the support-platform design. Thus, in some embodiments the method comprises designing S10 a high stiffness support-platform including mechanical interfaces between the support-platform 17 and the support-platform joints. Knowing the forces from the links and the forces and torques from the tool, it is possible to use a structure-optimization tool to obtain an optimal support-platform structure including joint interfaces and there can be a smooth transition between support-platform and support-platform joints. This also makes it possible to use 3D-printing. In some embodiments, the method comprises performing S11 FEM analysis (if needed) to refine mechanical interfaces, as explained in connection with step S9$b$. In a further step, the method may comprise designing S12 high stiffness mechanical interfaces between carriages and carriage joints. Thereafter the method may comprise performing S13 a FEM analysis and if needed refine the design of the mechanical interfaces. For joints themselves, including rolling or sliding contact between moving marts, data from separate experiments can be used for such specific machine elements. If the design is satisfying, the final PKM with the support-platform and optimal joint placements may be implemented in a further step S14.

Figure 17:
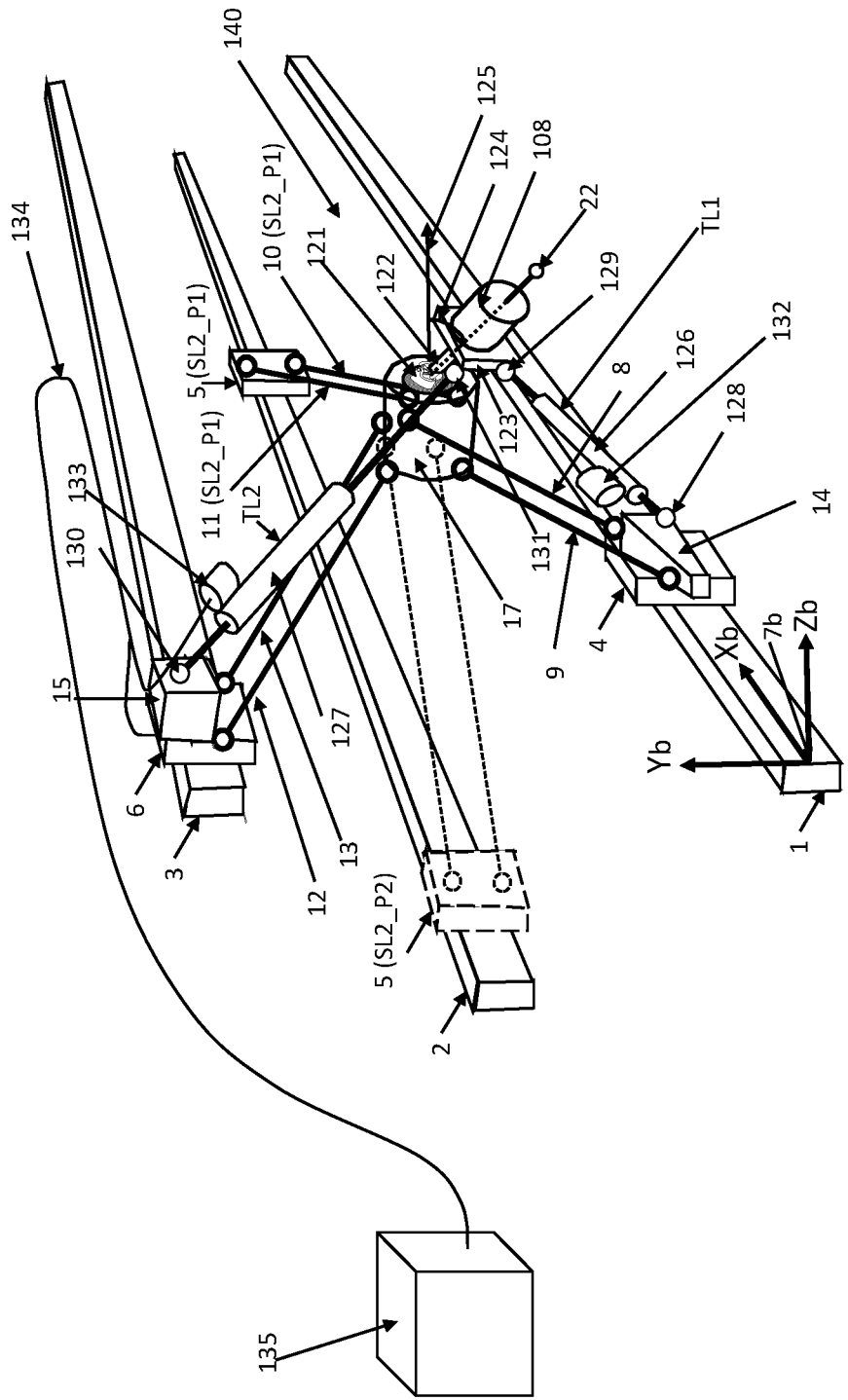
FIG. 17 illustrates a PKM with a tool-base according to one embodiment.

In some embodiments, the PKM comprises a tool-base 140 comprising a shaft joint 121, a tool-base shaft 122 and a tool platform 123. An example of such embodiment is illustrated in FIG. 17. The shaft 122 is connected to the support-platform 17 via the shaft joint 121 at the connection point 23$a$. The shaft 122 is also connected to the tool platform 123. The shaft 122 is typically rigidly connected, e.g. rigidly mounted, to the tool platform 123. The PKM also comprises one or more tool linkages TL1, TL2 (a third tool linkage TL3 is not shown but may be included in the PKM in FIG. 17, connected between the tool-base 140 and a carriage 5. The third tool linkage TL3 may then also comprise a tool link and be connected via joints, as TL1 and TL2). Each tool linkage TL1, TL2, TL3 comprises a tool link 126; 127 connected at one end via a tool-base joint 129, 131 to the tool-base 140, and at the other end connected via a carriage joint 128, 130 to a carriage 4, 6 arranged for movement along a path. The tool links are arranged to have a variable length, e.g. being telescopic. The carriages may be other carriages than those indicated in the figure, but movable along the same path(s). Each tool linkage TL1, TL2, TL3 is configured to rotate the shaft 122 around at least one axis relative the support-platform 17, by transferring a movement of the respective tool linkage TL1, TL2, TL3 to the shaft 122. The support-platform 17 is arranged to have a part of the shaft joint 121 mounted to the support-platform 17. Thus, the shaft joint 121 is mounted to the support-platform 17. The tool-base shaft 122 is connected at one end to the shaft joint 121. The tool-base shaft 19 is connected at the other end to the tool platform 123. Thus, the tool-base shaft 122 is connected to the support-platform 17a via the shaft joint 121 and the shaft is also connected to the tool platform 123. More precisely, the tool platform 123 is mounted to the tool-base shaft 122. The tool-base shaft 122 typically has an elongated shape. The tool-base shaft 122 is made of a rigid material. The tool-base shaft 122 is for example a rod. The tool platform 123 here comprises a body having a rectangular shape, but the tool platform 123 may have other shapes. The tool platform 123 provides an attachment interface between the tool-base shaft 122 and an actuator of a tool, e.g. a process actuator. Thus, the tool-base shaft 122 is attached to the actuator via the tool platform 123. The tool-base 140 is an assembly of at least the shaft joint 121, the tool-base shaft 122 and the tool platform 123. In some embodiments the tool-base 140 comprises a process actuator 108 configured to operate a tool head 22. The process actuator 108 is attached or mounted to the tool platform 123. The process actuator 108 comprises the tool head 22 arranged at a distal part of the process actuator 108. The process actuator 108 may be a process actuator such as a spindle motor for milling or friction stir welding. The shaft joint 121 may be designed to have one, two or three degrees of freedom, depending on requirements of the application and of the selected kinematic structure. The shaft joint 121 makes it possible to change the orientation of the tool head 22 in a more versatile way. For example, the shaft joint 121 is a high stiffness cardan joint. Such a two DOF joint makes it possible to tilt the tool-base shaft 122 in two directions. The purpose with the shaft joint 121 is to make it possible to obtain any space angle 124 between the center line of the tool-base shaft 122 and the line 125, which is parallel with the Zb axis of the base coordinate system. Thus, the shaft joint 121 is arranged such that the tool-base shaft 122 can be moved, that is, tilted, in relation to the support-platform 17. As an alternative to using a high stiffness cardan type shaft joint, a high stiffness ball joint or a Cardan joint may be used, if the tool equipment also needs a $3^{rd}$ rotational degree of freedom. FIG. 17 also shows a control unit 135 that is arranged to control the movement of the PKM, using actuators. Each linear actuator of a linkage comprises a motor that is arranged to actuate a variable length link of the same linkage. A linear actuator is thus an actuator arranged to cause linear motion of a link, and thus change the length of the link. The motor is controlled via the control unit 135. Thus, the second tool linkage TL2 comprises a linear actuator comprising a motor 133 connected to the control unit 135 via the cable 134, for example mounted in a cable chain along the third path 3. Further, the first tool linkage TL1 comprises a linear actuator comprising a motor 132 connected to the control unit 135 via a cable (not shown), for example mounted in a cable chain along the first path 1.

Considering a PKM as illustrated in FIG. 17, according to one embodiment, the method comprises determining S0 placement of the one or more tool-base joints 129; 131 to the tool-base 140. In some embodiments, the method comprises to place the tool-base joints as close as possible to each other as possible. This means to place the tool-base joints as close as possible to each other as mechanical constraints allow. In some embodiments, the method comprises to place the tool-base joints such that a distance between the tool-base joints and a center axis of the shaft (e.g. center axis of shaft 71a and the tool-base joints 129 and 131 in FIG. 17) is adjusted to obtain a kinematically symmetrical working range around zero for the shaft angle 124 (FIG. 13). In some embodiments, the method comprises to place the tool-base joints such that kinematically symmetrical working range is adjusted to obtain a symmetrical working range with respect to stiffness.

Thus, in case the PKM also comprises a tool-base, tool-base joints and tool linkages as in FIG. 17, the placements of the tool-base joints are determined before the placements of the support-platform joints and the design of the support-platform and mechanical interfaces, if needed, are determined.

The disclosure also relates to a system comprising a computer as explained herein, and that is configured to output an optimal placement configuration, e.g. on a display or by communicating it to another computer. The system also comprises a PKM according to any embodiments described herein, and which support-platform joints 8a, 9a, 10a, 11a, 12a, 13a are placed to the support-platform 17 according to the optimal placement configuration outputted by the computer. The computer may also be implemented in the control unit 135.

Figure 5:
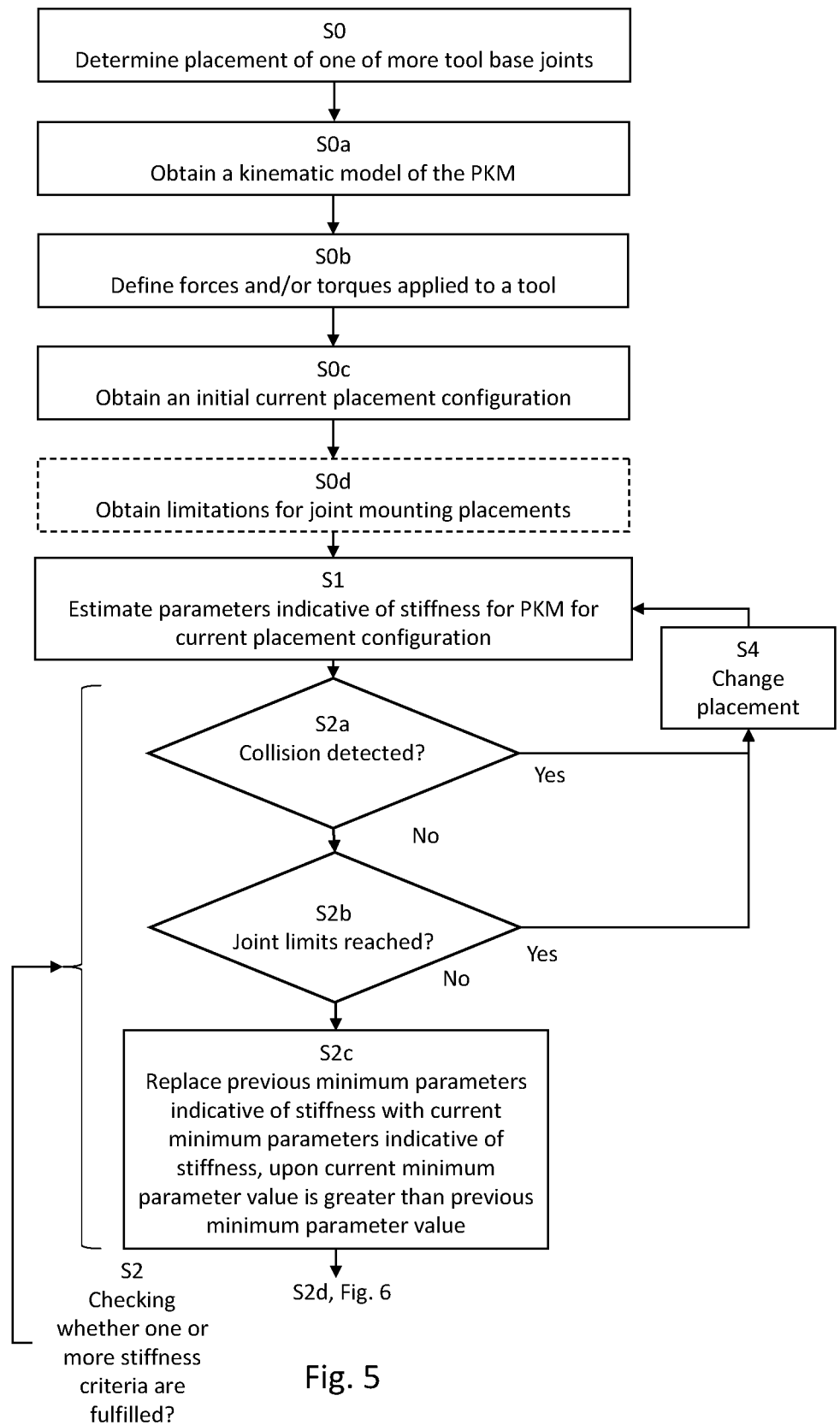
FIGS. 5-7C illustrate methods for determining placement of support-platform joints according to some embodiments of the disclosure.
Figure 6:
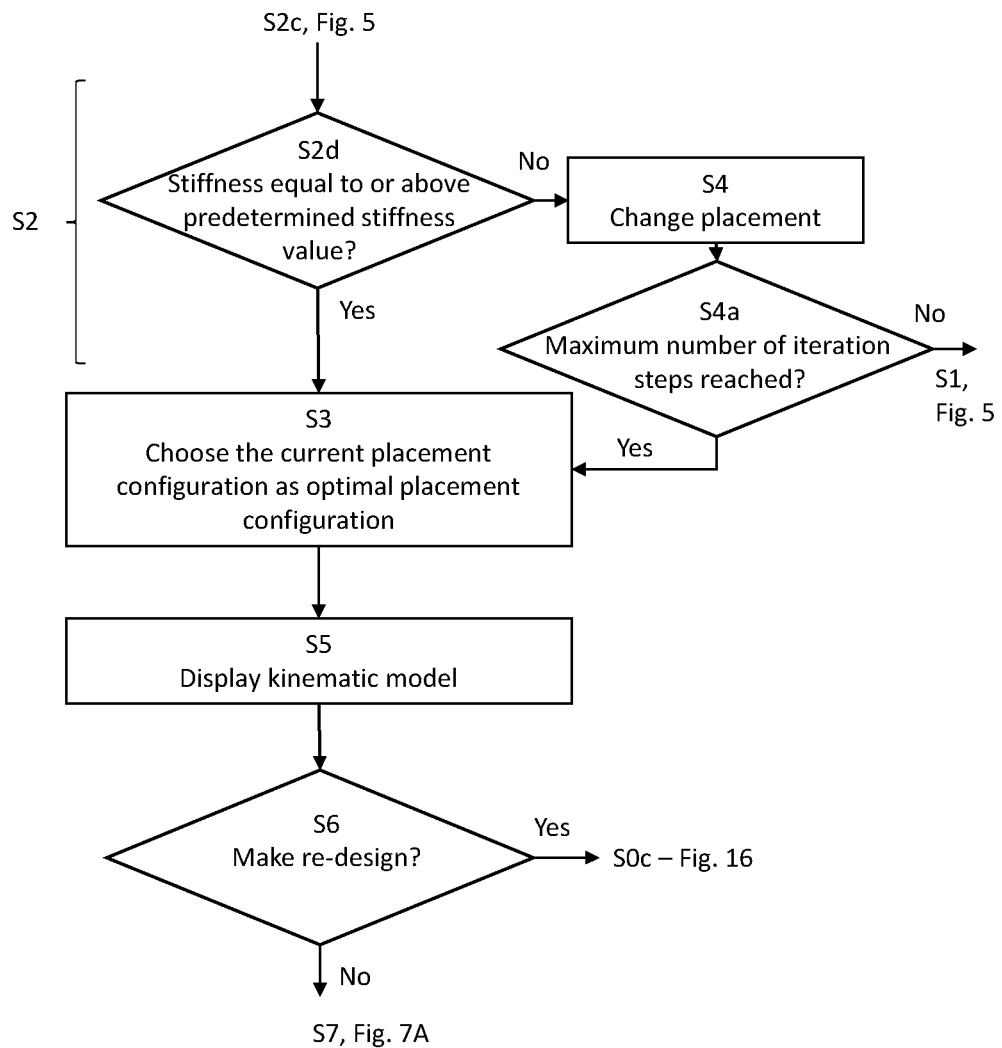
Figure 8:
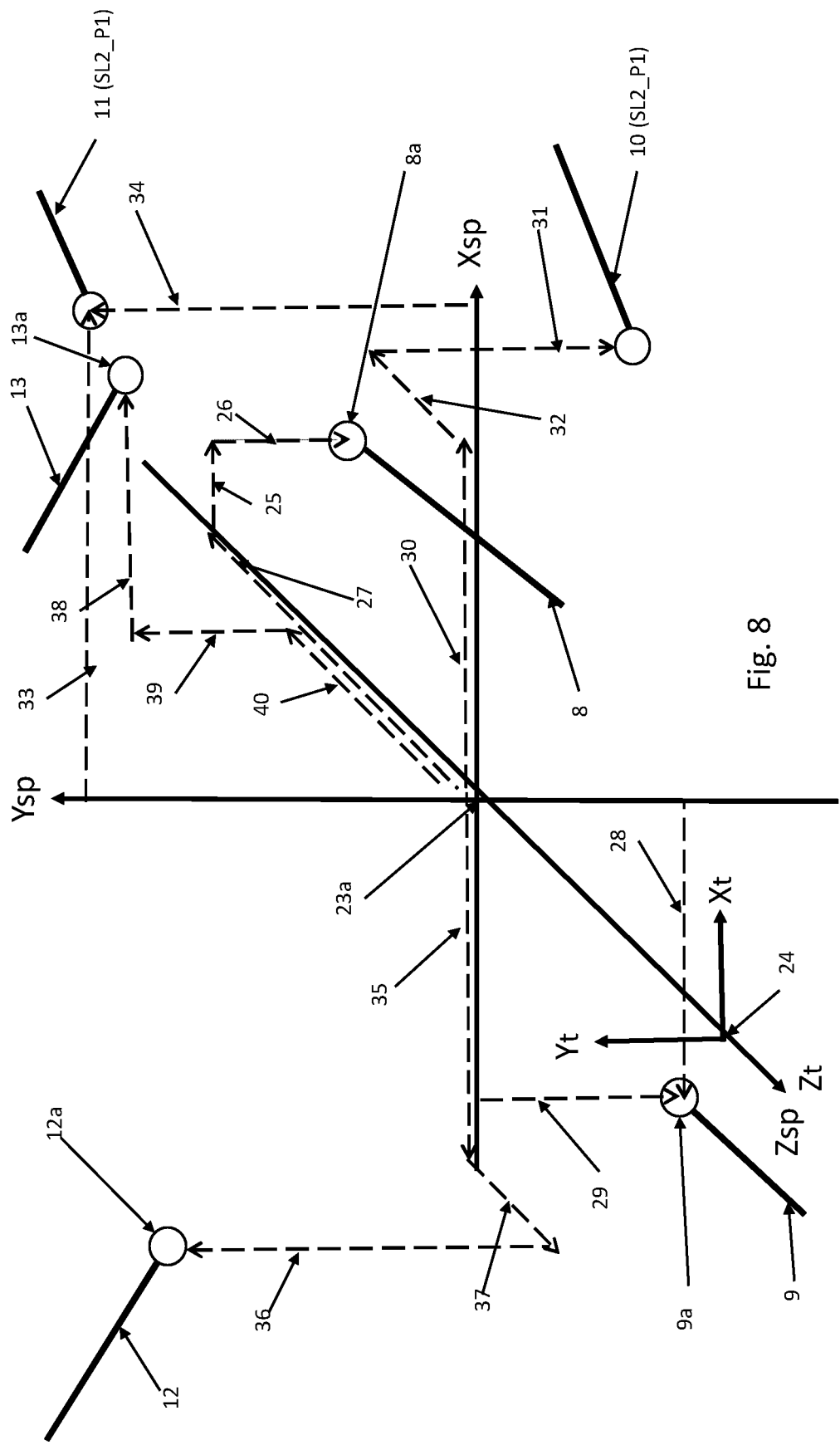
FIG. 8 defines parameters in the platform coordinate system used to define and optimize the support-platform joint placements and to define a general support-platform design, according to one embodiment.

A more detailed explanation of the optimization simulations described in relation to FIGS. 5-7 will be explained further in the following. FIG. 8 is to illustrate the complexity of the optimization problem, showing support-platform joints with in total 18 parameters to be optimized when placed in a coordinate system. The layout of the support-platform coordinate system in FIG. 8 could for example be the arbitrary initial positions before starting the optimization and does not show any actual optimal or best initial placements of the support-platform joints. The support-link numbering is as in FIGS. 1-3 and the placements of the support-platform joints are defined as follows:

A first support-platform joint 9a for support-link 9 has the x-value 28 (negative), the y-value 29 (negative) and the z-value zero.

A second support-platform joint 8a for support-link 8 has the x-value 25, the y-value 26 (negative) and the z-value 27 (negative).

A first support-platform joint 10a for support-link 10 has the x-value 30, the y-value 31 (negative) and the z-value 32 (negative).

A second support-platform joint 11a for support-link 11 has the x-value 33, the y-value 34 and the z-value zero.

A first support-platform joint 12a for support-link 12 has the x-value 35 (negative), the y-value 36 and the z-value 37.

A second support-platform joint 13a for support-link 13 has the x-value 38, the y-value 39 and the z-value 40 (negative).

The most important task for the stiffness optimization is to place the support-platform joints on the support-platform 17 in such a way that the forces and torques from the tool 22 at the TCP (the origin of the tool coordinate system (Xt, Yt, Zt) will result in as high PKM-stiffness as possible. This means that the forces and torques taken care of by the support-platform 17 should result in the six lowest possible link forces of about the same value, no support-link should have much higher link force than the other links (in case of six support-links; in case of five support-links then the result should be five lowest possible link forces of about the same value). In the following the explanations will be made with reference to a PKM with six support-links, but it should be understood that the explanations are also applicable for a PKM with five support-links since the omitted sixth link simply lets one degree of freedom free for the support-platform, which then is fixed by a corresponding tool-support link. For each application specification with given component constraints there will be an optimal placement of the six support-platform joints in the support-platform coordinate system for the designated workspace positions or trajectory. Stiffness is defined as force divided with position deviation. The position deviation may be applied for one, two or three coordinates in for example the tool coordinate system or in any other coordinate system.

In a brute force optimization, the support-platform joints are placed randomly on the support-platform 17 and then moved around to find the highest possible stiffness value. When moving a support-platform joint during this process collisions with the support-platform and with other links must be avoided. As mentioned, there are many ways to perform such an optimization.

The optimization procedure is very difficult because of local optima and the extremely large number of combinations of support-platform joint placements. Avoidance of local optima is not only a matter of computational time to determine machine parameters; more importantly is to avoid local optima that represent partly invalid properties that requires an expert to investigate and eliminate. For the method to be useful as part of normal engineering/CAD tools, both computational time and automatic optimization are crucial. Fortunately, the mentioned analysis, including simulations and optimizations during development of the disclosed method, have shown that for the manipulator structures referred in the disclosure (such as the one in FIG. 1), there are basic requirements on the placement of the support-platform joints that can be used as initial placements. Thereby, the stiffness optimization can avoid the local optima when determining the placements of the support-platform joints. The basic requirements listed below are related to the definitions in FIG. 8. To reduce the complexity of the figure, the support-platform joints 10a, 11a of the links 10 and 11 in the position b are not included and the support-platform joints 9a, 11a of support-links 9 and 11 are placed directly in the Xsp-Ysp plane of the support-platform coordinate system. Moreover, absolute coordinate values (25, 26, 27 etc.) in the support-platform coordinate system will be referred to as distances in the description of the requirements. Thus, in some embodiments, one or more of the following rules apply for a good initial guess of the support-platform joints (thus, to find a good initial configuration of the placement of the support-platform joints):

1. The sum of the distances 25 and 28 is designed to be in the same order as the distance 27, and the sum of the distances 35 and 38 is designed to be in the same order as the sum of the distances 37 and 40.
2. The sum of the distances 29 and 36 is designed to be smaller than the sum of the distances 26 and 39
3. The sum of the distances 26 and 36 is designed to be as small as possible (with limitation given by the support-platform joint sizes) as an option for previous item. It should be noted that if this is possible from link collision point of view, it may be advantageous to mount the support-platform joint 12a for support-link 12 below (in Ysp-direction) the support-platform joint 9a of support-link 9.
4. The tool coordinate system 24 is in FIG. 8 obtained by parallel movement along the Zsp-axis. In order to obtain maximum stiffness for a given set of tool forces and tool torques the coordinate system may need to be translated in the Xsp- and Ysp-directions and the corresponding translations are then of course made of the tool mounting.

In all cases the distance 27 and the sum of the distances 37 and 40 should be as large as possible, within limits of the implementation constraints. These measures correspond to the distance in Zsp-direction between the parallel links (8-9 and 12-13 respectively) connecting to the same linear actuator carriage (4 and 6 respectively). Limits apply for the practical implementation of the platform and the carriages. Moreover, the sum of the distances 31 and 34 in the Ysp-direction should be as large as possible within limits of the implementation of the support-platform, the corresponding carriage (5) and the accessibility for the application.

The requirements above are further defined by means of FIG. 9, which shows a projection of the support-platform joints in the Xsp-Zsp plane (Ysp=0). FIG. 9 defines areas, in which the optimization algorithm should work in order to avoid local minima and too many iteration steps. The figure can thus be used to describe how to obtain near optimal support-platform joint placements as limited by the maximum size of the 3D geometry of the support-platform and the maximum size of the mechanical interfaces at the actuator carriages 4-6. The boxes 41a, 43, 45, 46 and 47 are projections to the Xsp-Zsp plane of virtual tubes, in which the support-platform joints are placed at different levels in the Ysp-direction. The boxes 46 and 47 are defined for the links 10b and 11b, which have the same Xb-direction as the rest of the links, see FIG. 1. As can be seen from FIG. 9, the box 45 for links 10 and 11 (SL2_P1) is very large, which means that the placement of these support-platform joints 10a, 11a may require more tests. However, the projections of these support-platform joints should not be too far away from each other in the Xsp-Zsp plane and usually it is an advantage to have these support-platform joints close to the Xsp-axis. FIG. 9 can besides showing where the initial placements of the support-platform joints should be placed, also be used for a more detailed control of the optimization algorithm to avoid random changes of the (18) parameters of the support-platform joint positions:

1. The distance 51 between boxes 41a and 43a in the Zsp-direction is set to be as large as possible with respect to implementation limitations for the platform and linear actuators. For simplicity the box 41a is placed with its lower side on the Xsp-axis.
2. The points 42a and 44a are defined on the middle of the lower sides of the boxes 41a and 43a. The distance 43b between the point 44a and the Ysp-axis is set to 0.5 times the distance 51 as a starting position in the optimization.
3. The line 49 is defined by connecting the points 42a and 44a and the angle 50 is the angle between this line and the Zsp-axis. During the optimization process the angle 50 is varied between 30 and 60 degrees. During this optimization the biggest distance in the Ysp-direction between support-platform joints in the box 43a is set to the length of 51 as a starting value while the support-platform joints in the box 41a are set to be as close as possible to each other in the Ysp-direction with respect to mechanical implementation limitations. This Ysp-distance is then optimized in step 4, see FIG. 8.
4. Perform optimization of the distance in the Ysp-direction between the support-platform joints in box 43a at values varying between 0.7 and 1.7 times the length of 49 as obtained in step 3. Further optimization can be made by varying the relations between the lengths 29 and 36 or lengths 26 and 39, with the sums of respective lengths 29 and 36 or lengths 26 and 39 kept constant as optimized.
5. The size of the box 43a is defined to be the same as the box 41a with the side lengths 41b and 41c. These side lengths are selected to be half the distance 51 between the boxes. One of the support-platform joints in box 41a is placed at the position 42a and one of the support-platform joints in box 43*a* is placed in the position 44*a*. During the optimization at first one of the support-platform joints in the boxes will be placed in respectively 42*a* and 44*a* and the other support-platform joints (the ones not placed in 42*a* and 44*a* respectively) are placed at different positions inside the respective box. This is made for the four combinations of positioning the support-platform joints in the boxes.

6. Perform optimization by coordinated varying the Xsp-coordinate 43*b*, test also with negative Xsp-values. The coordination means that the varying is made in such a way that all positions (42*a*, 44*a* and the positions of the support-platform joints) will get the same change in the Xsp-direction. This is actually the same as moving the TCP in the Xsp-direction.

7. Finally, optimize the placement of the support-platform joints for the links 10 and 11. Test at first close to the Xsp-axis. However, it may not be permitted to have these links with a large distance from each other too close to the TCP for accessibility reasons.

Iteration between the different steps may be made to further improve the stiffness for the applied forces and torques on the TCP in the designated work area. In each step the optimization can start with sensitivity tests to obtain the influence of different changes in support-platform joint placements on the stiffness of the manipulator. The main advantage using this method is that only one starting set of support-platform joint positions is needed since local optima will be avoided.

FIG. 10 illustrates narrowing of the initial support-platform joint space, making the optimization simpler but not reaching an optimal solution. This approach can be used for applications that do not need highest possible stiffness or when a higher cost can be tolerated using stiffer components. Thus, FIG. 10 defines a sub space of the parameters in FIG. 9 to simplify the optimization method. Here the areas of the boxes 41*a* and 43 have been reduced to zero and only the positions 42*a* and 44*a* are used to determine the positions of the support-platform joints of links 9/12 and links 8/13 respectively. For further simplification the distances 55 and 56 are the same and so the distances 59 and 60. This is however not necessary, and it is sometimes useful making an optimization procedure with different values of the two distances when the sum of the distances is the same. The locations of the support-platform joints 10*a*, 11*a* for the links 10 and 11 (SL2_P1) are defined by a projection point 54. The optimization procedure now includes the following steps:

1. The distance 53 between the point 44*a* and the Xsp-axis (the absolute value of the Zsp-coordinate of point 44*a*) is set to the maximum allowed value for the mechanical platform geometry in the Zsp-direction.
2. The distance 43*b* between the point 44*a* and the Ysp-axis (the absolute value of the Xsp-coordinate of point 44*a*) is set to 0.5 times the distance 53 from step 1 as a starting value. The distance 43*b* can later be adjusted to obtain improved stiffness.
3. The sum of the distances 59 and 60 (the distance in Ysp-direction between the support-platform joints 8*a*, 13*a* of support-links 8 and 13) is set equal to the distance 53 or as much as is allowed by the platform geometry. This sum will later be adjusted for improved stiffness. The sum of the distances 55 and 56 is set as small as possible as limited by the implementation constraints.
4. Optimization is made of the placement of the point 42*a* on the Xsp-axis when varying the angle 52 between 30 and 60 degrees. The angle 52 is the angle between the line 49 and the Zsp-axis (53 is parallel with the Zsp-axis). At the optimal angle of 52 the optimal length of line 49 is obtained.
5. Now optimize the sum of the lengths 59 and 60 when varying this sum of lengths between 0.7 and 1.7 times the optimal length of the line 49 according to step 4. In the figure the distances 59 and 60 are the same but it is sometimes possible to obtain improvements by trying different values with constant sum. If the optimized sum of distances 59 and 60 will get too big in relation to the mechanical constraints, then all the obtained parameters for the support-platform joints obtained so far should be scaled accordingly.
6. Place the point 54 on the Xsp-axis in such a way that origin will be in the middle of the points 42*a* and 54. Set the sum of the distances 57 and 58 equal to the sum of the distances 59 and 60. Then some optimization could be made by moving the position 54 in the positive or negative Xsp-direction and in the negative Zsp-direction. Sometimes some improvements can also be obtained by having different values on distances 57 and 58 while the sum of distances 57 and 58 is kept the same. However, the mechanical implementation possibilities must always be considered. From accessibility point of view the point 54 often needs to be moved in negative Zsp-direction.

Of course, iteration between the different steps may be used to further improve the stiffness for the applied forces and torques on the TCP in the designated work area. If the manipulator will always follow the same trajectory, the optimization can be made for only that trajectory.

FIG. 10 also describes various distances d1-d9, that will be used in the following. A first distance d1 is the distance between the support-platform joint 9*a* and the support-platform joint 12*a*. In some embodiments, this first distance d1 is in the direction of the Ysp-axis. A second distance d2 is the distance between the support-platform joint 8*a* and the support-platform joint 13*a*. In some embodiments, this second distance d2 is in the direction of the Ysp-axis. A third distance d3 is the distance between the support-platform joint 10*a* and the support-platform joint 11*a*. In some embodiments, this third distance d3 is in the direction of the Ysp-axis. A fourth distance d4 is the distance between the support-platform joint 9*a* and the connection point 23*a*, in the direction of the Zsp-axis. A fifth distance d5 is the distance between the support-platform joint 8*a* and the connection point 23*a*, in the direction of the Zsp-axis. A sixth distance d6 is the distance between the support-platform joint 12*a* and the connection point 23*a*, in the direction of the Zsp-axis. A seventh distance d7 is the distance between the support-platform joint 13*a* and the connection point 23*a*, in the direction of the Zsp-axis. An eight distance d8 is the distance between the support-platform joint 8*a* and the support-platform joint 9*a*. In some embodiments, this eight distance d8 is in the direction of the Xsp-axis. A ninth distance d9 is the distance between the support-platform joint 10*a*/10*b* and the support-platform joint 11*a*/11*b*. In some embodiments, this ninth distance d9 is in the direction of the Xsp-axis.

So far, the basic optimization demands have been described. Simultaneously it is important to take care of the mechanical and kinematic constraints on the placements of the support-platform joints. The support-platform joints are then one critical component type and FIGS. 11A-11B shows the support-platform joints that are of main interest.

Figure 11C:
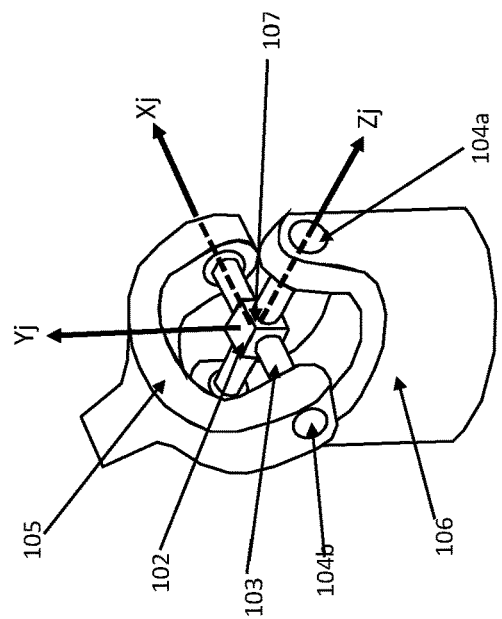
FIG. 11C illustrates an embodiment of a shaft joint.
Figure 11B:
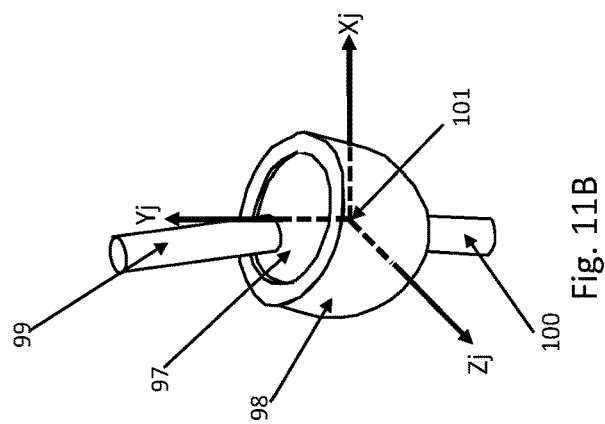
FIGS. 11A-11B illustrate different embodiments of a support-platform joint.
Figure 11A:
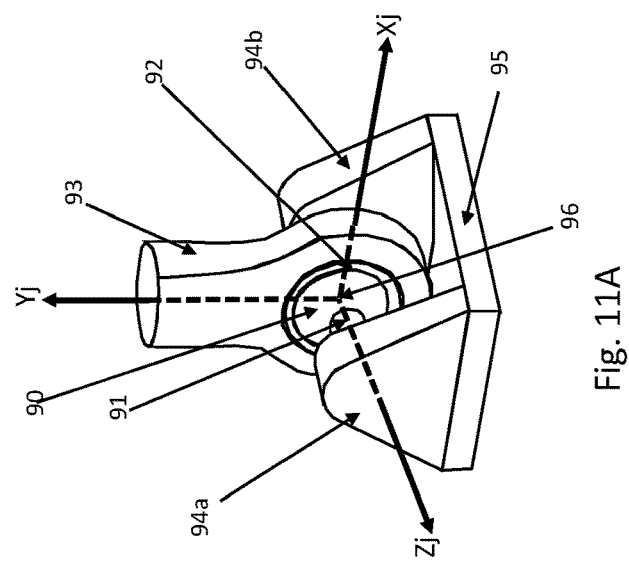

FIG. 11A is a sketch of a so-called rod end with enlarged working rang for tilting. It consists of a steel ball 90 with a hole, in which a steel shaft 91 is mounted. The steel shaft 91 is in its ends mounted in the brackets 94*a* and 94*b*. Two halves of spherical plane bearings 92 are mounted around the steel ball and these bearings are hold in place by the bearing holder 93, which is connected to the link. The brackets 94*a* and 94*b* are mounted on a plate 95, which in turn is mounted on the platform. The joint coordinate system 95 has its origin in the center of the steel ball with the Zj-axis along the center axis of the steel shaft 91 and the Yj-axis in the center line of the bearing holder 93 when the joint is in the center of its working range. This type of joint can obtain very high stiffness and the stiffness is the same both for force in the positive and negative Yj-directions. It also has a large working range around the Zj-axis, and around the Xj-axis up to +/−45 degrees can be obtained. There is also a possibility to rotate the bearing holder around the Yj-axis. If the parallel kinematics is implemented with high accuracy, very small rotations will take place around the Yj-axis.

FIG. 11B illustrates the ball-and-socket joint type. The steel ball 97 is in this case mounted inside a socket 98 with separate spherical bearings or where the inside of the socket is the bearing surface against the bearing surface of the steel ball. A shaft 99 for the mounting of the link is mounted in the steel ball and the socket 98 can be mounted on the platform using the shaft 100, which is fixed to the socket. The joint coordinate system 101 has its origin in the center of the steel ball 97 and the joint is in the middle of its workspace when the center line of the shaft 99 coincides with the Yj-axis. This type of joint will be very compact, and joints can be place close to the platform and close to each other. However, the stiffness in the positive Yj-direction is much lower than in the negative Yj-direction and the workspace is limited to +/45 degrees both for rotations around the Xj- and Zj-axes. It has an infinite rotation capability around the Yj-axis, which is as described above not important.

FIG. 11C depicts a Cardan joint, also referred to as a universal joint, with the base 106, which is mounted on the platform and the bracket 105, on which the link is mounted. Between the bracket and base there is a cross 102 with four shafts 103. Two of the shafts are mounted in the base with a bearing 104*a* and the two other shafts are mounted in the bracket with the bearings 104*b*. The joint coordinate system has its origin in the center of the cross and the Yj-axis coincides with the center line of the bracket when the joint is in its center of its working range. This type of joint can obtain large rotation around both the Xj-axis and the Zj-axis. However, it needs and extra bearing to obtain rotation around the Yj-axis.

In the process of optimizing the placements of the support-platform joints it is important to select the best joint type for the application. If very high stiffness is the dominating requirement, the joint in FIG. 11A should be tested at first and if this joint will not have enough rotation capability around the Xj-axis the joint in FIG. 11C should be selected. If stiffness is not the main issue but compactness, the joint type in FIG. 11B should be used. When the joint type has been selected the next step is to find suitable mounting positions of the support-platform joints and of the carriage joints. It is then important to mount the joints in such a direction that the Yj-axes of the support-platform joint and the carriage joint for each support-link coincide when the TCP is in the center of the workspace 7*b* (see FIG. 1).

Figure 12:
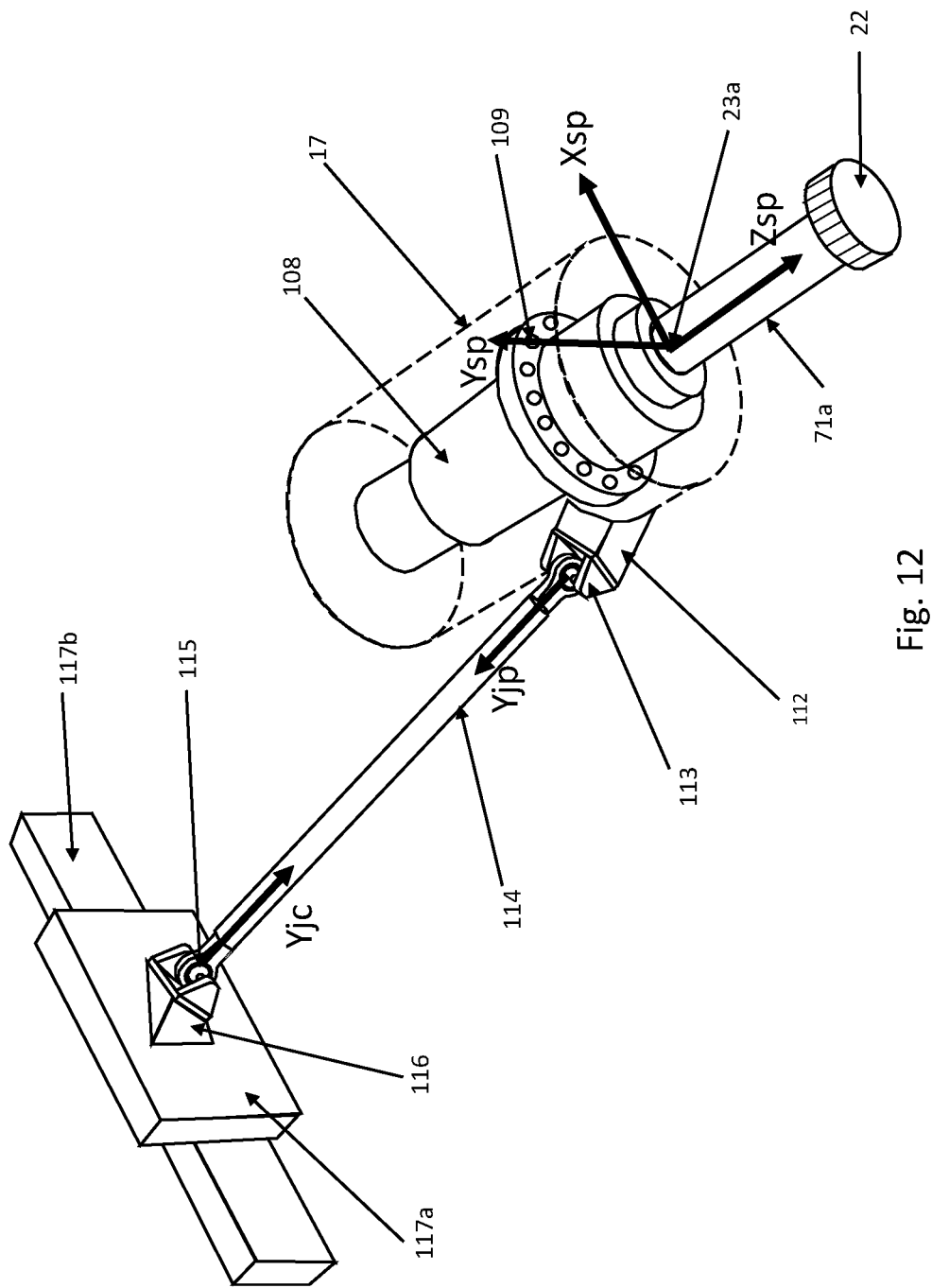
FIG. 12 illustrates an implementation of the joint type of FIG. 11A.

In FIG. 12 the joint type of FIG. 11A is used and it is shown that mechanical interfaces 112 on the support-platform 17 and mechanical interfaces 116 on the carriage are needed to obtain coinciding Yj-axes of the joint 113 (Yjp) and the joint 115 (Yjc) when the TCP is in the center of the work space. The mechanical interfaces may be custom made. FIG. 8 also shows the platform 110 containing a process actuator 108 in the form of a spindle motor, the platform coordinate system 111, the link 114 between the joints 113 and 114, a carriage 117*a* and a guideway 117*b*. Thus, the support-platform 17 comprises an actuator 108 in-between the support-platform joints. The actuator 108 is connected to a tool (here a tool shaft 71*a*). The support-platform 17 is in this case a cylinder to simplify the figure. The design of the machine is made in a CAD system and when the TCP has been placed in the center of the workspace 6*b*, the support-links including the support-platform joints and carriage joints with coinciding Yj-axes are moved around. When a suitable placement position has been obtained for a support-platform joint center, the direction of the support-link and the position of the carriage on the guideway are changed until a good fit is found and the mechanical interfaces 112 and 116 can be designed. As explained, the PKM may comprise one or more mechanical interfaces 116, each arranged between one of the carriages 4, 5, 6 and a respective carriage joint 8*b*, 9*b*, 10*b*, 11*b*, 12*b*, 13*b*. In some embodiments, the one or more mechanical interfaces 116 are designed to maintain the kinematic features of the PKM. This means that as the support-platform joints are moved due to the optimization of the placements of the same, the mechanical joint interface elements are designed such that support-links can be kept parallel and of the same length as when the support-platform joints were not moved. This is true for all mechanical joint interfaces, e.g. shown in FIGS. 8, 11, 13, 14 and 15. Thus, the support-links 8, 9 of the first support linkage SL1 are parallel and have the same length, the support-links 12, 13 of the third support linkage SL3 are parallel and have the same length, and the support-links 10, 11 of the second support linkage SL2 are parallel and have the same length FIG. 13A-14B illustrate different examples of placements of the support-platform joints to support-platforms. The support-platform joints 8*a*, 9*a*, 10*a*, 11*a*, 12*a*, 13*a* have placements that are determined with the method as has been previously explained with reference to the flow charts of FIGS. 5-7C, and with the example illustrations of the method according FIGS. 8-10.

Figure 13B:
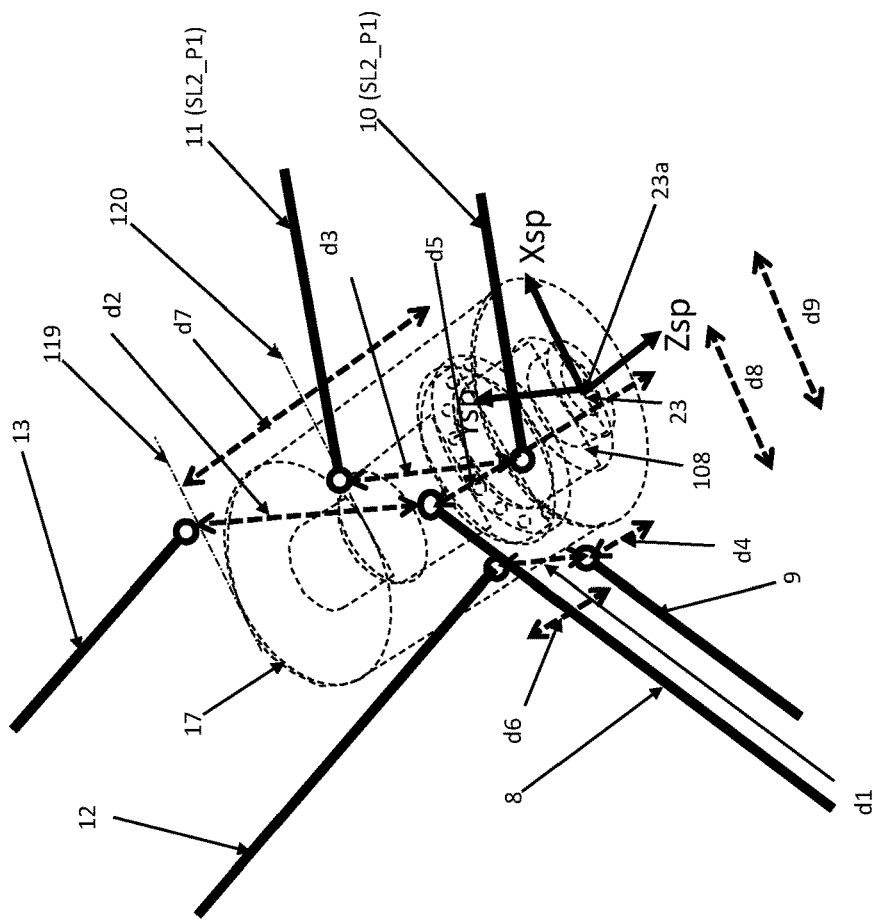
FIG. 13A-14B illustrate different examples of placements of the support-platform joints to support-platforms.
Figure 13A:
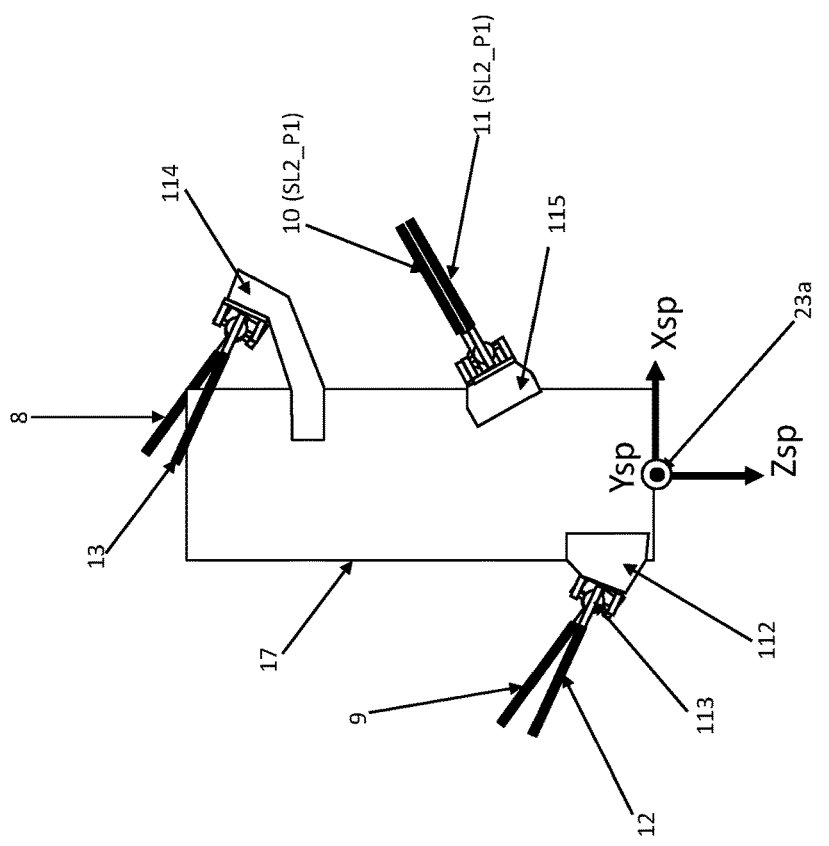

FIG. 13A illustrates an example of placements of the support-platform joints when the parallel kinematic machine structure according to FIG. 1 is used with the support-links 10 and 11 in the SL2_P1 assembly. The support-platform joints have been placed following the structure described in FIG. 9. However, at this stage of the design, the constraints from the mechanics is more obvious than in the theoretical optimization case described earlier and many alternatives will be directly skipped using a CAD system because of collision between components. FIG. 13A shows the placement of the support-platform joints as seen in the negative Ysp-direction. The support-platform and support-platform joints are the same as in FIG. 12. FIG. 13B shows the positions of the origins of the support-platform joints in a 3D draft. The distances d1-d9 that are depicted in the figure have previously been explained in relation to FIG. 10. The support-platform is here made up of a body with a primitive volumetric shape. The support-platform joints 8*a*, 9*a*, 10*a*, 11*a*, 12*a*, 13*a* are connected to the primitive volumetric body via mechanical interfaces 112, 114, 115. In some embodiments, the mechanical interfaces are designed such that the support-platform joints 8*a*, 9*a*, 10*a*, 11*a*, 12*a*, 13*a* are placed in the middle of their respective orientation working ranges, when the primitive volumetric body is centered in a plane defined by the Yb and Zb axes in the workspace of the PKM. As previously explained, the PKM may also comprise one or more mechanical interfaces 116, each arranged between one of the carriages 4, 5, 6 and a respective carriage joint 8b, 9b, 10b, 11b, 12b, 13b. In some embodiments, these mechanical interfaces are also designed such that the support-platform joints 8a, 9a, 10a, 11a, 12a, 13a are placed in the middle of their respective orientation working ranges, when the primitive volumetric body is centered in a plane defined by the Yb and Zb axes in the workspace of the PKM. Thus, the following support-platform joints placements have been made in FIG. 13A:

The support-platform joints 9a, 12a for links 9 and 12 have shortest possible distance d1 in the Ysp-direction between each other. Simultaneously these support-platform joints 9a, 12a are placed as close to the support-platform 17 as possible and as close to the Xsp-Ysp plane as possible. The constraints are in this case set by the joint geometry and it is possible to make a common mechanical interface for these support-platform joints to increase the compactness. Thus, the first one 9a of the support-platform joints 8a, 9a of the first support linkage SL1 and a first one 12a of the support-platform joints 12a, 13a of the third support linkage SL3 are placed to the support-platform 17 with a first distance d1 between each other.

The support-platform joints 8a, 13a for the links 8 and 13 are mounted with a distance d2 in the Ysp-direction from each other. This distance d2 should be larger than the diameter of the support-platform 17 to avoid collisions between link 13 and the support-platform 17 at high Yb-values (upper end of the work space 6b) and between link 8 and the support-platform 17 at low Yb-values. Thus, a second one 8a of the support-platform joints 8a, 9a of the first support linkage SL1 and a second one 13a of the support-platform joints 12a, 13a of the third support linkage SL3 are placed to the support-platform 17 with a second distance d2 between each other. In some embodiments, the first distance d1 (e.g. a straight line extending between the centers of the joints forms the first distance) and the second distance d2 (e.g. a straight line extending between the centers of the joints forms the second distance d2) are parallel with a Y-axis Ysp of the support-platform coordinate system Xsp, Ysp, Zsp with an origin defined by the support-platform 17. The second distance d2 is different from the first distance, here greater than the first distance d1, for example in the direction of the Ysp-axis. Thus, the support-platform joints 9a and 12a are placed with a small distance d1 between each other, and the support placement joints 8a and 13a are placed with a larger distance d2 from each other.

In FIG. 13A both the support-platform joints 8a, 13a of support-links 8 and 13 need extended mechanical interfaces to obtain a suitable angle 50 (see FIG. 9).

The support-platform joints 10a, 11a for links 10 and 11 (SL2_P1) are mounted as close to the XspYsp-plane as possible but because of their large separation d3 in the Ysp-direction, they must be mounted at a distance from the XspYsp-plane to avoid collisions with the objects that will be processed. The support-platform joints for link 10 does not need to be placed as far out in the Xsp-direction as the support-platform joints 8a, 9a for links 8 and 9, meaning a less complicated mechanical interface 115. The distance d3 in the Ysp-direction has been selected to be the same as the distance d2, but this is not necessary. In other words, the support-platform joints 10a, 11a of the two support-links 10, 11 are placed to the support-platform 17 with a third distance d3 between each other. In some embodiments, the third distance d3 is greater than the first distance d1 in the direction of the Ysp-axis. In some embodiments, a line through the joints that forms the third distance d3 is parallel with the $Y_{sp}$-axis. Thus, the support-platform joints 10a and 11a are located at a large distance from each other (third distance d3).

The support-platform joints 10a, 11a of the second support linkage SL2 are placed closer to a plane defined by the Xsp and Ysp axes than the second one 8a of the support-platform joints 8a, 9a of the first support linkage SL1 and the second one 13a of the support-platform joints 12a, 13a of the third support linkage SL3. The first one 9a of the support-platform joints 8a, 9a of the first support linkage SL1 and the first one 12a of the support-platform joint 12a, 13a of the third support linkage SL3 are placed closer to a plane defined by the Xsp and Ysp axes than the support-platform joints 10a, 11a of the second support linkage SL2.

The support-platform joints 10a, 11a of the second support linkage SL2 are placed to the support-platform 17 at a distance from the connection point 23a that is smaller than the fifth distance d5 and the seventh distance d7, in the direction of the Zsp-axis. Thus, the support-platform joints 10a and 11a are placed closer to the connection point 23a than the support-platform joints 8a and 13a, in the direction of the Zsp-axis.

In some embodiments, the first distance d1 is defined by a minimum implementable distance needed to mount the first one 9a of the support-platform joints 8a, 9a of the first support linkage SL1 and the first one 12a of the support-platform joints 12a, 13a of the third support linkage SL3 as close as possible to each other.

Figure 13C:
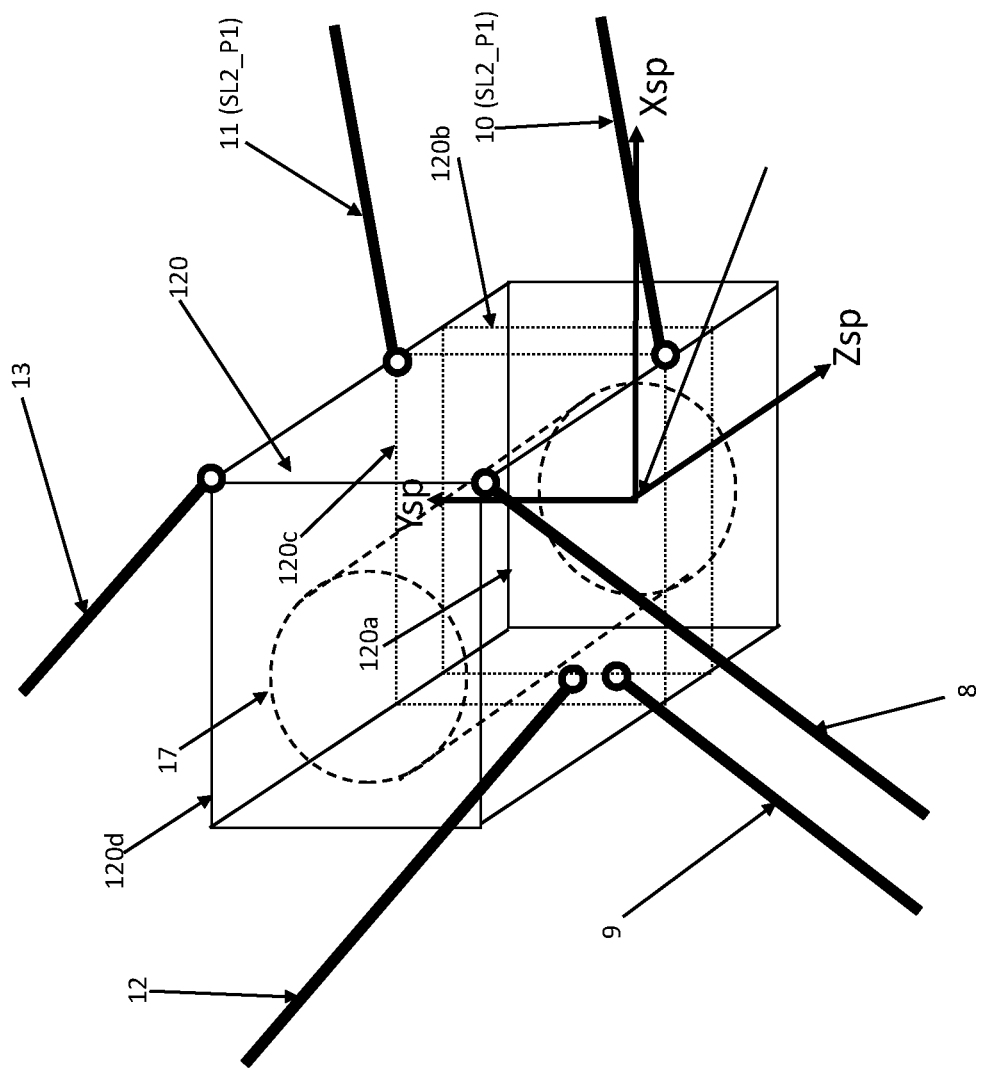
Figure 13D:
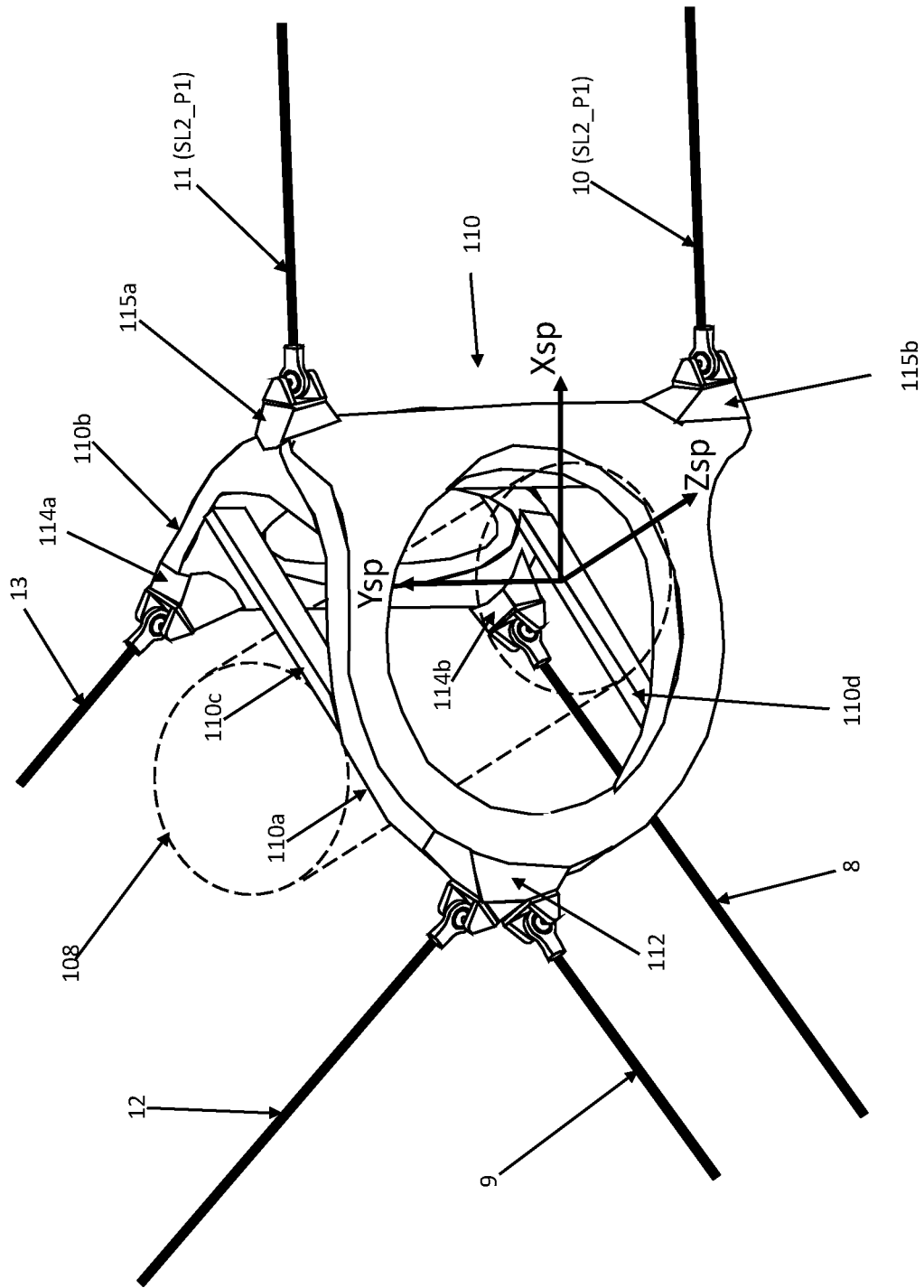

FIG. 13C shows the possibility to use a virtual object 120 consisting of parallel rectangles in order to facilitate the initial placement of the support-platform joints in for example a CAD-system. Thus, four parallel rectangles (120 a-d) are defined at different distances in negative Zsp-direction from the origin of the platform coordinate system. The sides of the rectangles are parallel with the Xsp- and Ysp-axes. In the figure the rectangles are of the same dimension, which is not necessary. The virtual object 120 is defined to encompass the spindle motor 110, if such is used, and to obtain necessary accessibility in the applications. When the rectangles have been defined, the following support-platform joint placements are made:

The origin of the support-platform coordinate system is placed in the center of the first rectangle 120a.

Support-platform joints 9a, 12a for support-links 9 and 12 are placed on the middle of the left edge of the second rectangle 120b.

Support-platform joints 10a, 11a for support-links 10 and 11 (SL2_P1) are placed in the right corners of the third rectangle 120c.

Support-platform joints 8a, 13a for support-links 8 and 13 are placed in the right corners of the fourth rectangle 120d.

The order of the rectangles in negative Zsp-direction is 120a, b, c and d. This virtual object 120 has been found useful when finding initial support-platform joint positions when an optimization is made, see FIG. 5. Of course, the object 120 could also be a real platform, even if cylindrical platforms will be more compact and better adapted to a spindle motor or other process actuators. The platform can also be designed using frameworks, as exemplified in FIG.

13D. Thus, the support-platform 17 is designed according to the optimal placements of the support-platform joints 8a, 9a, 10a, 11a, 12a, 13a. Reasons to use a framework instead of a solid platform are, for example, the need of cooling of process actuators, possibilities to obtain higher stiffness to weight ratio and to improve integration of mechanical interfaces for the support-platform joints. The framework platform 17 in FIG. 13D consists of a bracket with one circular part 110a parallel with the XspYsp-plane and another circular part 110b at an angle relative the part 110a. Two beams 110c and 110d are mounted between the circular parts 110a and 110b to obtain the stiffness needed for the platform. The process actuator 108 is represented by a cylinder. The support-platform 17 here comprises an actuator 108 in-between the support-platform joints 8a, 9a, 10a, 11a, 12a, 13a. The platform coordinate system is defined in the middle of the front disc/face of the cylinder. The support-links and mechanical interfaces with reference numbers as in FIG. 13A. Of course, there are a lot of different design possibilities for a platform framework. By means of FEM analysis the framework can be optimized for the forces and torques from the tools and the link forces that give force and torque balance.

Figure 14B:
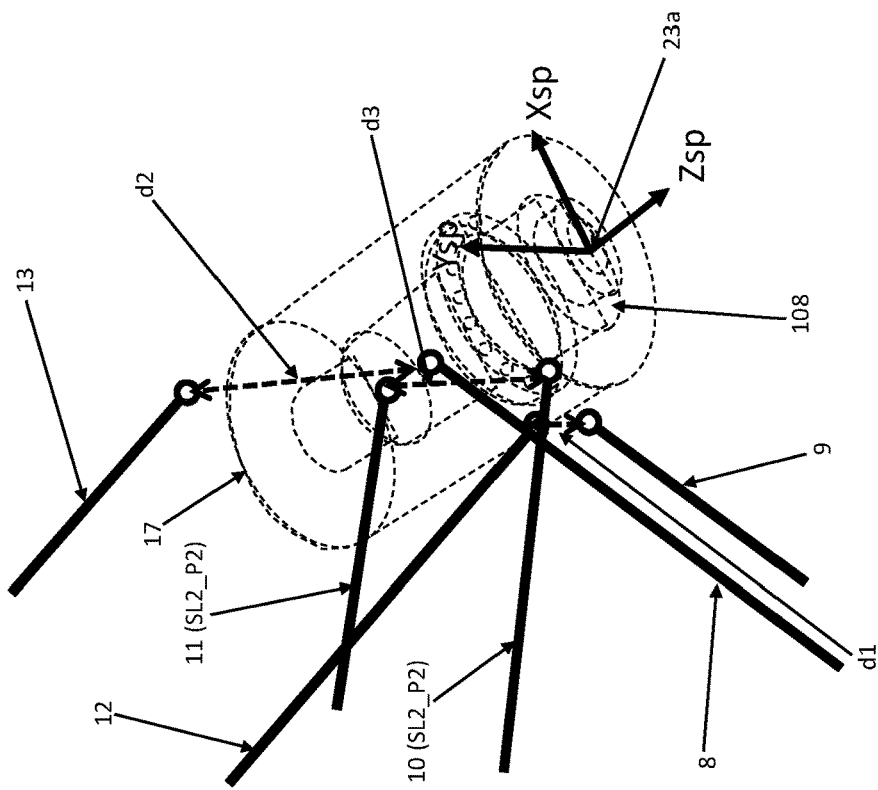
Figure 14A:
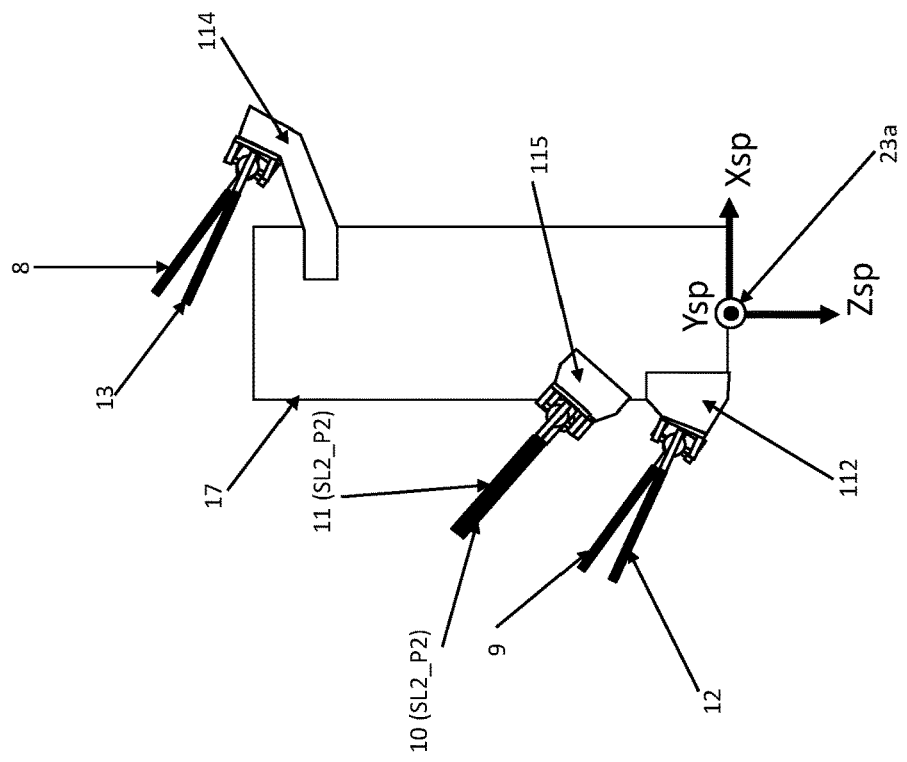

FIG. 14A shows the mountings of the support-platform joints in the case when the links 10 and 11 are in the SL2_P2 assembly configuration. FIG. 14B illustrates the positions of the origins of the support-platform joints in a 3D draft. The placement of the support-platform joints for links 9 and 12 is the same as in FIG. 1, and the support-platform joints for support-links 8 and 13 have been moved a short distance in the negative Zsp-direction to avoid collisions between support-links 10, 11 and 8/13. The big difference from FIG. 1 is that the support-platform joints for support-links 10 and 11 are placed at negative instead of positive Xsp coordinates. With the support-platform joints 10a, 11a for support-links 10 and 11 (SL2_P2) on the same side of the support-platform 17 as the support-platform joints 9a, 12a of support-links 9 and 12 and with a shorter distance d3, it was found that the support-platform joints 10a, 11a for links 10 and 11 (SL2_P2) could be displaced a shorter distance from the Xsp-Ysp plane. The support-platform 17 here comprises an actuator 108 in-between the support-platform joints 8a, 9a, 10a, 11a, 12a, 13a.

In all the illustrated embodiments, and as can be seen in for example FIGS. 13A-16B, the first one 9a of the support-platform joints 8a, 9a of the first support linkage SL1 and the first one 12a of the support-platform joints 12a, 13a of the third support linkage SL3 are placed to the support-platform 17 at respective distances from a connection point 23a that are smaller than a distance from the connection point 23a to the second one 8a of the support-platform joints 8a, 9a of the first support linkage SL1 and the second one 13a of the support-platform joints 12a, 13a of the third support linkage 12, 13, in the direction of the $Z_{sp}$-axis. Thus, the support-platform joints 9a and 12a are placed as close as the connection point 23a (or a defined TCP) as possible, that is, at high values as possible of the Zsp and Xsp in FIG. 14A. The support-platform joints 8a, 13a are placed at a larger distance from the connection point 23a (or a defined TCP) in the direction of the Zsp, than the support-platform joints 9a, 12a. Also, the second one 8a of the support-platform joints 8a, 9a of the first support linkage SL1 and the second one 13a of the support-platform joints 12a, 13a of the third support linkage SL3 are placed to the support-platform 17 at a distance from the first one 9a of the support-platform joints 8a, 9a of the first support linkage SL1 and the first one 12a of the support-platform joints 12a, 13a of the third support linkage SL3, in the direction of the Xsp-axis. Thus, the support-platform joints 9a and 12a are separated along the Xsp-axis from the support-platform joints 8a and 13a. "At a distance" here depends on where the center of the workspace in the Yb-Zb-plane is. When the center of the workspace in the Yb-Zb-plane has been decided, the optimization of the distance between the joints 8a, 9a and the joints 12a, 13a in the Xsp-direction can be made with an initial distance equal to the distance between the joints 8a, 9a and the joints 12a, 13a, in the Zsp-direction. If the center of the work space in the Yb-Zb-plane is designed to be close to the plane formed by the guideways 1 and 2, the optimization will end up with a shorter distance and when the center of the work space in the Yb-Zb-plane is designed to be far away from the plane formed by the guideways 1 and 2, the optimization will usually end up with a larger distance. Of course, the optimal value of the distance between the joints 8a, 9a and the joints 12a, 13a in the Xsp-direction will also depend on the lengths of the support platform links. Further, the support-platform joints 10a, 11a of the two support-links 10, 11 are placed to the support-platform 17 at a distance from the connection point 23a (or TCP) that is smaller than a distance from the connection point 23a to the second one 8a of the support-platform joints 8a, 9a of the first support linkage SL1 and the second one 13a of the support-platform joints 12a, 13a of the third support linkage SL3, in the direction of the Zsp-axis. Thus, the support-platform joints 10a and 11a are closer to the connection point 23a (or TCP) along the Zsp-axis than the support-platform joints 8a and 13a, respectively. Further, in some embodiments, the support-platform joints 10a and 11a are located as close as possible to the connection point 23a (or TCP) as the mechanical constraints allows.

Figure 15:
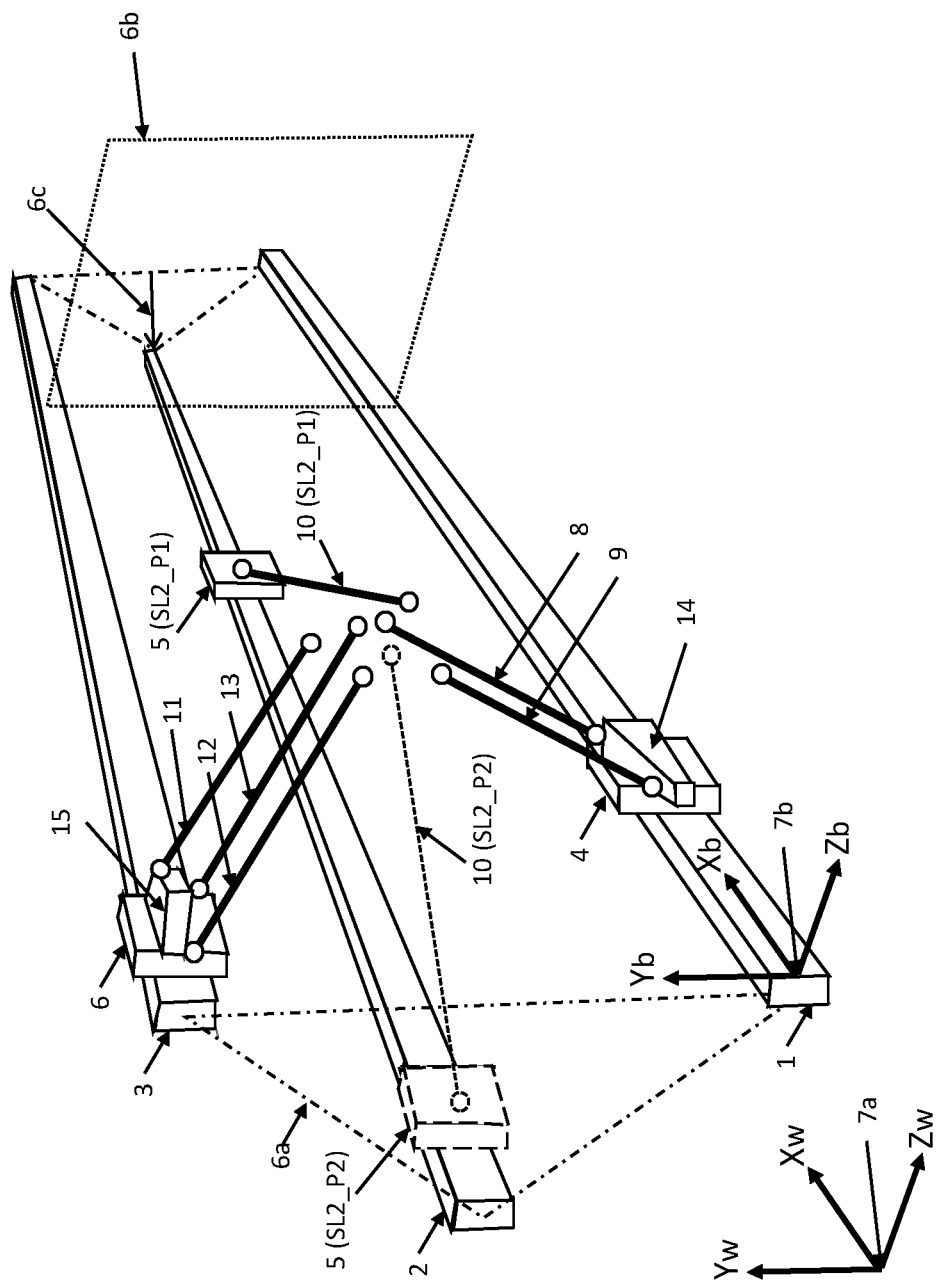
FIG. 15 illustrates a PKM with an alternative set of support-links than the embodiment of FIG. 1.
Figure 16B:
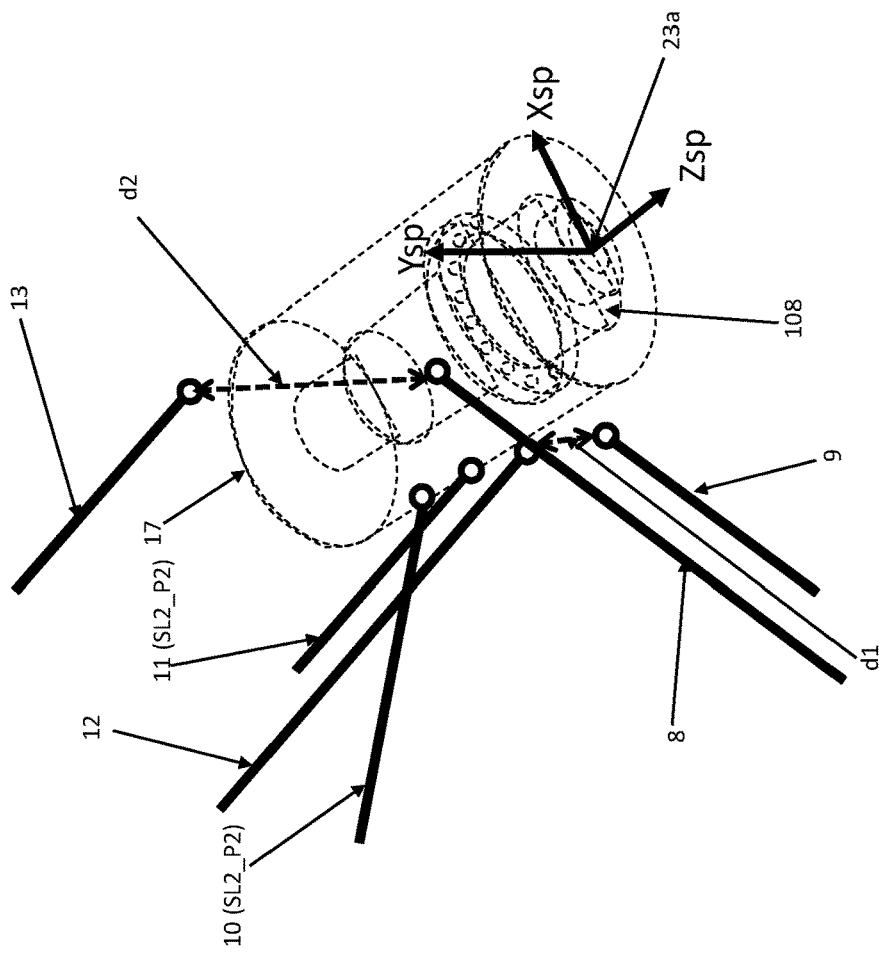
FIGS. 16A-16B illustrate support-platform joint configurations for the PKM in FIG. 15 according to some embodiments.
Figure 16A:
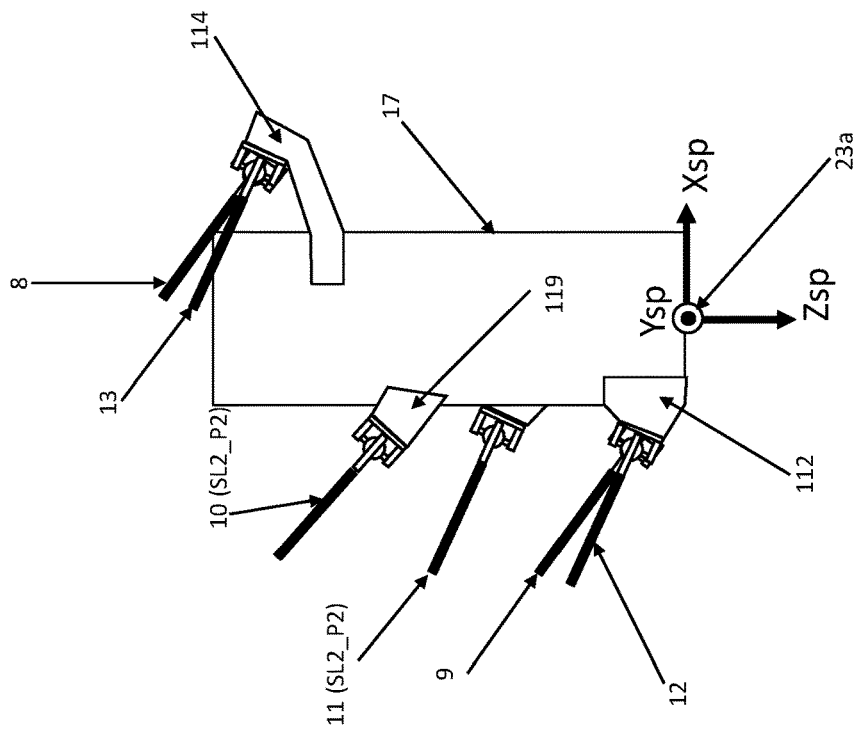

FIG. 15 shows a different configuration of the links as compared to FIG. 1. Here there is only one link 10 connecting the platform with the carriage 5. The link 11 is now instead connected to carriage 6, but it could instead be connected to carriage 4. Of course, instead link 10 could be connected to carriage 6 or carriage 4, with link 11 connected to carriage 5. In other words, a first one 10b of the carriage joints 10b, 11b of the second support linkage SL2 is mounted on the first carriage 4, and a second one 11b of the carriage joints 10b, 11b of the second support linkage SL2 is mounted on the second carriage 5. In some embodiments, a first one 10b of the carriage joints 10b, 11b of the second support linkage SL2 or a second one 11b of the carriage joints 10b, 11b of the second support linkage SL2 is mounted on the first carriage 4 or the third carriage 6. Using the optimization in this case, the same rules as pointed out in connection with FIGS. 13A-14B can be used for all the support-platform joints without the support-platform joint 11a for support-link 11. FIGS. 16A and 16B illustrate a support-platform joint configuration for the PKM in FIG. 15 with support-link 10 in the SL2_P2 assembly configuration. The support-platform joints for support-links 9 and 12 and for support-links 8 and 13 are the same as in FIG. 15, while the support-platform joints for links 10 and 11 have been relocated. The support-link 11 is now parallel with support-links 12 and 13 and it is found that the distance between the support-platform joints 11a, 13a for support-links 11 and 13 should be as big as possible with respect to the Xsp- and Ysp-coordinates.

FIG. 17 illustrates a PKM according to another embodiment. Here two new links have been added. The new links include telescopic actuators 126 and 127, preferably motor driven ball- and screw actuators. These actuators control the lengths of the links between the joints 128 and 129 and the joints 130 and 131. By controlling the lengths of these links, it is possible to control the space angle 124 between the Zsp-axis 125 (which is parallel with the Zb-axis) and the shaft 122, meaning that the shaft 122 with the tool platform 123 can be tilted in any direction by rotation around the Xsp- and Ysp-axes of the platform coordinate system (not shown in this Figure). The tilting is made possible by a shaft joint 121 mounted between the shaft 122 and the platform 17. The application devices, including a process actuator 108 and a tool 22, are mounted on the tool platform 123. In this Figure the controller 84 is also shown, together with the cabling for the actuator in carriage 6 (not shown) and the actuator for the telescope 78. Thus, the PKM comprises a shaft 21 connected to the support-platform 17 via a shaft joint 121 at a connection point 23*a*. The connection point 23*a* defines an origin of the support-platform coordinate system Xsp, Ysp, Zsp. In some embodiments, the first one 9*a* of the support-platform joints 8*a*, 9*a* of the first support linkage SL1 and the first one 12*a* of the support-platform joints 12*a*, 13*a* of the third support linkage SL3 are placed with minimum implementation distances to the shaft joint 121. Thus, the first one 9*a* of the support-platform joints 8*a*, 9*a* of the first support linkage SL1 and the first one 12*a* of the support-platform joints 12*a*, 13*a* of the third support linkage SL3 are placed as close as possible to the shaft joint 121. In some embodiments, the first one 9*a* of the support-platform joints 8*a*, 9*a* of the first support linkage SL1 and the first one 12*a* of the support-platform joints 12*a*, 13*a* of the third support linkage SL3 are placed on the shaft joint 121. In some embodiments, the support-platform 17 comprises a carbon-reinforced epoxy structure arranged between the support-platform joints 8*a*, 9*a*, 10*a*, 11*a*, 12*a*, 13*a*. Carbon-reinforced epoxy (abbreviated carbon) will make it possible to design a light weight high stiffness support platform structure. Using carbon rods, it is also possible to obtain a cost-efficient design. The light weight makes it possible to increase the maximum speed and acceleration of the PKM.

Figure 18A:
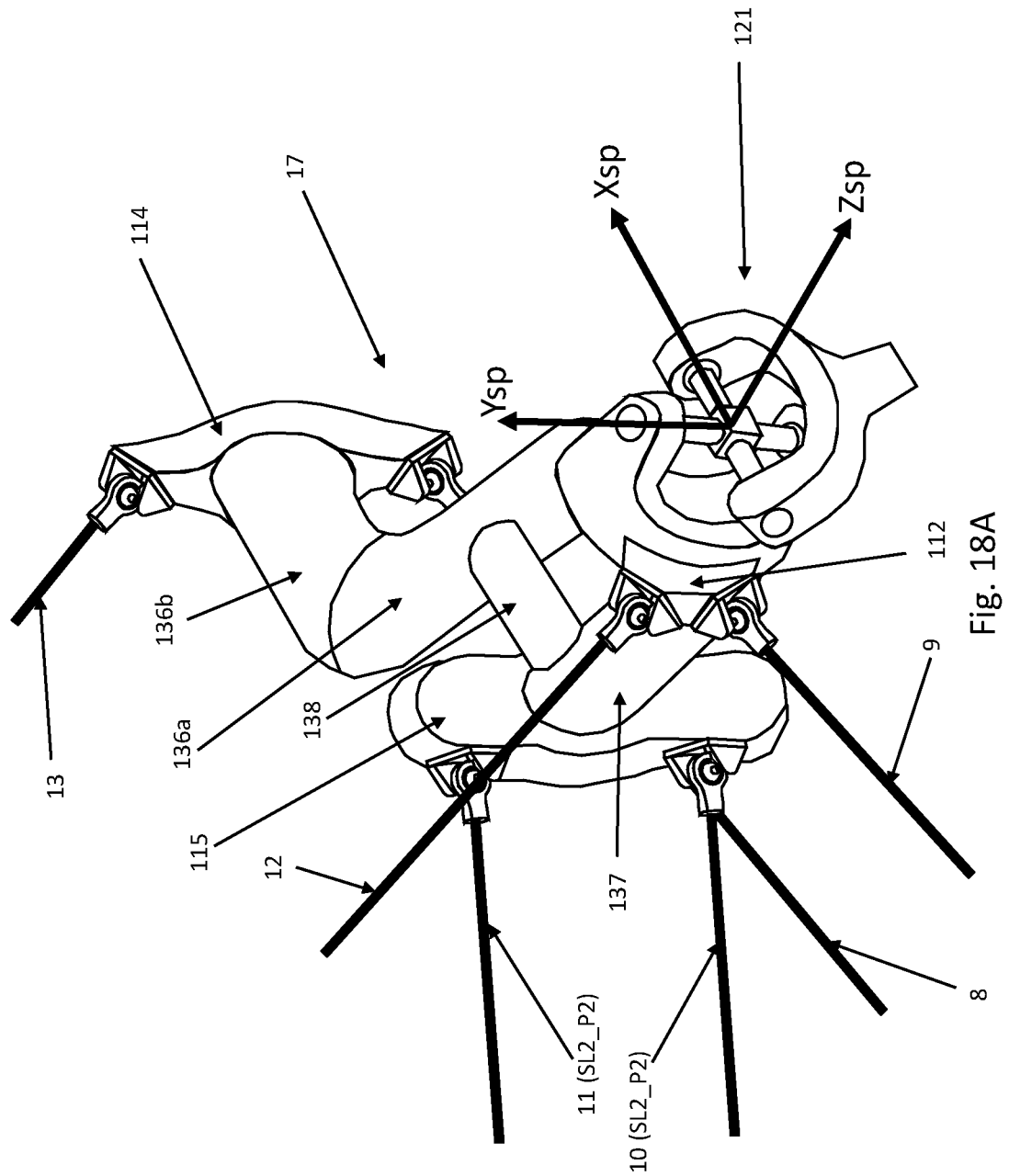
FIG. 18A illustrates a support-platform that is designed based on the placements of the support-platform joints, and a thereto connected tool-base.

FIG. 18A illustrates a support-platform 17 that is designed based on the placements of the support-platform joints, and a thereto connected tool-base 140, according to one embodiment of the disclosure. In this embodiment, the process actuator, as for example a spindle motor, is mounted outside the support-platform 17. Therefore, it is not necessary to leave a room for the process actuator inside the support-platform 17 and more possibilities are available to design a high stiffness platform. Thus, FIG. 18 exemplifies a support-platform design, where the shaft joint 121 (for the shaft 122 in FIG. 17) is integrated into a support-platform 17 comprising tubes 136*a*, 136*b*, 137 and 138. The tubes hold the mechanical interfaces 112, 114 and 115 for the support-platform joints. The shaft joint 121 is the same as in FIG. 11C and the platform coordinate system has its origin in the joint center.

Figure 18B:
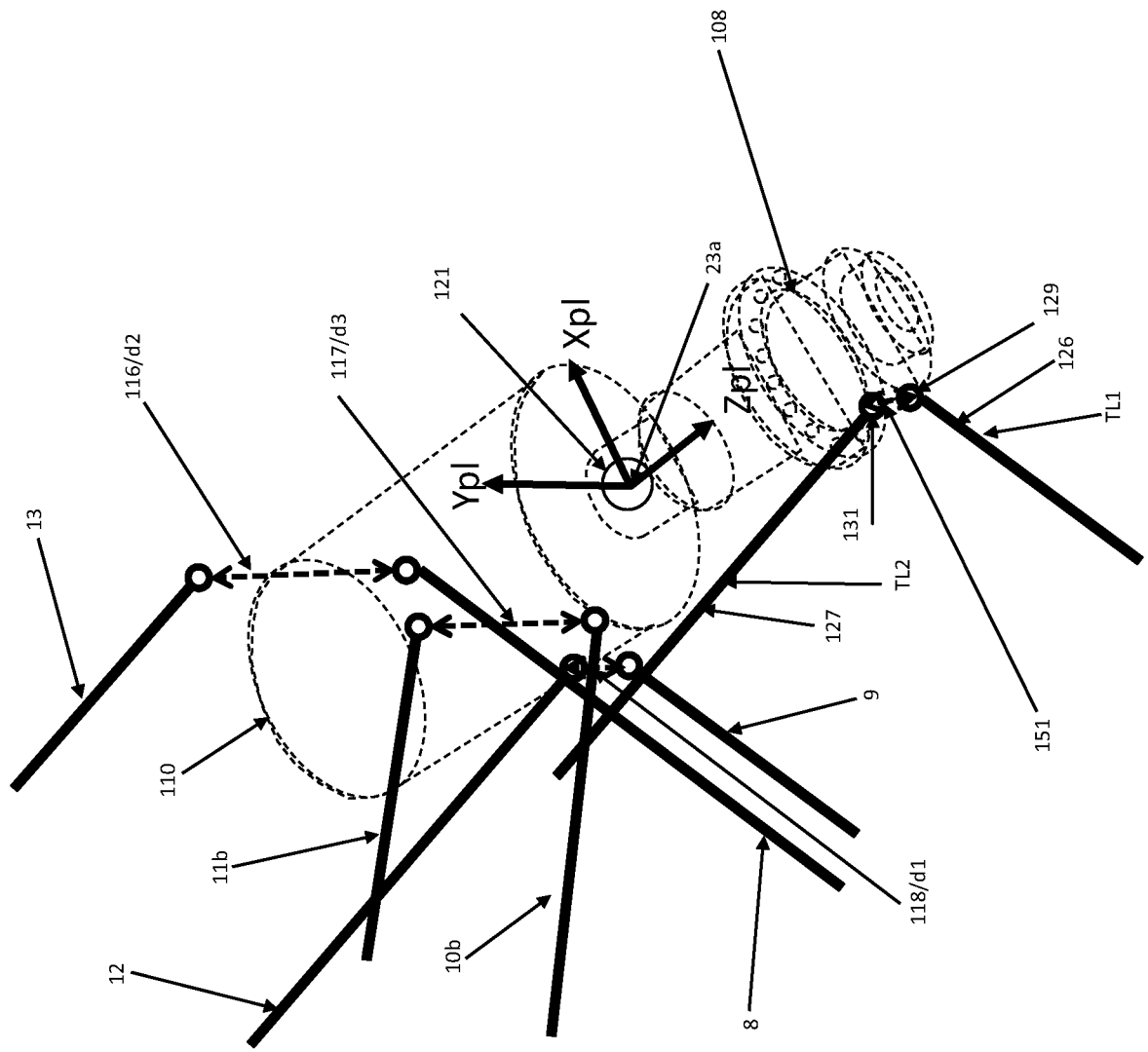
FIGS. 18B-18C illustrate placements of support-platform joints to a support platform and tool-platform joints to a tool platform according to some embodiments.

FIG. 18B shows the same support platform structure as in FIG. 14B, but here the tool equipment 108 is mounted in front of the support platform structure 110. It is then favorable from manipulator stiffness point of view to introduce two more links, namely two tool links 126 and 127 to support the tool equipment. Optimization has shown that best results are obtained if the distance 151 between the tool joints 129, 131 of tool links 126, 127 is as short as possible. This is also necessary to have a good accessibility for the tool in relation to the object that is processed by the tool. In order to keep the orientation of the tool constant in the whole work space, the link 127 is mounted on the tool equipment and the carriage for support link 12 in such a way that the tool link 127 is parallel with the support link 12 and has the same length as the support-link 12. In the same way the tool link 126 must be parallel with and have the same length as the support link 9. To take care of inaccuracies in the link system, it is an advantage to have a shaft joint 121 being a 2 DOF joint, for example a cardan joint according to FIG. 11C, between the front of the support platform 110 and the tool equipment 108. With a short tool equipment, it is from accessibility point of view advantageous to have a shaft connecting the cardan joint with the tool equipment and the joint can then be referred to as a shaft joint 121. The main advantage with the use of eight (8) links to control the tool equipment in 3 DOF as shown in FIG. 18B is that forces in the x- and y-directions on the tool center point (here denoted 23*a*) will not create large torques on the support platform as in the case of using six links for 3DOF tool manipulation as in FIG. 14B. This will result in much higher stiffness of the manipulator and the stiffness will be much less dependent on the size of the support platform. If, for example, the size of the platform is reduced to half of its original size, the stiffness will be reduced with only 5-10% using eight links while in the case of six links, it will be reduced with 60-80%. In other words, the PKM comprises a tool-base 140 including the shaft joint 121, the shaft 122 and a tool platform 123. The shaft 122 is also connected to the tool platform 123. The PKM further comprises one or more tool linkages TL1, TL2 each comprising a tool link 126, 127 connected at one end via a tool-base joint 129; 131 to the tool-base 140, and at the other end connected via a carriage joint 128; 130 to a carriage arranged for movement along a path. One tool link 126 of a tool linkage TL1 is parallel with and has the same length as one of the links 9 of the support platform linkages SL1, SL2, SL3. A tool link 127 of another tool linkage TL2 is parallel with and has the same length as another one of the links 12 of the support platform linkages SL1, SL2, SL3. The tool base joints 129; 131 are mounted as close to each other as possible. If the length of the tool links 126 and 127 can be changed by for example ball and screw actuators, it will be possible to change the orientation of the tool equipment in 2 DOF. In that case the tool links 126 and 127 do not need to be parallel with the support links 12 and 9, respectively.

Figure 18C:
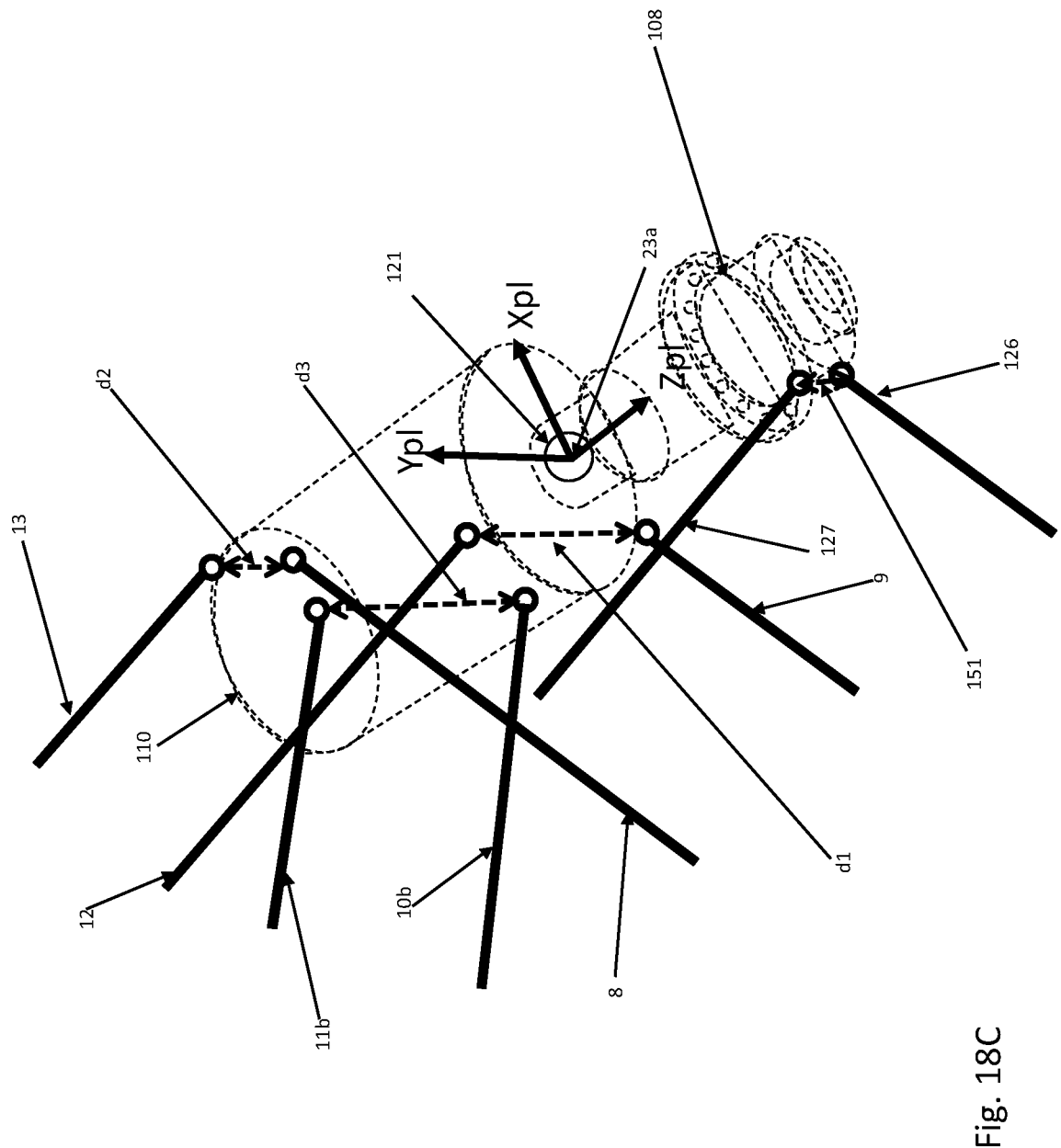

FIG. 18C illustrates the same arrangement as in FIG. 18B. The only difference is that the distances d2 and d3 have new values, which correspond to a second local stiffness optimum, obtained by the described optimization method for this special case with added tool links 126 and 127. In this case the second distance d2 is shorter than the first distance d1. Without the tool links 126 and 127 (as in FIG. 14B), the stiffness will be much lower with the second distance d2 shorter than the first distance d1. The high stiffness and optimal joint placement obtained for the mountings of the links in FIGS. 18B and 18C is independent on the direction of the support links 10 and 11. Thus, the same results are obtained for the cases shown in FIGS. 13B and 13C.

In one illustrative example where the method according to the first aspect was performed, the support-platform joints first had their initial positions separated as shown in FIG. 8. Then, moving the support-platform joints according to the described method with several iterations using defined application tool forces, the result was that the stiffness got higher the closer to each other the support-platform joints denoted 9*a* and 12*a* were placed (having a distance d1 as small as possible between each other), eventually keeping the rest of the support-platform joints at as large distance as possible with the limitations given by the specified platform size. Keeping the support-platform joints denoted 9*a* and 12*a* close, it was found by the iterative method described that the support-platform joints denoted 9a and 12a should be as close to the center of the support platform front (connection point 23a) as possible. Proceeding then with the placement of the support-platform joints denoted 8a and 13a, high stiffness was obtained when these joints had as large distance d2 between each other as possible. Maximum stiffness was obtained when they also were at as large distance as possible from the support-platform joints denoted 9a and 12a in the Zsp-direction. Moreover, it was found that the stiffness could be significantly increased by applying also a distance in the Xsp-direction between support-platform joints denoted 8a/13a and support-platform joints denoted 9a/12a. The optimal placement was dependent on the relative sizes of the forces and torques on the tool and to avoid starting the optimization procedure, according to the described method, from an arbitrary initial joint placement when new configurations of forces and torques were applied, an initial joint placement according to FIG. 9 was introduced. This reduced the number of iterations needed and it was found that the number of iterations could at an average be reduced further by using the initial joint placement according to FIG. 10.

Independent on what initial joint placements that were used, it was found that a high stiffness of the PKM, was always found when the PKM had the following features according to the fourth aspect:

a first one 9a of the support-platform joints 8a, 9a of the first support linkage SL1 and a first one 12a of the support-platform joints 12a, 13a of the third support linkage SL3 are placed to the support-platform 17 with a first distance d1 between each other, a second one 8a of the support-platform joints 8a, 9a of the first support linkage SL1 and a second one 13a of the support-platform joints 12a, 13a of the third support linkage SL3 are placed to the support-platform 17 with a second distance d2 between each other, wherein the second distance d2 is different from the first distance d1, a support-platform coordinate system is defined with perpendicular axes Xsp, Ysp, Zsp with an origin at a connection point 23a at a front face 150 of the support-platform 17a, wherein the Zsp-axis is in a direction of a normal of the front face 150, the first one 9a of the support-platform joints 8a, 9a of the first support linkage SL1 is placed to the support-platform 17 at a fourth distance d4 in the direction of the Zsp-axis from the connection point 23a that is smaller than a fifth distance d5 in the direction of the Zsp-axis from the connection point 23a to the second one 8a of the support-platform joints 8a, 9a of the first support linkage SL1. The first one 12a of the support-platform joints 12a, 13a of the third support linkage SL3 is placed to the support-platform 17 at a sixth distance d6 in the direction of the Zsp-axis from the connection point 23a, that is smaller than a seventh distance d7 in the direction of the Zsp-axis from the connection point 23a to the second one 13a of the support-platform joints 12a, 13a of the third support linkage 12, 13, the second one 8a of the support-platform joints 8a, 9a of the first support linkage SL1 is placed to the support-platform 17 at an eight distance d8 in the direction of the Xsp-axis from the first one 9a of the support-platform joints 8a, 9a of the first support linkage SL1, and the second one 13a of the support-platform joints 12a, 13a of the third support linkage SL3 is placed to the support-platform 17 at a ninth distance d9 in the direction of the Xsp-axis from the first one 12a of the support-platform joints 12a, 13a of the third support linkage SL3.

In some embodiments, simulations have shown that a still higher stiffness is achieved when the following requirements are fulfilled:

d1 as small as possible, thus a minimum implementable distance needed to mount the support-platform joints 9a and 12a as close as possible to each other (e.g. in the direction of the Ysp-axis);

d2 is as large as possible as the support-platform allows, thus a largest implementable distance for mounting the support-platform joints 9a and 12a as far away from each other as possible (e.g. in the direction of the Ysp-axis);

d4 and d6 as small as possible in the direction of the Zsp-axis, thus minimum implementable distances to be able to place the joints 9a and 12a as close as possible to the connection point 23a in the Zsp-direction as the support-platform allows;

d5 and d7 as large as possible in the direction of the Zsp-axis, thus largest possible implementable distances for mounting the joints 8a and 13a as far away from the connection point 23a as possible as the support-platform allows;

d8 and d9 should not be zero in the direction of the Xsp-axis, thus, there should be a distance between joints 8a and 9a, and between joints 13a and 12a, respectively in the direction of the Xsp-axis. One design criteria obtained from optimization with respect to the selection of d8 and d9 is that d8 and d9 are set to values that make the line between support platform joints 8 and 9 to have a rotation angle around the Ysp-axis and that make the line between support platform joints 12 and 13 to have a rotation angle around the Ysp-axis. The value of these rotation angles depend on where the center of the work space in the Xsp/Ysp-plane is placed and could typically be between 20 and 60 degrees.

In some embodiments, simulations have shown that a still higher stiffness is also achieved when the following requirements are fulfilled:

d1 as small as possible, thus a minimum implementable distance needed to mount the support-platform joints 9a and 12a as close as possible to each other (e.g. in the direction of the Ysp-axis);

support-platform joints 8a and 13a are placed in such a way that the second distance d2 will be in the same order as the distance between support-platform joints 12a and 13a and the distance between support-platform joints 8a and 9a.

d4 and d6 as small as possible in the direction of the Zsp-axis, thus minimum implementable distances to be able to place the joints 9a and 12a as close as possible to the connection point 23a in the Zsp-direction as the support-platform allows;

d8 and d9 should not be zero in the direction of the Xsp-axis, thus, there should be a distance between joints 8a and 9a, and between joints 13a and 12a.

The placement of support-platform joints denoted 10a and 11a, using the method, showed that these support-platform joints will further increase the stiffness if they are placed as far as possible from each other (as the support platform allows, in the Ysp-direction). In other words, the second support linkage SL2 then comprises two support-links 10, 11, and the support-platform joints 10a, 11a of the two support-links 10, 11 are placed to the support-platform 17 with a third distance d3 between each other, wherein the third distance d3 is greater than the first distance d1. The method also shows that an increase in the stiffness was obtained by placing the support-platform joints denoted 10a and 11a between the support-platform joints denoted 8a/13a and 9a/12a (in the Zsp-direction). For example, the second support linkage SL2 comprises two support-links 10, 11 and the support-platform joints 10a, 11a of the two support-links 10, 11 are placed to the support-platform 17 at a distance from the connection point 23a, respectively, that is smaller than a distance from the connection point 23a to the second one 8a of the support-platform joints 8a, 9a of the first support linkage SL1 and the second one 13a of the support-platform joints 12a, 13a of the third support linkage SL3, and greater than a distance from the connection point 23a to the first one 9a of the support-platform joints 8a, 9a of the first support linkage SL1 and the first one 12a of the support-platform joints 12a, 13a of the third support linkage SL3, in the direction of the Zsp-axis.

In some embodiments, simulations have shown that a maximum stiffness is achieved when the following requirements, in addition to the above listed requirements, also are fulfilled:
- d3 is as large as possible as the support-platform allows, thus a largest implementable distance for mounting the support-platform joints 10a and 11a as far away from each other as possible (e.g. in the direction of the Ysp-axis);
- the support-platform joints denoted 10a, 11a are placed to the support-platform 17 at a distance from the connection point 23a, respectively, that is smaller than d5 and d7, but greater than d4 and d6, in the direction of the Zsp-axis.

The mounting of paths being linear guideways is usually made on support structures as rigid pillars or frameworks of beams. In order to obtain high stiffness, matching the stiffness of the design of the PKM, the support structures will be very heavy and therefore hard to assemble. Besides the problem of assembling the support structures, there is also a problem of achieving a modularity that makes it possible to easily change the workspace of the PKM. Such modularity is very difficult to obtain for rigid pillars or welded structures and therefore some type of modular framework concept should be used. However, the components of such a modular concept will be heavy when high stiffness is needed. To obtain high stiffness with light weight components does not seem to be realistic, but in FIGS. 19-23 a concept is illustrated that can actually deliver both high stiffness and high accuracy using, in relation to present solutions, components light and small enough to mount without motorized handling equipment. The concept is preferably used for mounting linear guideways on walls, ceilings, pillars or concrete blocks. Concrete blocks can be moved around on, for example air cushions, or rails, or by a forklift. The linear guideways are mounted in the same plane and may be used to mount any of the PKMs are illustrated herein.

Figures 19A, 19B:
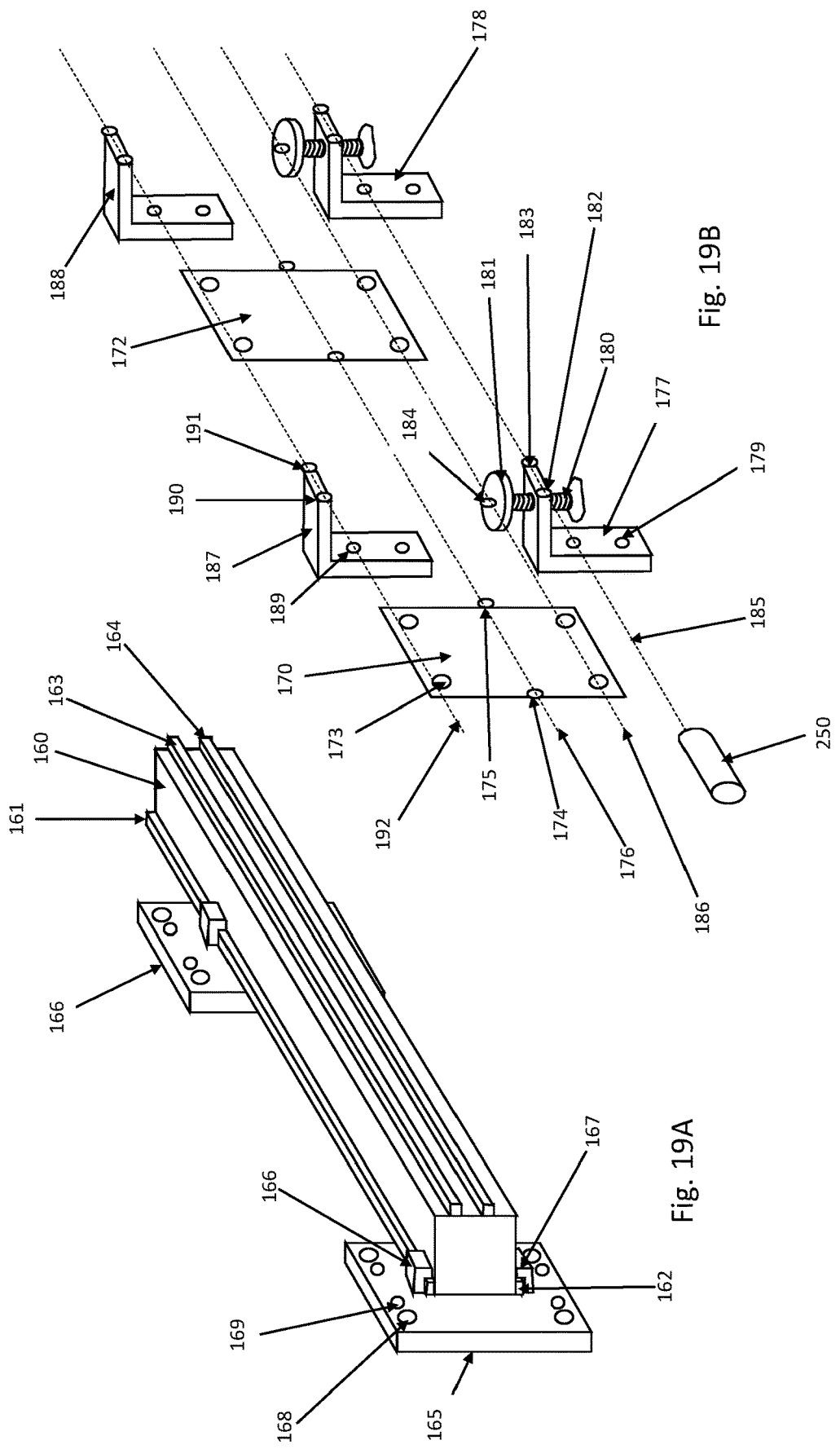
FIG. 19A illustrates a section of a linear guideway with two guideway mounting brackets, according to some embodiments.
FIG. 19B illustrates components used to easily obtain a high precision mounting of the guideway, according to some embodiments.

FIG. 19A exemplifies a section of a linear guideway 160 with two guideway mounting brackets 165 and 166. The concept will be described using only this section of a linear guideway, but in applications where the PKM illustrated in previous figures will be used, the guideways are for example between 10 and 100 meters. Then one or several guideways are assembled in series and several guideway mounting brackets 165 will be used. A guideway comprises an elongated body, e.g. a beam. The distance between the mounting brackets 165 and 166 is determined by the stiffness requirements and the stiffness of the guideway(s). If needed, the guideway(s) may be supported by an extra beam, which is then mounted on the mounting brackets 165. The guideway in FIGS. 19-23 has two bearing guides 163 and 164 for the linear bearing mechanism and two guideway mounting beams 161 and 162 for mounting of the guideway. The bearing guides may be an integrated part of the beam of the guideway or may be mounted or otherwise attached to the surface of the beam of the guideway. Of course, there are many other possible mechanical solutions on bearing guides and mounting mechanisms for guideways used in industry. A guideway mounting bracket 168 includes two mechanical clampings 166 and 167 to rigidly connect the mounting bracket 165 to the guideway via the guideway mounting beams 161 and 162. The guideway mounting beams 161 and 162 are arranged on different, opposite sides of the beam of the guideway. The mechanical clampings 166, 167 each engage and holds a different one of the guiding mounting beams 161, 162, to thereby hold the guideway securely in place. The guideway mounting bracket 165 has four holes 168 used to mount the guideway mounting bracket 165 on a wall or a pillar. In the FIG. 19A there are four more optional holes 169, which are used for adjusting the position and orientation of the guideway mounting bracket in relation to the object surface on which it is mounted. The number of holes may however be more than four or less than four.

FIG. 19B illustrates components used to easily obtain a high precision mounting of the guideway. A laser 250 may be used to generate light ray references 176, 185, 186 and 192 for the mounting of components and for drilling of holes. In the figure a simple laser leveling measurement system is adopted, but also more sophisticated laser interferometer and servo systems may be used. In order to drill holes 173 for the mounting of the guideway mounting bracket 165 with the corresponding holes 168, template sheets 170 and 172 are used. These template sheets include laser ray pinholes 174 and 175 for the laser ray 176. As an alternative a more advanced laser-based system can directly point on the positions where the holes 173 will be drilled. In order to mount a cable chain for the linear actuator system running on the guideway 160, cable chain brackets 187 and 188 are also mounted on the wall of pillars. It should be understood that the number of cable chain brackets may be more or less than two. These cable chain brackets have laser ray pin holes 190 and 191 for laser ray 192 to obtain leveling when holes are made in the wall for the mounting hole as exemplified by 189. A template may be used and it is also possible to use laser rays to find the position of the drilling holes directly. In order to facilitate the mounting of the guideway, guideway holding brackets 177 and 178 are used. In the figure these are positioned in the same way as the cable chain brackets, but now using pin holes 182 and 183 for the laser ray 185 and drilling holes 179. The guideway holding brackets 177 and 178 are L-shaped, but may alternatively have other shapes. The guideway holding bracket 177 and 178, respectively, includes a guideway holding mechanism 180 for high precision moving of the guideway up or down during assembly. In the figure the guideway holding mechanism 180 is simply a screw but other mechanisms may be used, such as scissor lifts or motor-driven linear actuators. When the guideway holding brackets have been mounted, the laser light ray 186 is used to adjust the guideway holding mechanism 180 of all the guideway holding brackets. The pinhole 184 is then used to adjust the guideway holding platform 181 of all the guideway holding brackets, respectively, to the same level. Also here other more advanced laser-based systems can be used. When generating the laser rays 174, 185 and 186, it is important to use a high precision mechanism for the positioning of the laser 250 with exact leveling. This can be made using for example tripods or a special manipulator system. Using an advanced laser interferometer, the setup of the laser equipment will be easier. The distance between the guideway brackets 165 and 166 will of course determine the distance between the guideway bracket templates 170 and 172. If for example a wall has parts where the guideway brackets cannot be mounted, it is of course possible to adjust the distance between the guideway brackets on the guideway.

FIG. 20A illustrates the situation when the guideway has been lifted on to the guideway holding brackets 177 and 178. If the guideway holding platforms 181 (FIG. 19B) have been correctly adjusted before the guideway is lifted, the guideway will be evenly supported by all the guideway holding platforms 181. The guideway 160 with mounted guideway mounting brackets 165 and 166 can be lifted with for example a forklift and then slid on the guideway holding platforms until the guideway mounting brackets touch the wall or pillars, on which the guideway will be mounted. If a wall is completely planar, the guideway mounting brackets can then simply be screwed into the holes made in the wall according to FIG. 19B. However, usually the quality of a wall or a concrete pillar is not high enough and then a guideway mounting bracket adjustment steel plate 170 is placed behind the guideway mounting bracket 165. When such a steel plate is needed, it can also be used as a guideway mounting bracket template according to FIG. 19B. With the guideway mounting bracket adjustment steel plate and at least three guideway mounting bracket adjustment screws in holes 169, the guideway mounting bracket can be adjusted in four DOF. Then the guideway mounting bracket can be adjusted in further two DOF by having the holes 168 larger than the screws used for the mounting.

FIG. 20B illustrates a cross-section along A-A of the guideway mounting bracket 165 in FIG. 20A, to illustrate how the adjustment works. The cross-section A-A of the guideway mounting bracket 165 illustrates two types of screws. The screw 201 moves the guideway mounting bracket 165 towards the wall/pillar 198 and the screw 202 moves the guideway mounting bracket 165 in the opposite direction. If the wall/pillar is not plane, there will for some guideway mounting brackets 165 be a distance between the wall/pillar and the guideway mounting bracket 165 when the guideway mounting bracket 165 has been moved as close as possible to the wall/pillars. Moreover, there may be an angular difference between the guideway mounting bracket 165 and the wall/pillar. This is illustrated in FIG. 20B by the gap between the guideway mounting bracket adjustment steel plate 170 and the guideway mounting bracket 165. When the guideway 160 has been positioned on the guideway holding brackets 177 and slided towards the wall/pillars, the screws 201 and 202 are adjusted and given a predefined torque. The hole 169 has an inner thread as the hole insert 200 in the wall/pillar. The diameter of the hole 168 is larger than the diameter of the screw 201, whereby it is possible to accept adjustments in the plane of the wall/pillar 198. In order to monitor the adjustment with the screws 201 and 202 and if needed adjustments of the guideway holding bracket screws 180, a laser measurement system (laser 250, laser ray 193) can be used with laser ray pin holes 193 and 194 on the guideway according to FIG. 20A. Of course, there are other possibilities than screws for the adjustment of the position and orientation of the guideway mounting brackets in relation to the wall/pillars, for example by using metal shims or wedges.

Figure 21B:
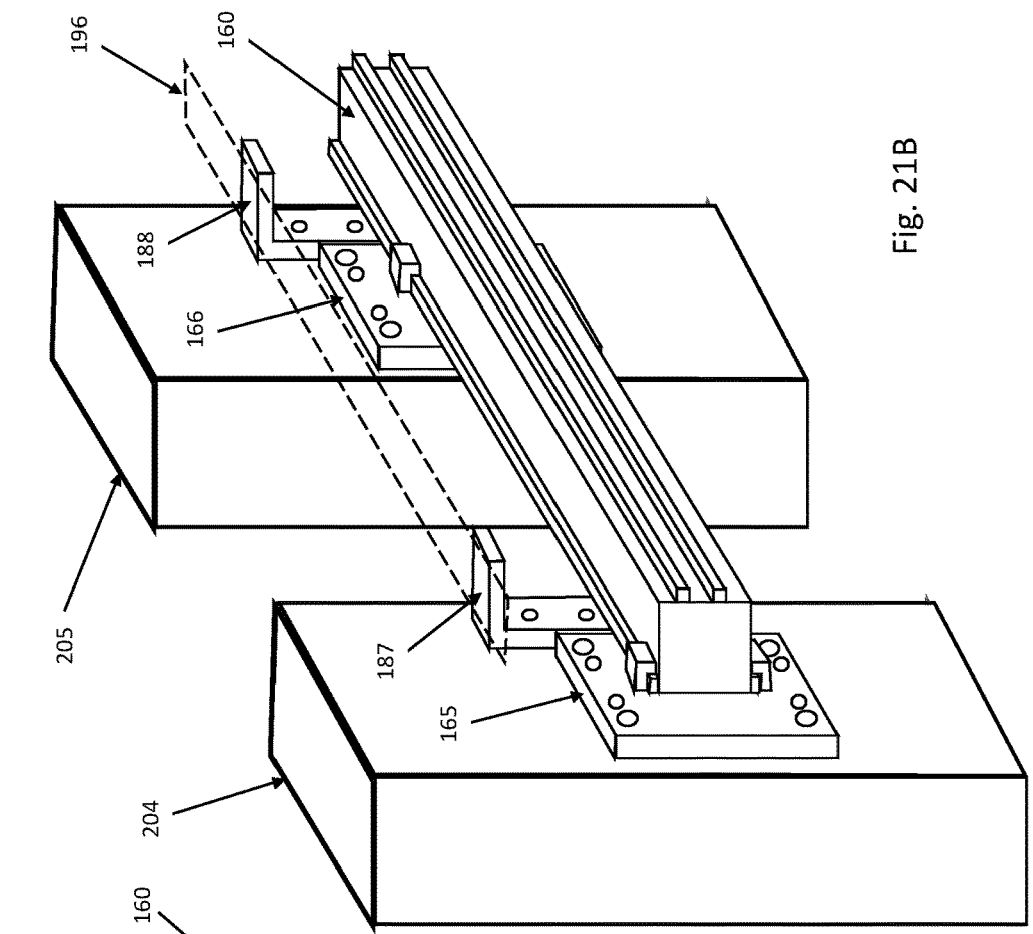
FIG. 21B illustrates a guideway mounted to pillars, according to some embodiments.
Figure 21A:
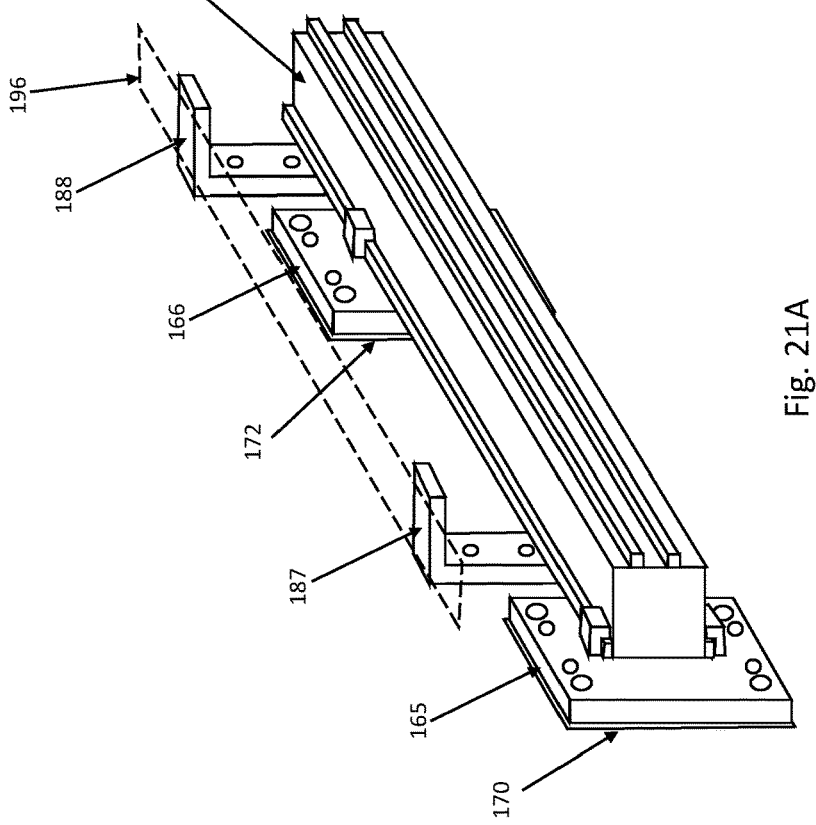
FIG. 21A illustrates a mounted guideway, according to some embodiments.

FIG. 21A illustrates the mounted guideway 160A, together with the following mounting components: the guideway mounting brackets 165, 166 (screw heads not shown), the guideway mounting bracket adjustment steel plates 170, 172 and the cable chain brackets 187, 188. 196 illustrates the cable chain. As can be seen, the guideway holding brackets are not used here.

FIG. 21B illustrates the possibility to mount the guideway, with the same mounting concept as previously described and illustrated, on pillars 204 and 205. These can be existing concrete pillars or concrete pillars moved in place by a forklift, or manually using air cushion or rails.

Figure 22:
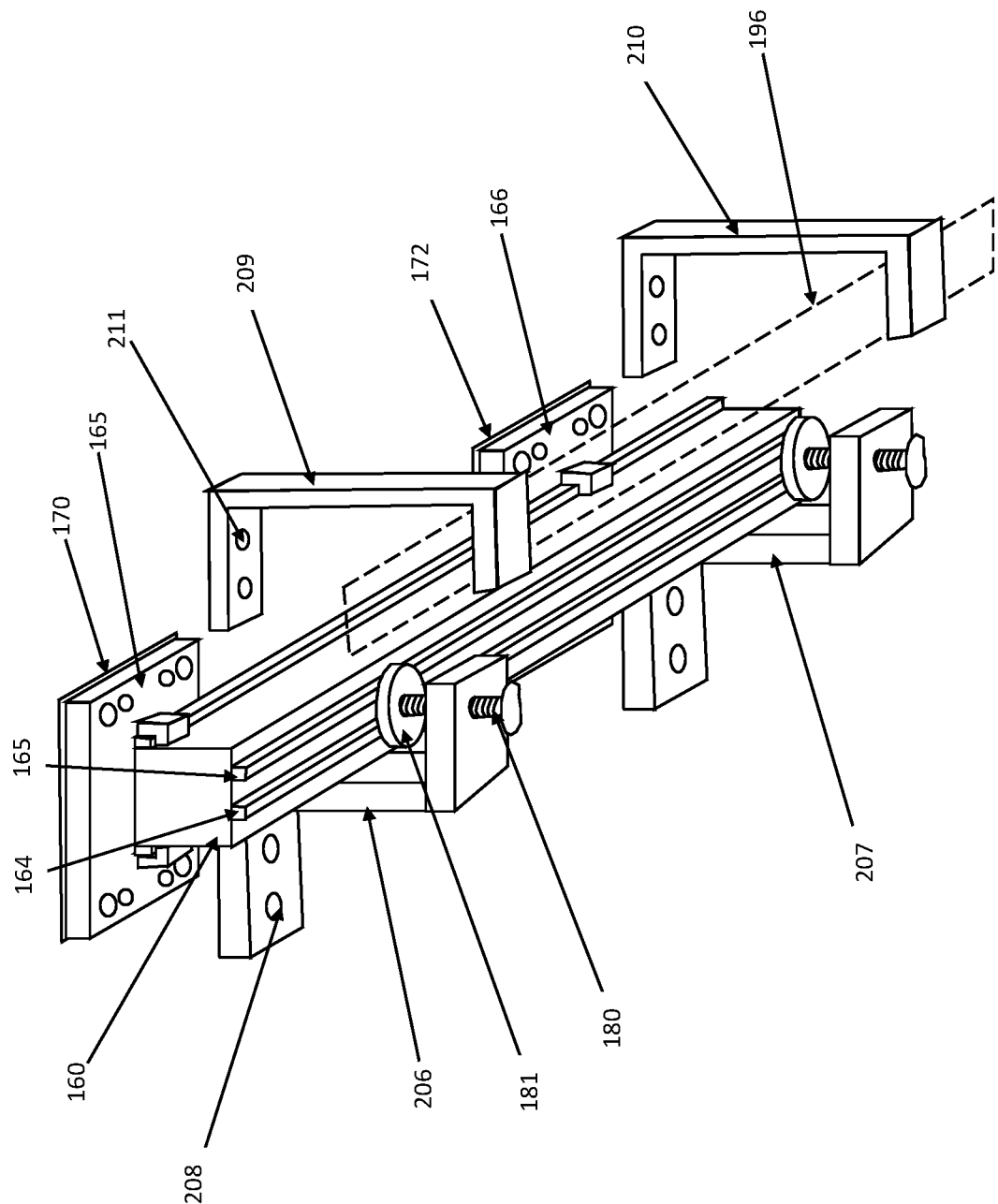
FIG. 22 illustrates the same guideway mounting concept as illustrated in FIGS. 19A-20B, but instead mounting to a ceiling.

FIG. 22 illustrates the same guideway mounting concept as illustrated by FIGS. 19 and 20, but now the concept is used for mounting the guideway 160 on the ceiling or on horizontal beams above the workspace of the PKM. The main difference is the shape of the guideway holding brackets 206 and 207 and the shape of the cable chain brackets 209 and 210. Each guideway holding bracket 206, 207 comprises three parts, one first horizontal part that is attached to the ceiling, one vertical part, and a second horizontal part that reaches under the guideway. The vertical part connects to the first horizontal part at one end and connects to the second horizontal part at the other end. The cable chain brackets 209, 210 are U-shaped. It should be mentioned that the cable chain brackets now should not be mounted until the guideway has been mounted and the guideway holding brackets have been removed.

Figure 23:
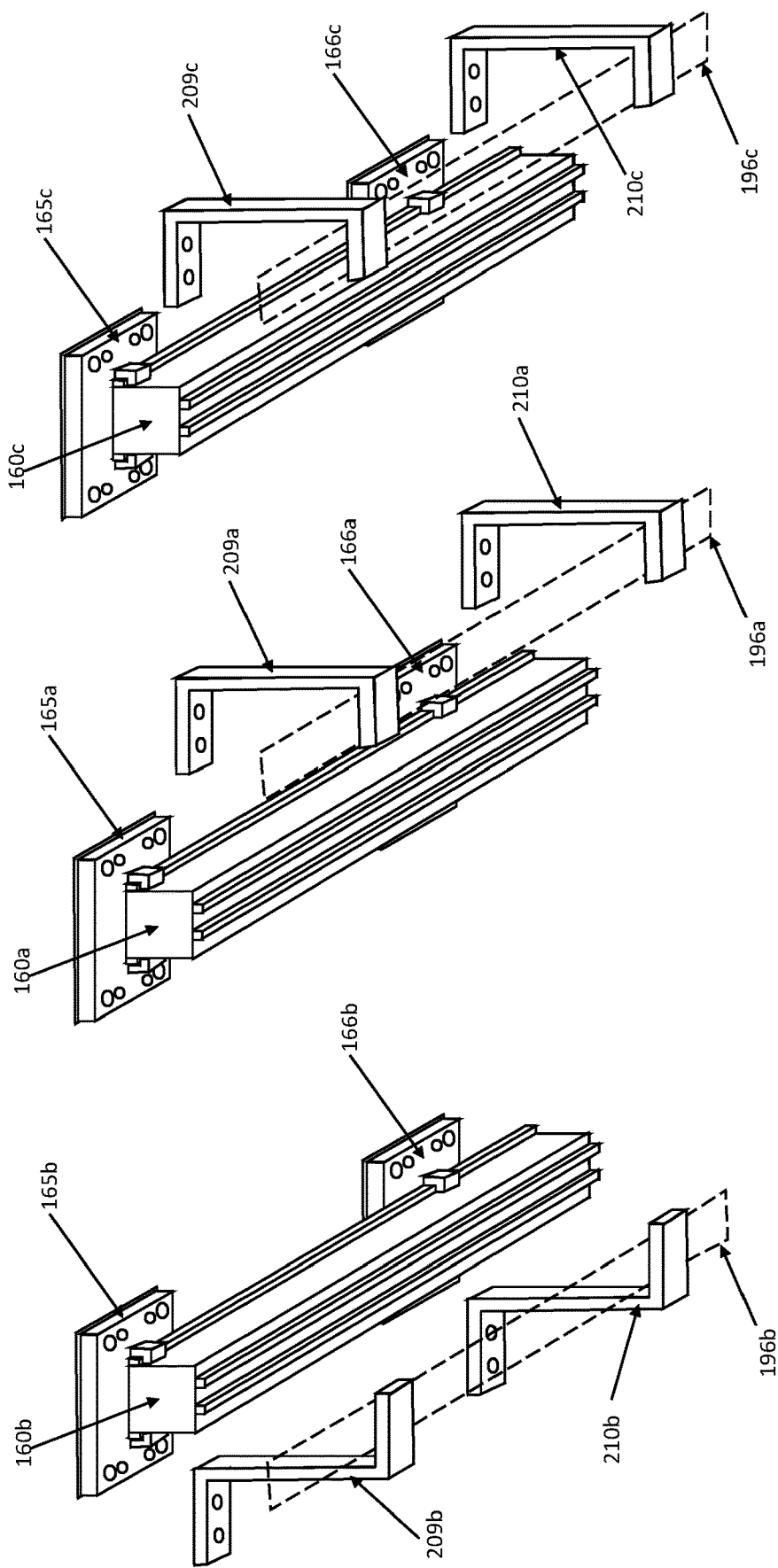
FIG. 23 illustrates three ceiling mounted guideways.

FIG. 23 illustrates the mounting of three ceiling mounted guideways 160a, 160b and 160c with the guideway mounting brackets 165a-166a, 165b-166b and 165c-166c, the cable chain brackets 209a-210a, 209b-210b, 209c-210c and cable chain indications 196a, 196b, 196c. Notice that the shape of the cable chain brackets 209b-210b is different from 209a-210a, 209c-210c. The cable chain brackets 209b-210b have approximately the same shape as the guideway holding bracket 206, 207 in FIG. 22. This is to avoid collisions between the links for guideway 16b and the cable chain 196b. As seen from the figure, the guideways are mounted in the same plane.

As described, the linear guideways may be mounted in the same plane and used as guideways for a PKM. Thus, the disclosure also relates to a system comprising a PKM, linear guideways, and mountings of these guideways. The PKM comprises a support-platform 17, a first support linkage SL1 comprising one, two or more support-links 8, 9 each connected at one end to the support-platform 17 via a support-platform joint 8a, 9a, and at the other end connected to a first carriage 4 via a carriage joint 8b, 9b, wherein the first carriage 4 is movable along a first path 1 defining a first guideway, and the first support linkage SL1 is arranged to transfer a first movement to the support-platform 17.

The PKM also comprises a second support linkage SL2 comprising one, two or more support-links 10, 11; 10 each connected at one end to the support-platform 17 via a support-platform joint 10a, 11a, and at the other end connected to a second carriage 5 via a carriage joint 10b, 11b, wherein the second carriage 5 is movable along a second path 2 defining a second guideway, and the second support linkage SL2 is arranged to transfer a second movement to the support-platform 17. The PKM also comprises a third support linkage SL3 comprising one, two or more support-links 12, 13; 11, 12, 13 each connected at one end to the support-platform 17 via a support-platform joint 11a, 12a, 13a, and at the other end connected to a third carriage 6 via a carriage joint 11b, 12b, 13b, wherein the third carriage 5 is movable along a third path 3 defining a third guideway, and the third support linkage SL3 is arranged to transfer a third movement to the support-platform 17. The first support linkage SL1, the second support linkage SL2 and the third support linkage SL3 together comprises at least five support-links 8, 9, 10, 11, 12, 13. The first movement, the second movement and the third movement positions the support-platform 17 in a base coordinate system Xb, Yb, Zb. The first guideway, the second guideway and the third guideway are mounted in the same plane, for example on a ceiling or to a wall. The first guideway, the second guideway and the third guideway may be mounted or arranged as described according to any of the embodiments herein, especially as described in connection with FIGS. 19-23.

The present invention is not limited to the above-described preferred embodiments. Various alternatives, modifications and equivalents may be used. Therefore, the above embodiments should not be taken as limiting the scope of the invention, which is defined by the appending claims.

The invention claimed is:

1. A method for determining placement of support-platform joints on a support-platform of a parallel kinematic manipulator (PKM), wherein the PKM comprises:
   a first support linkage comprising two or more first support-links, each of the first support links configured to be connected at a first end to the support-platform via a first support-platform joint, and at a second end configured to be connected to a first carriage via a first carriage joint, wherein the first carriage is movable along a first path, and the first support linkage is arranged to transfer a first movement to the support-platform;
   a second support linkage comprising one or more second support-links, each of the second support links configured to be connected at a first end to the support-platform via a second support-platform joint, and at a second end configured to be connected to a second carriage via a second carriage joint, wherein the second carriage is movable along a second path, and the second support linkage is arranged to transfer a second movement to the support-platform;
   a third support linkage comprising two or more third support-links, each of the third support links configured to be connected at a first end to the support-platform via a third support-platform joint, and at a second end configured to be connected to a third carriage via a third carriage joint, wherein the third carriage is movable along a third path, and the third support linkage is arranged to transfer a third movement to the support-platform; and wherein the first support linkage, the second support linkage, and the third support linkage together comprise at least five support-links;
wherein the method comprises the steps of:
   (a) obtaining a kinematic model and an elastic model of the PKM;
   (b) defining forces and/or torques applied to a tool attached to the support-platform during a processing sequence with the tool;
   (c) obtaining a current placement configuration including initial placements of the first, second, and third support-platform joints in relation to the support-platform;
   (d) estimating parameters indicative of stiffness for the PKM, based on the kinematic and elastic models of the PKM and chosen defined forces and/or torques applied to the tool during the processing sequence, when the first, second, and third support-platform joints are located in places defined by the current placement configuration onto the support-platform;
   (e) checking whether the estimated parameters indicative of stiffness of the PKM fulfill one or more application stiffness criteria; and
   (f) upon determining, as a result of the checking step, that the estimated parameters indicative of stiffness fulfill one or more application stiffness criteria, performing one of the following further steps:
      (f)(1) choosing the current placement configuration of the first, second, and third support-platform joints as an optimal placement configuration of the first, second, and third support-platform joints; and
      (f)(2) changing a placement of one or more of the first, second, and third support-platform joints in the current placement configuration and repeating the estimating step and the checking step with the changed current placement configuration.

2. The method according to claim 1, wherein the one or more stiffness criteria of the PKM comprises that a current minimum of the estimated parameters indicative of stiffness is equal to or above a predetermined stiffness value.

3. The method according to claim 1, further comprising
   (g) replacing a previous minimum stiffness value with a current minimum of the estimated parameters indicative of stiffness, upon a current minimum of the estimated parameters indicative of stiffness being greater than the previous minimum stiffness value.

4. The method according to claim 1, wherein the one or more stiffness criteria comprises that no collision is detected between a geometric model of the support-links, and a geometric model of the support-platform, and that no joint limit is reached based on obtained limitations for joint mounting placements.

5. The method according to claim 1, wherein the step of obtaining a current placement configuration including initial placements of the first, second, and third support-platform joints comprises defining initial placements of the first, second, and third support-platform joints.

6. The method according to claim 5, wherein the initial placements of the support-platform joints are limited by a primitive volumetric shape.

7. The method according to claim 1, wherein the kinematic model comprises limitations of a working range of each of the first, second, and third support-platform joints.

8. The method according to claim 1, wherein the step of estimating comprises estimating link forces with a requirement that the sum of all forces acting on the support-platform is zero, and that the sum of all torques acting on the support-platform is zero.

9. The method according to claim 1, wherein the step of defining comprises one of simulation and real program execution, during which forces and/or torques on the tool are estimated.

10. The method according to claim 1, wherein the PKM further comprises a tool-base comprising a shaft joint, a shaft, and a tool platform, wherein the shaft is connected to the support-platform via the shaft joint, and the shaft is also connected to the tool platform; the PKM further comprising one or more tool linkages, each of the tool linkages comprising a tool link connected at a first end via a tool-base joint to the tool-base, and at a second end connected via a carriage joint to a carriage arranged for movement along a path; and wherein each tool linkage is configured to rotate the shaft around at least one axis relative the support-platform, by transferring a movement of the respective tool linkage to the shaft, wherein the method further comprises the step of determining placement of one or more tool-base joints to the tool-base.

11. A system comprising:
   a computer comprising a processor and a memory, wherein the memory comprises computer instructions configured to perform the method according to claim 1 when the computer instructions are executed by the processor, and to output an optimal placement configuration of support-platform joints of a support-platform of a parallel kinematic machine (PKM); and a PKM, comprising
  a support-platform;
  a first support linkage, comprising two or more first support-links, each of the first support-links connected at a first end to the support-platform via a first support-platform joint, and at a second end connected to a first carriage via a first carriage joint, wherein the first carriage is movable along a first path, and the first support linkage is arranged to transfer a first movement to the support-platform;
  a second support linkage, comprising one or more second support-links, each of the second support-links connected at a first end to the support-platform via a second support-platform joint, and at a second end connected to a second carriage via a second carriage joint, wherein the second carriage is movable along a second path, and the second support linkage is arranged to transfer a second movement to the support-platform; and
  a third support linkage, comprising two or more third support-links, each of the third support-links connected at a first end to the support-platform via a third support-platform joint, and at a second end connected to a third carriage via a carriage joint, wherein the third carriage is movable along a third path, and the third support linkage is arranged to transfer a third movement to the support-platform;
  wherein the first support linkage, the second support linkage. and the third support linkage together comprise at least five support-links; and wherein the first, second, and third support-platform joints are placed to the support-platform according to the optimal placement configuration outputted by the computer.

12. A parallel kinematic machine (PKM), comprising
a support-platform;
a first support linkage, comprising two or more first support-links, each of the first support-links connected at a first end to the support-platform via a first support-platform joint and at a second end connected to a first carriage via a first carriage joint, wherein the first carriage is movable along a first path, and the first support linkage is arranged to transfer a first movement to the support-platform;
a second support linkage, comprising one or more second support-links, each of the second support-links connected at a first end to the support-platform via a second support- platform joint, and at a second end connected to a second carriage via a second carriage joint, wherein the second carriage is movable along a second path, and the second support linkage is arranged to transfer a second movement to the support-platform; and
a third support linkage, comprising two or more third support-links, each of the third support-links connected at a first end to the support-platform via a third support-platform joint, and at a second end connected to a third carriage via a third carriage joint, wherein the third carriage is movable along a third path, and the third support linkage is arranged to transfer a third movement to the support-platform;
wherein the first support linkage, the second support linkage, and the third support linkage together comprise at least five support-links;

wherein the first movement, the second movement and the third movement position the support-platform in a base coordinate system (Xb, Yb, Zb), of which the X-axis (Xb) is parallel with the direction of at least one of the first path, the second path, and the third path, and the Z-axis (Zb) is in a direction of a normal of a plane defined by at least two of the first path, the second path, and the third path;

wherein a first one of the first support-platform joints of the first support linkage and a first one of the third support-platform joints of the third support linkage are placed to the support-platform with a first distance (d1) between each other, and a second one of the first support-platform joints of the first support linkage and a second one of the third support-platform joints of the third support linkage are placed to the support-platform with a second distance (d2) between each other, wherein the second distance (d2) is different from the first distance (d1);

wherein a support-platform coordinate system is defined with perpendicular axes Xsp, Ysp, Zsp with an origin at a connection point at a front face of the support-platform, wherein the Zsp-axis is in a direction of a normal of the front face;

wherein the first one of the first support-platform joints of the first support linkage is placed to the support-platform at a fourth distance (d4) in the direction of the Zsp-axis from the connection point that is smaller than a fifth distance (d5) in the direction of the Zsp-axis from the connection point to the second one of the support-platform joints of the first support linkage, and the first one of the third support-platform joints of the third support linkage is placed to the support-platform at a sixth distance (d6) in the direction of the Zsp-axis from the connection point that is smaller than a seventh distance (d7) in the direction of the Zsp-axis from the connection point to the second one of the third support-platform joints of the third support linkage; and wherein the second one of the first support-platform joints of the first support linkage is placed to the support-platform at an eighth distance (d8) in the direction of the Xsp-axis from the first one of the first support-platform joints of the first support linkage, and the second one of the third support-platform joints of the third support linkage is placed to the support-platform at a ninth distance (d9) in the direction of the Xsp-axis from the first one of the third support-platform joints of the third support linkage.

13. The PKM according to claim 12, wherein the second distance (d2) is greater than first distance (d1) in the direction of the Ysp-axis, and wherein the second support linkage comprises two second support-links, and the second support-platform joints of the second support linkage are placed to the support-platform with a third distance (d3) between each other, wherein the third distance (d3) is greater than the first distance (d1).

14. The PKM according to claim 12, wherein the first, second, and third support-platform joints are placed in relation to a primitive volumetric body of the support-platform.

15. The PKM according to claim 14, further comprising a plurality of mechanical interfaces, wherein each of the first, second, and third support-platform joints is connected to the primitive volumetric body via one or more of the mechanical interfaces.

16. The PKM according to claim 12, further comprising one or more mechanical interfaces, each of the mechanical interfaces connected between one of the first, second, and third carriages and the respective one of the first, second, and third carriage joints, and wherein the one or more mechanical interfaces are configured such that the first, second, and third support-platform joints and the first, second, and third carriage joints are in a defined point in their respective orientation working ranges when the primitive volumetric body is centered in a plane defined by the Yb and Zb axes in the working range of the PKM.

17. The PKM according to claim 12, further comprising one or more mechanical interfaces, each of the mechanical interfaces arranged between one of the first, second, and third carriages and a respective one of the first, second, and third carriage joints, wherein the one or more mechanical interfaces are configured to maintain the kinematic features of the PKM, wherein the first support-links of the first support linkage are parallel to each other and have the same length, the third support-links of the third support linkage are parallel to each other and have the same length, and the second support-links of the second support linkage are parallel to each other and have the same length.

18. The PKM of claim 12, further comprising a shaft connected to the support-platform via a shaft joint at the connection point.

19. The PKM according to claim 18, wherein the first one of the first support-platform joints of the first support linkage and the first one of the third support-platform joints of the third support linkage are located with minimum implementation distances to the shaft joint.

\* \* \* \* \*